United States Patent [19]

Helmo et al.

[11] 3,896,125
[45] July 22, 1975

[54] O-HYDROXYPHENYL-S-TRIAZINES

[75] Inventors: Brunetti Helmo, Riehen; Peterli Hans Jakob, Fullinsdorf, Basel-Land; Hansjorg Heller, Riehen, all of Switzerland

[73] Assignee: Ciba-Geigy AG, Basel, Switzerland

[22] Filed: Jan. 21, 1964

[21] Appl. No.: 340,124

[30] Foreign Application Priority Data

| Date | Country | Number |
|---|---|---|
| Jan. 24, 1963 | Switzerland | 847/63 |
| Jan. 24, 1963 | Switzerland | 843/63 |
| Jan. 24, 1963 | Switzerland | 844/63 |
| Jan. 24, 1963 | Switzerland | 845/63 |
| Jan. 24, 1963 | Switzerland | 846/63 |

[52] U.S. Cl. .......... 260/249.5; 96/84; 106/176; 117/33.3; 117/138.5; 117/144; 117/145; 252/300; 252/401; 260/45.9 P; 260/45.9 R; 260/75 N; 260/78 R; 260/92.8 R; 260/93.5 R; 260/93.7; 260/94.9 R; 260/240 D; 260/248 C; 260/473 S; 260/564 R

[51] Int. Cl. .......... C07d 55/18
[58] Field of Search ....... 260/248 CS, 249.5, 240 D, 260/244.5

[56] References Cited

UNITED STATES PATENTS

| | | | |
|---|---|---|---|
| 3,270,016 | 8/1966 | Duennenberger et al. | 260/248 |
| 3,278,534 | 11/1966 | Schellenbaum et al. | 260/249.5 |
| 3,293,247 | 12/1966 | Duennenberger et al. | 260/248 |
| 3,293,249 | 12/1966 | Billand et al. | 260/248 |

OTHER PUBLICATIONS

Karrer, Organic Chemistry, 4th English Ed., page 928, Elsevier Pub. Co. (NY) (1950).

*Primary Examiner*—John D. Randolph

[57] ABSTRACT

Novel o-hydroxyphenyl-s-triazines are substantially non-coloring light stabilizers for organic polymeric substrata and are sufficiently stable to withstand temperatures up to at least 200°C.

4 Claims, No Drawings

O-HYDROXYPHENYL-S-TRIAZINES

PART I

The present invention, in a first aspect, concerns new o-hydroxyphenyl-s-triazines, a process for the production thereof, their use for the stabilization of certain light-sensitive organic materials and for the production of light filters, and, as industrial products, the organic materials stabilized with the aid of the new o-hydroxyphenyl-s-triazines, as well as light filters containing the same.

The absorptive power of a compound for light of a given wavelength is characterized by two expressions which are the absorptivity ($a$) and the molar extinction coefficient ($\epsilon$). These expressions are defined by the well-known equations:

$$\log \frac{I_o}{I} = a \cdot c_w \cdot d = \epsilon \cdot c_M \cdot d$$

wherein
- $c_w$ is the concentration of the absorber in grams per liter of solution,
- $c_M$ represents the concentration of the absorber in moles per liter of solution,
- $d$ represents the thickness of the layer of the solution containing the absorber, in centimeters,
- $I_o$ represents the intensity of the incident light of the given wavelength,
- $I$ represents the intensity of the light having passed the layer of solution containing the absorber.

The larger the values of $a$ and $\epsilon$, the better does the compound absorb at the wavelength for which $a$ and $\epsilon$ hold.

2,4,6-Tris-aryl-triazines, including s-triazines which are substituted simultaneously in 2-,4-and 6-position by phenyl or naphthyl radicals, are known. Those which bear at the phenyl or naphthyl radical a hydroxyl group in orthoposition to the linkage between the aromatic substituent and the triazinyl nucleus absorb ultraviolet light. However, at the concentrations needed to impart protection to the substrate against the effects of ultraviolet light, their light transmittance at 420 millimicrons ($m\mu$) is so much below the limit of 86% that they cause an excessive yellowish discoloration to all substrates containing them. This is particularly true of those s-triazines which contain o-hydroxy-naphthyl substituents, since they have a pronounced absorption in the range of 460 $m\mu$ and higher.

Moreover, they are generally insoluble or poorly soluble in a number of non-polar polymeric substrates, requiring stabilization against the effects of ultraviolet light. Thus, they are not well compatible with such substrates as polyethylene, polypropylene or polyester resins based upon copolymers of styrene and/or methyl methacrylate with polyesters of unsaturated acids such as maleic acid. For commercial applications, these compounds are therefore of very limited practical usefulness.

On the other hand, 2-o-hydroxyphenyl-s-triazines which are bis-substituted in the 4- and 6-position by alkoxy or alkylamino groups are of such low inherent light fastness that they are useless as permanent light-stabilizing agents for organic polymeric materials.

Furthermore, while replacement of one aryl group at the benzophenone nucleus in the well-known o-hydroxy-benzophenone UV-absorbers by an alkoxy group leads to salicylic esters which are known to be commercially useful light-absorbing agents, which however, absorb at much shorter wavelength than the parent benzophenones, replacement of the aryl group by an alkyl affords compounds of such low inherent light fastness that these compounds are practically useless as light stabilizers.

It has now been found that surprisingly and contrary to what would have been expected in view of the foregoing, valuable UV absorbers substantially free from the aforesaid drawbacks are obtained by reacting equimolar amounts of an amidine of the formula

  (I)

and of an amidine of the formula

  (II)

with an equimolar amount of an o-hydroxybenzene carboxylic acid ester of the formula

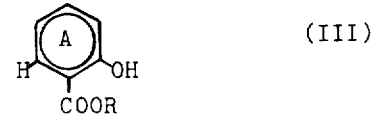  (III)

to form a compound of the formula

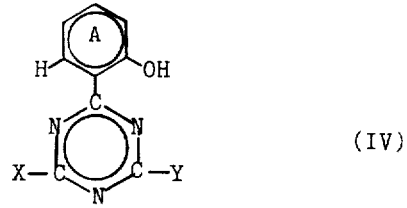  (IV)

in which formulas
- X and Y, independently of each other, represent hydrogen or an alkyl, alkenyl, cycloalkyl or aralkenyl group which may be substituted and
- R represents a hydrocarbon radical which may be substituted; and
- the benzene ring A can be further substituted in the positions 3', 4' and/or 5' by halogen, alkyl, alkenyl or acyloxy groups or by cycloalkyl, aralkyl and aryl groups which may be substituted.

In the Formulas I, II and IV, the alkyl groups symbolized by X and Y have preferably 1 to 18 carbon atoms. Examples of such alkyl groups are the methyl, ethyl, propyl, isopropyl, butyl, tert. butyl, amyl, hexyl, octyl, decyl, dodecyl, tetradecyl, hexadecyl or octadecyl group; of these, alkyl groups having 1 to 10 carbon atoms are particularly preferred. The alkyl groups may be further substituted, in which case they may be defined by the formula -alkylene-E-$D_1$. In this formula, "alkylene" represents a divalent aliphatic radical having 1 to 12, preferably 1 to 4 carbon atoms, and E represents either -O- or -S- or -N($D_2$)-. Each of $D_1$ and $D_2$, independently of each other, represents an alkyl radical preferably containing 1 to 8 carbon atoms and in the case of E being oxygen or nitrogen, $D_1$ and $D_2$ can also be hydrogen. Suitable groups of the formula -alkylene-E-$D_1$ are especially the ω-hydroxyalkyl, ω-alkoxyalkyl, ω-alkylthioalkyl or ω-aminoalkyl groups, such as, for example, the hydroxymethyl, 2-hydroxyethyl, 2-methoxyethyl, 2-ethoxyethyl, 2-butoxyethyl, 2-methylthioethyl, 2-butylthioethyl, 2-dodecylthioethyl, 2-N,N-dimethylaminoethyl, 2-N,N-diethylaminoethyl or the ω-aminodecyl group.

Each of X and Y can also be a halogenoalkyl group preferably containing 1 to 4 carbon atoms such as the chloromethyl, bromomethyl, 2-chloroethyl or 4-chlorobutyl group.

As cycloalkyl groups, X or Y have 5 to 10, preferably however, 6 to 7 carbon atoms. Examples are the cyclohexyl, methylcyclohexyl or ethylcyclohexyl group.

As alkenyl group, X or Y represent groups of preferably 2 to 17 carbon atoms, e.g. the vinyl group, the $\Delta^1$- or $\Delta^2$-propenyl or the $\Delta^8$-heptadecenyl group, of which the alkenyl groups having 2 to 6 carbon atoms are especially preferred.

Each of X and Y can further be an alkenyl group substituted by aryl, especially a phenyl radical; X or Y as aralkenyl group contains 8 to 12, preferably 8 to 9 carbon atoms, examples being β-phenylvinyl (i.e. styryl) p-butylphenylvinyl, o-chlorophenylvinyl, m-methoxyphenylvinyl and β-phenyl-β-methylvinyl.

R in Formula III represents an alkyl radical which may be substituted, having 1 to 18, preferably 1 to 6 carbon atoms, e.g. the methyl, ethyl, methoxyethyl, ethoxyethyl, cyanomethyl or a carbalkoxyalkyl radical, particularly the methoxy-carbonyl-ethyl-, ethoxy-carbonyl-ethyl and propoxy-carbonyl-ethyl radicals. In addition R represents a cycloalkyl radical having 5 to 10, preferably 6 to 7 carbon atoms, particularly the cyclohexyl radical, or an aralkyl radical containing 7 to 12 carbon atoms, especially the benzyl radical. Preferably, however, R represents a monocyclic aryl radical containing 6 to 12 and particularly 6 to 10 carbon atoms, such as the phenyl, methylphenyl or a halogenophenyl radical.

The benzene ring A in Formulas III and IV can be substituted by halogen, alkyl, alkenyl, acyloxy, cycloalkyl, aralkyl and/or aryl groups, among which the acyloxy radicals and also the cyclic radicals can be further substituted, e.g. by halogens such as chlorine or bromine. When alkyl groups are present as substituents of ring A they should contain 1 to 18, and preferably 1 to 10 carbon atoms, when alkenyl groups are present they should contain 2 to 18, and preferably 2 to 5 carbon atoms; examples of these substituents are the methyl, tert. butyl or tert. octyl group or the allyl or methallyl group. Ring A can also contain as substituents cycloalkyl groups of 5 to 8 carbon atoms or aralkyl groups having 7 to 10 carbon atoms, e.g. the cyclohexyl or the benzyl or 1-phenylethyl group, or it can contain as substituents aryl groups, particularly those of the benzene series having 6 to 10 carbon atoms such as the phenyl, a methylphenyl, chlorophenyl or methoxyphenyl group. In the case in which ring A contains acyloxy groups the acyl radical thereof has from 1 to 18, preferably 1 to 10 carbon atoms and can be derived from a straight or branched chain carboxylic acid being saturated or having at most one double bond. This carbacyl radical can be further substituted, particularly by carboxy, lower alkoxy-carbonyl or lower alkoxy groups of the aliphatic series. The acyl radical can also be derived from a cycloaliphatic carboxylic acid having 6 to 18 carbon atoms, an araliphatic carboxylic acid having 8 to 10 carbon atoms or from an aromatic carboxylic acid, in the latter case particularly from a benzene carboxylic acid having 7 to 11 carbon atoms. It can also be a carbonic acid monoester radical having 2 to 11 carbon atoms. Examples are the acetic, propionic, stearic, acrylic, crotonic, β-carboxypropionic, β-carbomethoxypropionic, β-carbobutoxypropionic, β-carbohexoxypropionic, butoxyacetic, β-methoxypropionic, cyclohexane carboxylic, phenyl acetic, cinnamic, benzoic, chlorobenzoic, methylbenzoic, methoxybenzoic or o-carboxybenzoic acid radical, the carbomethoxy, carbethoxy, carbobutoxy, carbodecyloxy, carbocyclohexyloxy, carbobenzyloxy, carbophenyloxy, carbochlorophenloxy or carbocresyloxy radical.

The benzene ring A can contain one or more of these substituents as well as rings which can be fused thereto formed, e.g. by the tetramethylene group.

The term "lower" as used in this specification and the appended claims in connection with an aliphatic radical means a radical having not more than 4 carbon atoms.

It has further been found that particularly satisfactory results are obtained with the compounds of the formula

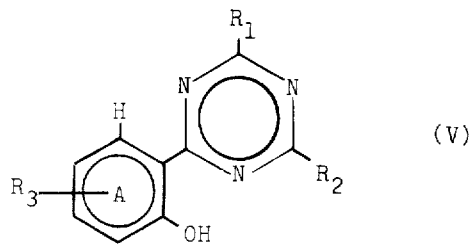

(V)

wherein each of $R_1$ and $R_2$ represents
hydrogen,
alkyl of from 1 to 18 carbon atoms,
amino-alkyl of 1 to 12 carbon atoms,
hydroxy-alkyl of 1 to 12 carbon atoms,
alkoxy-alkyl wherein the alkoxy moiety has from 1 to 8 carbon atoms and the alkyl moiety has from 1 to 12 carbon atoms, polymer
alkylthio-alkyl wherein the alkylthio moiety has from 1 to 8 carbon atoms and the alkyl moiety has from 1 to 12 carbon atoms,
N-alkylamino-alkyl wherein the alkylamino moiety hasd from 1 to 8 carbon atoms and the alkyl moiety has from 1 to 12 carbon atoms,
N,N-di-(alkyl)-amino-alkyl wherein the N-alkyl groups have each from 1 to 8 carbon atoms, and the alkyl moiety bearing the amino group has from 1 to 12 carbon atoms,
alkoxy-carbonyl-alkyl wherein the alkoxy moiety has from 1 to 8, and the alkyl moeity from 1 to 12 carbon atoms,
carboxy-alkyl with a total of from 2 to 13 carbon atoms,
chloro-alkyl of from 1 to 12 carbon atoms,
bromo-alkyl of from 1 to 12 carbon atoms,
cycloalkyl of from 5 to 10 carbon atoms, 5 to 6 of which are ring members,
alkenyl of from 2 to 17 carbon atoms,
phenylalkenyl of from 8 to 12 carbon atoms,
alkyl-phenyl-alkenyl of from 9 to 12 carbon atoms,
alkoxy-phenyl-alkenyl of from 9 to 12 carbon atoms, or
chloro- or bromo-phenyl-alkenyl of from 8 to 12 carbon atoms, and $R_3$ represents
hydrogen,
chlorine,
bromine,
alkyl of from 1 to 18 carbon atoms,
alkenyl of from 2 to 18 carbon atoms,
cycloalkyl of from 5 to 8 carbon atoms, 5 to 6 of which are ring members,
phenylalkyl of from 7 to 10 carbon atoms,
alkylphenylalkyl of from 8 to 10 carbon atoms,
chloro- or bromo-phenylalkyl of from 7 to 10 carbon atoms,
phenyl,
alkylphenyl of from 7 to 10 carbon atoms,
chlorophenyl,
bromophenyl,
or one of the following radicals, referred to in this specification and defined in the appended claims by the term "acyloxy":
alkanoyloxy of from 1 to 18 carbon atoms,
alkenoyloxy of from 3 to 18 carbon atoms and one double bond,
carboxy-alkanoyloxy of from 4 to 12 carbon atoms,
alkoxy-carbonyl-alkanoyloxy of from 3 to 13 carbon atoms,
carboxy-alkenoyloxy of from 4 to 12 carbon atoms,
alkoxy-carbonyl-alkenoyloxy of from 5 to 13 carbon atoms,
benzoyloxy, alkylbenzoyloxy of from 7 to 10 carbon atoms,
chloro- or bromo-benzoyloxy,
alkoxy-carbonyloxy of from 2 to 13 carbon atoms,
cyclohexyloxycarbonyloxy,
benzyloxycarbonyloxy, or
phenoxycarbonyloxy.

The compounds of the formula V should preferably possess a molecular weight between 173 and 600. Compounds having good absorption and solubility properties have preferably a molecular weight between 405 and 460.

Some of the starting materials of formulas I, II and III are known and all others can be readily produced by methods known per se from known substances. Amidines of the formula I or II are obtained, for example, from nitriles of the formula X—CN or Y—CN by conversion to corresponding iminoethers and reaction of the latter with ammonia; the o-hydroxybenzene carboxylic acid esters of formula III are obtained, for example, from the corresponding salicyclic acids by esterification. The salicyclic acids are particularly easily obtained by reacting the phenols of the formula

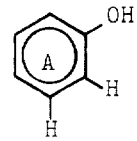

with carbon dioxide according to Kolbe. The remarks regarding X, Y and A are also pertinent here.

The reaction to form the o-hydroxyphenyl triazines is performed by heating the starting materials I, II and III, preferably in approximately equimolar ratios rations. Advantageously the reaction is performed in boiling organic solvents, particularly when amidines having a high melting point are used. Suitable solvents are mainly alcohols such as methanol, ethanol, ethylene glycol monomethyl or monoethyl ether, or also dioxan.

If desired, any reactive substituents present in the new o-hydroxyphenyl-s-triazines can subsequently be altered. For example, if X or Y is an alkoxyalkyl group then this can be converted with hydrobromic acid into the corresponding bromoalkyl group. o-Hydroxyphenyl-s-triazines having halogenoalkyl side groups are produced advantageously by this method. Exchangeable halogen can also be replaced by reaction with aqueous sodium hydroxide solution, with alkali metal alcoholates or alkali metal phenolates, with ammonia, primary or secondary amines, by the hydroxyl group, or by an ether group or by an amino group; if they contain alcoholic or phenolic hydroxyl groups, these can be esterified or etherified.

The compounds of Formulas IV or V containing acyloxy groups as substituents of the benzene ring A in m- and/or p-position to the bond of the triazine ring are produced advantageously, for example, by acylation of the corresponding hydroxyl compounds. Suitable acylating agents for this purpose are the carboxylic acid anhydrides and, especially, the halides of carboxylic acids, and of carbonic acid monoesters, i.e. for example, acetic acid anhydride, acetyl chloride, benzoyl chloride, and chloroformic acid alkyl esters. Ketenes can also be used as acylating agents. The dihydroxyphenyl triazines here needed as starting materials are obtained by the method described above from compounds of Formula III in which A is further substituted by at least one hydroxyl group. Compounds of Formula IV, in which X and/or Y represent an alkenyl radical are produced advantageously from the corresponding compounds in which X and/or Y is a halogenoalkyl, hydroxyalkyl, alkoxyalkyl or aminoalkyl radical, by removal of hydrohalic acid or splitting off of water or alcohol or amine, possibly after modification into quaternary ammonium salts according to the methods usual in organic chemistry.

Such triazines having unsaturated side chains can also be produced by reacting simple alkyl triazines, particularly methyl triazines, with aldehydes while splitting off water.

Particularly easy to produce are those compounds falling under Formula V which contain two identical alkyl groups of from 1 to 10 carbon atoms as $R_1$ and $R_2$ and hydrogen as $R_3$. Those containing two identical alkyl groups of from 1 to 10 carbon atoms as $R_1$ and $R_2$ and as $R_3$ chlorine, alkyl of from 1 to 5 carbon atoms, phenyl, or an acyloxy radical as defined above in connection with Formula V, are almost as easy to produce. These two groups of compounds falling under Formula V, therefore, constitute a preferred subgroup of special value in commercial application.

The new o-hydroxyphenyl-s-triazines according to the invention are distinguished by good fastness to light in polymeric carriers. Compounds according to the invention which contain double bonds in the side chains which are in conjugation with the triazine ring, i.e. those in which either X alone or Y alone or both X and Y are a $\Delta^1$-alkenyl or $\Delta^1$-aralkenyl group, especially a $\beta$-phenylvinyl group, are distinguished by particularly high molar extinction coefficient. At the same time, however, they are somewhat less fast to light than compounds according to the invention which do not contain such conjugated double bonds in the side chains.

The compounds of Formula IV are easily produced in high yields. They are distinguished from known compounds of similar structure and of comparable solubility and light fastness by a less yellow inherent color, while they are distinguished from known compounds of a comparable degree of colorlessness by better solubility in organic solvents and in polymers. This is important in two respects: one important purpose of using the UV absorbers is to impede or at least retard the photochemical discoloration, particularly of substrates which are required to be practically colorless, such as, e.g. polystyrene used in electrical light fixtures.

Such colorless polystyrenes comprise normal crystal grade polystyrene as well as polystyrene modified to possess increased impact strength and/or shatter resistance, as used, for instance, for non-breakable glassware.

Furthermore, the compounds of Formula IV are useful as additives to polymethyl methacrylate, which is inherently colorless, in the production of light filters such as used as window panes for instance in vista dome cars, in automobiles and in airplanes. Naturally, UV-absorbers which are inherently of yellowish color cannot be used in such materials of which practical colorlessness is required.

In addition, the better solubility of the UV-absorber according to the invention, as compared with known UV-absorbers of similarly low inherent color is of great importance in their application, e.g. in the production of very thin light filters containing a high proportion of UV-absorber which must not "bloom out".

The new o-hydroxyphenyl-s-triazines falling under Formula IV are incorporated into the light-sensitive carriers or polymeric carriers for light filters in amounts of 0.01 to 30% by the weight calculated on the weight of the total composition. The amount of triazine to be used depends, among other things, on the thickness of the light filter to be produced. For very thin layers such as, e.g., for lacquer coatings, amounts of 1 to 20% are preferred, for thick layers such as, e.g., polymethacrylate sheets on the other hand amounts of 0.01 to 1% are preferred.

Organic polymers, both thermoplastic polymers as well as thermosetting polymers are the main carriers for the new o-hydroxyphenyl-s-triazines. This includes completely synthetic polymers as well as natural polymers and also their polymeric derivatives chemically modified without substantially changing the degree of polymerization (D.P.). Of the completely synthetic polymers, mainly pure addition and pure condensation polymers, but also condensation polymers cross-linked by addition polymerization are useful as carriers.

Of the addition polymers which can be employed as carriers for the new UV-absorbers, the following types are preferred:

1. Homopolymers of vinyl and vinylidene monomers and copolymers obtained from mixtures of such monomers which polymers are obtained from such monomers with the aid of radical, ionic or metal-organic polymerization initiators. Examples of such monomers, the polymers of which are suitable carriers, are:
   a. Polymerizable ethylenically unsaturated halogenated hydrocarbon compounds, in particular vinyl chloride, vinyl fluoride and vinylidene chloride,
   b. Polymerizable hydrocarbons having a double bond capable of addition, particularly styrene, isobutylene, ethylene and propylene. Both the atactic and the isotactic forms of polymers can be used.
   (c) $\alpha,\beta$-unsaturated polymerizable carboxylic acids of preferably 3 to 5 carbon atoms such as acrylic acid and methacrylic acid and such functional derivatives of these acids, as, for instance, the nitriles, amides, N-lower alkyl-amides, N,N-di-(lower alkyl-)amides, N-(hydroxy-lower alkyl)-acylamides, and alkyl esters, particularly lower alkyl esters, in particular acrylonitrile, acrylamide, methacrylamide, methylolacrylamide, the methyl, ethyl, propyl and butyl esters of methacrylic acid and acrylic acid,
   d. Polymerizable acyl derivatives of ethylenically unsaturated alcohols and amines of the vinyl alcohol, allyl alcohol or allyl amine type, particularly those of organic carboxylic acids among which are alkanoic and alkenoic acids having up to 18 carbon atoms such as acetic acid, propionic acid, acrylic acid, lauric acid, oleic acid, stearic acid and of aromatic mononuclear carbocyclic carboxylic acids such as benzoic acid and phthalic acid, and also a cyclic carbonic acid imides such as, e.g. those of cyanuric acid, can be used. Examples are allyl phthalate, polyallyl melamines, vinyl acetate, vinyl stearate, vinyl benzoate and vinyl maleate,
   e. Polymerizable polyenes with conjugated double bonds such as butadiene, isoprene, chloroprene, sorbic acid and the esters thereof.

2. Homo- and co-polymers of epoxides, particularly of bis-epoxides, formed by curing with acid or basic catalysts. Examples of this class are the polymers of bis-glycidyl ethers of geminal bis-(p-hydroxyphenyl)-alkanes and cycloalkanes such as, for instance, the bisepoxide of the formula

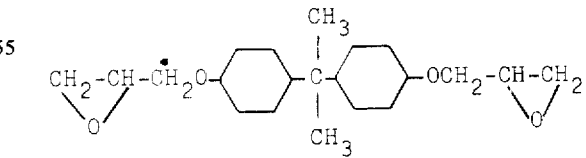

which is the reaction product of Bisphenol A with epichlorhydrin.

3. Homo- and co-polymers of lactams and lactones, in particular polymers of $\epsilon$-caprolactam.

4. Homo- and co-polymers of aldehydes, particularly of formaldehyde and acetaldehyde, such as polyoxymethylene and polyoxyethylene.

5. Reaction products of isocyanates with hydroxyl and/or amino compounds, in particular those of di- or polyisocyanates with divalent or polyvalent hydroxyl and amino compounds. Polyurethanes and polyureas produced by reaction of diisocyanates with polyesters and/or polyethers containing hydroxyl groups are in this class.

The condensation polymers used as carriers for the new o-hydroxyphenyl-s-triazines according to this aspect of the invention are, among others, polyesters and polyamides. Particularly mentioned are linear thermoplastic polycondensates derived on the one hand from dicarboxylic acids and organic dihydroxy derivatives or organic diamines and, on the other, from hydroxy or amino carboxylic acids. Preferred linear polycondensates are the fiber-forming polymers from ω,ω'-dicarboxylic acids and ω,ω'-dihydroxy compounds or ω,ω'-diamines as well as of ω-hydroxycarboxylic acids or ω-aminocarboxylic acids, in particular those polymers derived from saturated aliphatic, cycloaliphatic and carbocyclic mono-nuclear and non-fused dinuclear aromatic carboxylic acids.

The linear condensation products of the following components are specially suited: adipic acid/hexamethylenediamine; sebacic acid/hexamethylenediamine; terephthalic acid/ethylene glycol; terephthalic acid/1,-4-dimethylol-cyclohexane; 11-aminoundecanoic acid.

Thermosetting cross-linked polycondensates which are formed in particular by condensation of aldehydes with compounds poly-condensable therewith, in particular, formaldehyde condensates with phenols, ureas and melamines can also be light-stabilized with compounds according to the invention or used as carriers therefor.

Among the condensation polymers subsequently cross-linked by addition polymerization which are suitable for use as carriers for the compounds according to the invention, mainly the polyester resins are of interest. These are copolymers of (a) polyesters of unsaturated carboxylic acids and polyvalent, particularly divalent, alcohols, which polyesters contain polymerizable double bonds and (b) vinyl- and vinylidene-monomers such as styrene and/or methyl methacrylate. Preferably such copolymerizable polyesters are condensates of maleic acid, itaconic acid, citraconic acid, with divalent alcohols, of which the ones derived from ethylene oxide and propylene oxide such as ethylene glycol, propylene glycol and diethylene glycol and the like are preferred due to their commercial availability. The properties of such polyesters may be modified by replacement of part of the above mentioned unsaturated acids by other aliphatic, cycloaliphatic or aromatic dicarboxylic acids or their anhydrides, such as adipic acid, phthalic anhydride or succinic anhydride. Of particular interest are chlorine- and bromine- substituted acids and anhydrides such as tetrachlorophthalic anhydride and the anhydride of 1,2,3,4,7,7-Hexachlorobicyclo [2,2,1]-heptene-(2)-5,6-dicarboxylic acid since they lead to self-extinguishing polyester resins.

In a preferred method, this monomer mixture of unsaturated polyesters and vinyl and/or vinylidene monomers (often termed liquid polyester resin) is cross-linked by radical polymerisation initiators.

The natural polymers used as carriers for the new o-hydroxyphenyl-s-triazines are mainly polysaccharides such as cellulose, or also rubber and proteins.

Other polymers useful as carrier for the new compounds according to this aspect of the invention are modifications of natural or synthetic polymers, which modified polymers are obtained by subjecting said parent polymers to chemical reactions such as saponification, hydrolysis, esterification inclusive of transesterification, amidation inclusive of transamidation and/or acetalization, without, however, substantially altering the degree of polymerization of the polymers. Examples of such modifications obtained by the above mentioned or similar "polymerhomologous" reactions, i.e. reactions which alter the chemical nature of a polymer without substantially changing the degree of polymerization of the same, are polyvinyl alcohol, obtained by hydrolysis of polyvinylacetate, polyvinyl butyral. obtained by acetalization of polyvinylalcohol with butyraldehyde, cellulose esters of alcanoic acids and/or benzoic acid, obtained by esterification of cellulose with said acids, whereby 1 to 3 acyl groups per glucose units are introduced into the polymer, or cellulose ethers obtained by etherification of cellulose.

In the compositions according to the invention, the above-enumerated polymers, either alone or in mixture with each other serve as carriers for the new UV absorbers. Particularly valuable compositions according to the invention contain thermoplastic vinyl and vinylidene polymers, inclusive of polyolefins, cellulose esters and ethers, linear, fiber-forming polyesters, polyamides and polyurethanes, polyester resins, as carriers for the new UV absorbers.

In addition to these polymeric carriers, natural and also synthetic light-sensitive waxes, fats and oils, as well as light-sensitive materials of a more complex nature such as photographic materials, or emulsions which contain light-sensitive fats, or emulsions or dispersions of the polymers above mentioned can be used as carriers for the new UV absorbers according to the invention.

In this connection carrier is meant to embrace
a. light sensitive substrates which are improved in their light resistance by incorporation of the new light stabilizers according to the invention,
b. substantially light stable substrates which serve as mechanical bearers of the light stabilizers according to the invention and which compositions of carrier and light stabilizer can be used in the manufacture of UV-light filters.

The molecular weight of the above-described polymers is of secondary importance as long as it is within the margins necessary for the characteristic mechanical properties required of these polymers. Depending on the polymers, it can be between 1000 and several millions. The incorporation of the new o-hydroxyphenyl-s-triazines into these polymers is performed, depending on the type of polymers, by working in at least one of these compounds and optionally other additives such as, e.g. plasticisers, antioxidants, other UV absorbers, heat stabilizers, pigments or the like, into the polymer melt by methods conventional in the industry before or during molding, or by dissolving the UV absorbers according to the invention in the corresponding monomers before polymerization, or by dissolving the polymers and the additives in solvents and thereafter evaporating the latter. The new o-hydroxyphenyl-s-triazines can also be drawn from baths, e.g. from aqueous dispersions, onto films or threads of carrier material.

The incorporation of the UV absorbers according to the invention in weakly basic, neutral or acid carriers is particularly advantageous, while incorporation into carriers of pronounced basic nature is less recommendable.

Upon incorporation into the polymeric carriers, compounds of Formula V containing reactive groups can partially or completely react with the polymeric substrates as such, or during the course of the formation of the latter from its monomer or monomers by polymerization.

Very good results are achieved by incorporating a compound of the formula

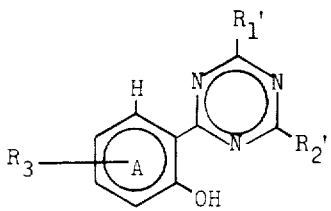

(VI)

wherein each of $R_1'$ and $R_2'$ represents amino-alkyl or hydroxyalkyl, of 1 to 12 carbon atoms, respectively, or N-alkylaminoalkyl wherein the alkylamino moiety has from 1 to 8 carbon atoms and the alkyl moiety has from 1 to 12 carbon atoms, or alkoxy-carbonyl-alkyl wherein the alkoxy moiety has from 1 to 8, and the alkyl moiety from 1 to 12 carbon atoms, or carboxy-alkyl with a total of from 2 to 13 carbon atoms, and $R_3$ has the meaning given hereinbefore, into a melt of linear fiber-forming polyesters and/or polyamides or into polymerization mixtures containing the monomers from which the aforesaid polyesters or polyamides are produced, at temperatures of 200° to 300°C.

On the other hand, s-triazines according to the invention which contain a double bond capable of addition in $R_1$, $R_2$ and/or in the substituent $R_3$ of Formula V, and which are present in the mixture of monomers prior to the polymerization of these monomers to the corresponding polymeric carriers, can be built into the polymer chains being formed during polymerization of said vinyl and vinylidene monomers.

The light-sensitive materials can also be protected from the injurious effect of light by painting them with a protective coating, e.g. a lacquer, containing UV absorber falling under Formula IV, or by covering them with covers containing such UV absorbers such as films, discs or plates. In these types of application the amount of UV light absorber added is advantageously 10 to 30%, calculated on the weight of the covering material, for layers of less than 0.01 mm thickness and 1 to 10% for layers of 0.01 to 0.1 mm thickness.

For certain uses, particularly when warm polymer chips are to be powdered with UV absorbers, products which melt above the fusion temperature of the polymer and at the same time are sufficiently soluble in the polymer melt, are particularly valuable.

The following examples illustrate the invention. The temperatures are given therein in degrees Centigrade. g strands for gram and *ml* for milliliter. All percentages are by weight unless expressly stated otherwise.

EXAMPLE 1

6 g of dry sodium methylate are dissolved in 100 ml of anhydrous ethyl alcohol and then 10.5 g of acetamidine hydrochloride are added in portions to the solution. The solution of the free acetamidine so obtained, from which sodium chloride crystallizes out, is stirred for 1 hour at room temperature. 11.5 g of 2-hydroxy-5-methylbenzoic acid phenyl ester are added and the mixture obtained is then refluxed for 6 hours. The reaction mixture is cooled and then water is added dropwise until, on the one hand the sodium chloride has dissolved and, on the other, the 2-(2'-hydroxy-5'-methylphenyl)-4,6-dimethyl-s-triazine formed has separated out. On leaving to stand for a considerable time, the product crystallizes. The dried reaction product is dissolved in hot ethylene glycol monomethyl ether and recrystallized by careful addition of water. The recrystallized 2-(2'-hydroxy-5'-methylphenyl)-4,6-dimethyl-s-triazine melts at 131°.

By replacing in the aforesaid example the 2-hydroxy-5-methyl-benzoic acid phenyl ester by the equivalent amount of 2-hydroxy-5-cyclohexyl-, 2-hydroxy-5-(1',1',3',3'-tetramethylbutyl)-, 2-hydroxy-3,5-dimethyl-, 2-hydroxy-4,5-dimethyl-, 2-hydroxy-5-benzyl-, 2-hydroxy-5-phenyl-, 2-hydroxy-3-(4'-ethylphenyl-, 2-hydroxy-5-(3'-chlorophenyl)- or 2-hydroxy-5-(4'-bromophenyl) benzoic acid phenyl ester and otherwise following the same procedure as described in the example above, the following compounds are obtained:

2-(2'-hydroxy-5'-cyclohexylphenyl)-4,6-dimethyl-s-triazine, 2-(2'-hydroxy-5'-1'',1'',3'',3''-tetramethylbutylphenyl)-4,6-dimethyl-s-triazine, 2-(2'-hydroxy-3',5'-dimethylphenyl)-4,6-dimethyl-s-triazine, 2-(2'-hydroxy-4',5'-dimethylphenyl)-4,6-dimethyl-s-triazine, 2-(2'-hydroxy-5'-benzylphenyl)-4,6-dimethyl-s-triazine, 2-(2'-hydroxy-5'-phenylphenyl)-4,6-dimethyl-s-triazine, 2-(2'-hydroxy-3'-p-ethylphenylphenyl)-4,6-dimethyl-s-triazine, 2-(2'-hydroxy-5'-m-chlorophenylphenyl)-4,6-dimethyl-s-triazine, 2-(2'-hydroxy-5'-p-bromophenylphenyl)-4,6-dimethyl-s-triazine.

EXAMPLE 2

10.5 g of acetamidine hydrochloride, 6g of sodium methylate and 12.5 g of 2-hydroxy-5-chlorobenzoic acid phenyl ester are reacted as described in example 1. The recrystallized 2-(2'-hydroxy-5'-chlorophenyl)-4,6-dimethyl-s-triazine obtained melts at 160°.

By replacing in the aforesaid example the phenyl ester mentioned by the equivalent amounts of the following 2-hydroxy-5-chlorobenzoic acid esters, the same product is obtained:

2-hydroxy-5-chlorobenzoic acid methyl ester, 2-hydroxy-5-chlorobenzoic acid ethyl ester, 2-hydroxy-5-chlorobenzoic acid tert. butyl ester, 2-hydroxy-5-chlorobenzoic acid-4'-chlorophenylester, 2-hydroxy-5-chlorobenzoic acid-3'-methylphenyl ester, 2-hydroxy-5-chlorobenzoic acid benzyl ester.

EXAMPLE 3

2.3 g of metallic sodium are converted in 100 ml of anhydrous isopropanol into the sodium isopropylate, 9.5 g of acetamidine hydrochloride are added and then the mixture is reacted as described in example 1 with 10.5 g of 2-hydroxybenzoic acid phenyl ester. After recrystallization, the 2-(2'-hydroxyphenyl)-4,6-dimethyl-s-triazine so obtained melts at 133°.

By replacing in the aforesaid example the 2-hydroxybenzoic acid phenyl ester by the equivalent amount of 2-hydroxy-5-tert. butyl-, 2-hydroxy-3,5-dichloro-, 2-hydroxy-3-bromo-5-methyl-, 2-hydroxy-3-allyl-5-methyl-, 2-hydroxy-3-octen-2'-yl-, 2-hydroxy-5-(4'-methyl-cyclohexyl)-, 2-hydroxy-5-phenylethyl-, 2-hydroxy-5-p-ethyl-benzyl-, 2-hydroxy-5-p-bromobenzyl- or 2-hydroxy-5-m-chlorophenylethyl- benzoic acid phenyl ester and otherwise following the procedure described in the example, the following compounds are obtained:

2-(2'-hydroxy-5'-tert. butylphenyl)-4,6-dimethyl-s-triazine,
2-(2'-hydroxy-3',5'-dichlorophenyl)-4,6-dimethyl-s-triazine,
2-(2'-hydroxy-3'-bromo-5'-methylphenyl)-4,6-dimethyl-s-triazine,
2-(2'-hydroxy-3'-allyl-5'-methylphenyl)-4,6-dimethyl-s-triazine,
2-(2'-hydroxy-3'-octen-2''-ylphenyl)-4,6-dimethyl-s-triazine,
2-(2'-hydroxy-5'-(4''-methyl-cyclohexyl)phenyl)-4,6-dimethyl-s-triazine,
2-(2'-hydroxy-5'-phenylethylphenyl)-4,6-dimethyl-s-triazine,
2-(2'-hydroxy-5'-p-ethyl-benzylphenyl)-4,6-dimethyl-s-triazine,
2-(2'-hydroxy-5'-p-brom-benzylphenyl)-4,6-dimethyl-s-triazine,
2-(2'-hydroxy-5'-m-chlor-phenylethylphenyl)-4,6-dimethyl-s-triazine.

EXAMPLE 4

24 g of undecylic acid amidine hydrochloride

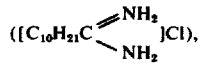

6 g of sodium methylate and 11 g of 2-hydroxybenzoic acid phenyl ester are reacted as described in example 1. The 2-(2'-hydroxyphenyl)-4,6-dodecyl-s-triazine so obtained melts at 53°.

By replacing in the aforesaid example the undecylic acid amidine hydrochloride by the equivalent amount of propanoic acid amidine hydrochloride, decanoic acid amidine hydrobromide, octadecanoic acid amidine hydrochloride, oleic acid amidine hydrochloride or ω-chloroundecanoic acid amidine hydrochloride and otherwise following the procedure given in the example, the following compounds are obtained:

2-(2'-hydroxyphenyl)-4,6-diethyl-s-triazine,
2-(2'-hydroxyphenyl)-4,6-dinonyl-s-triazine,
2-(2'-hydroxyphenyl)-4,6-diheptadecyl-s-triazine,
2-(2'-hydroxyphenyl)-4,6-diheptadecan-8''-yl-s-triazine,
2-(2'-hydroxyphenyl)-4,6-di-(ω-chlorodecyl)-s-triazine.

EXAMPLE 5

14 g of butanoic acid amidine hydrochloride

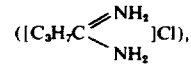

6.2 g of sodium methylate and 11 g of 2-hydroxybenzoic acid phenyl ester are reacted as in example 1 whereupon 2-(2'-hydroxyphenyl)-4,6-dipropyl-s-triazine is obtained as an oil. On distilling the latter at 0.02 mm pressure, the pure product is obtained which passes over at 130°–135°. It melts at 18°–20°.

By replacing in the aforesaid example the butanoic acid amidine hydrochloride by the equivalent amount of bromoethanoic acid amidine-, pentanoic acid amidine-, β-methoxypropanoic acid amidine-, β-methylmercapto-propanoic acid amidine-, β-dimethylamino-propanoic acid amidine-, formic acid amidine-, methoxycarbonyl-ethanoic acid amidine-, δ-dodecyloxycarbonyl-valeric acid amidine-, carboxyethanoic acid amidine-, ω-carboxynonanoic acid amidine- or β-bromo-propanoic acid amidine- hydrochloride and otherwise following the procedure given in the example, the following products are obtained:

2-(2'-hydroxyphenyl)-4,6-dibromomethyl-s-triazine,
2-(2'-hydroxyphenyl)-4,6-dibutyl-s-triazine,
2-(2'-hydroxyphenyl)-4,6-bis-β-methoxyethyl-s-triazine,
2-(2'-hydroxyphenyl)-4,6-bis-β-methylmercaptoethyl-s-triazine,
2-(2'-hydroxyphenyl)-4,6-bis-β-dimethylaminoethyl-s-triazine,
2-(2'-hydroxyphenyl)-s-triazine,
2-(2'-hydroxyphenyl)-4,6-bis-methoxycarbonylmethyl-s-triazine,
2-(2'-hydroxyphenyl)-4,6-bis-δ-dodecyloxycarbonylbutyl-s-triazine,
2-(2'-hydroxyphenyl)-4,6-bis-carboxymethyl-s-triazine,
2-(2'-hydroxyphenyl)-4,6-bis-ω-carboxy-octyl-s-triazine or
2-(2'-hydroxyphenyl)-4,6-bis-β-bromo-ethyl-s-triazine.

By reacting the last mentioned compound with an excess of potassium hydroxyde in n-butanol, the 2-(2'-hydroxyphenyl)-4,6-bis-vinyl-s-triazine is obtained.

EXAMPLE 6

17 g of cyclohexane carboxylic acid amidine hydrochloride, 5.7 g of sodium methylate and 11 g of 2-hydroxybenzoic acid phenyl ester are reacted as described in example 1. After recrystallization from ethanol, the 2-(2'-hydroxyphenyl)-4,6-dicyclohexyl-s-triazine obtained melts at 106°.

By replacing in the aforesaid example the cyclohexane carboxylic acid amidine hydrochloride by the equivalent amount of 4-methyl-cyclohexane carboxylic acid amidine hydrochloride and otherwise following the procedure given in the example, 2-(2'-hydroxyphenyl)-4,6-di-(4''-methylcyclohexyl)-s-triazine is obtained.

EXAMPLE 7

9.5 g of acetamidine hydrochloride, 2.3 g of metallic sodium, 100 ml of n-butanol and 13.6 g of 2-hydroxy-4-acetoxybenzoic acid phenyl ester are reacted under the conditions given in example 3. The 2-(2'-hydroxy-4'-acetoxyphenyl)-4,6-dimethyl-s-triazine obtained melts, after recrystallization from alcohol, at 138°.

The same product can be obtained more simply as follows:

3 g of 2-(2',4'-dihydroxyphenyl)-4,6-dimethyl-s-triazine (obtained from 2,4-dihydroxybenzoic acid phenyl ester and acetamidine) in 20 ml of acetic acid anhydride are refluxed for half an hour. The cooled reaction mixture is poured into water and the mixture obtained is stirred and cooled until the product crystallizes. After filtering off under suction and recrystallizing from ethanol, the product obtained has the same melting point as the 2-(2'-hydroxy-4'-acetoxyphenyl)-4,6-dimethyl-s-triazine described above and there is no depression of the melting point when it is mixed with that product.

By replacing in the aforesaid example the acetic acid anhydride by butanoic acid chloride, chloroformic acid methyl ester, chloroformic acid cyclohexylester, lauric acid chloride, maleic acid anhydride or the chlorides of the succinic acid monoethylester, ethyl-(1-methylpropenyl)-malonic acid monoethylester, maleic acid monomethylester of sebacic acid monoethylester and following the procedure given in the preceding paragraph, the following products are obtained:

2-(2'-hydroxy-4'-butyroyloxyphenyl)-4,6-dimethyl-s-triazine,
2-(2'-hydroxy-4'-methoxycarboxyphenyl)-4,6-dimethyl-s-triazine,
2-(2'-hydroxy-4'-cyclohexyloxycarboxyphenyl)-4,6-dimethyl-s-triazine,
2-(2'-hydroxy-4'-lauroyloxyphenyl)-4,6-dimethyl-s-triazine,
2-(2'-hydroxy-4'-β-carboxy-acryloyloxy-phenyl)-4,6-dimethyl-s-triazine,
2-(2'-hydroxy-4'-δ-carbethoxy-propionyloxy-phenyl)-4,6-dimethyl-s-triazine,
2-(2'-hydroxy-4'-α-carbethoxy-α-(1''-methyl-propenyl)-butyroyloxy-phenyl)-4,6-dimethyl-s-triazine,
2-(2'-hydroxy-4'-β-carbomethoxy-acryloyloxy-phenyl)-4,6-dimethyl-s-triazine or
2-(2'-hydroxy-4'-ω-carbomethoxy-pelargonyloxy-phenyl)-4,6-dimethyl-s-triazine.

EXAMPLE 8

4.0 g of β-phenyl-β-methyl-acrylic acid amidine hydrochloride (produced according to Pinner), 2.5 g of phenyl salicylate and 1.1 g of sodium methylate are reacted as described in example 1. The 2-(2'-hydroxyphenyl)-4,6-bis-(2''-phenyl-$\Delta^{1''}$-propenyl)-s-triazine obtained melts at 160° after recrystallization from methyl cellosolve.

By replacing in the aforesaid example the β-phenyl-β-methyl-acrylic acid amidine hydrochloride by an equivalent amount of β-p-chlorophenyl-β-methylacrylic acid amidine hydrochloride and proceeding otherwise in the same manner as described in said example, the 2-(2'-hydroxyphenyl)-4,6-bis-(2''-p-chloro-phenyl-$\Delta^{1''}$-propenyl)-s-triazine is obtained.

EXAMPLE 9

A solution of 5 g of 2-(2'-hydroxyphenyl)-4,6-dimethyl-s-triazine and 40 ml of benzaldehyde in 40 ml of methanol is mixed with 20 ml of a 10%-methanolic potassium hydroxide solution and the mixture is left to stand for 2 days. The product which crystallizes out is filtered off under suction, washed with methanol and recrystallized twice from methyl cellosolve. The 2-(2'-hydroxyphenyl)-4,6-bis-β-phenylvinyl-s-triazine so obtained melts at 179°.

EXAMPLE 10

By replacing the benzaldehyde used in example 9 by an equimolar amount of m-methylbenzaldehyde, p-butyl-benzaldehyde, o-bromobenzaldehyde or m-ethoxybenzaldehyde and proceeding otherwise in the same manner as described in said example, the 2-(2'-hydroxyphenyl)-4,6-bis-β-(3''-methylphenyl)-vinyl-s-triazine,
2(2'-hydroxyphenyl)-4,6-bis-β-(4''-butylphenyl)-vinyl-s-triazine,
2-(2'-hydroxyphenyl)-4,6-bis-β-(2''-bromophenyl)-vinyl-s-triazine or
2-(2'-hydroxyphenyl)-4,6-bis-β-(3''-ethoxyphenyl)-vinyl-s-triazine is obtained.

EXAMPLE 11

5 g of the s-triazine mentioned in example 9 in 60 ml of dioxan are hydrogenated, using 3 g of Raney nickel as catalyst, at room temperature and atmospheric pressure until no more hydrogen is taken up. The catalyst is removed from the solution by filtration and the filtrate is concentrated in vacuo. The distillation residue is recrystallized twice from alcohol whereupon 2-(2'-hydroxyphenyl)-4,6-bis-β-phenylethyl-s-triazine is obtained as a white powder, M.P. 81°-82°. The same product is also obtained by reacting β-phenylpropionic acid amidine hydrochloride and phenyl salicylate under the conditions given in example 1.

EXAMPLE 12

14 g of chloroacetamidine hydrochloride, 6 g of sodium methylate and 11 g of 2-hydroxy-benzoic acid phenyl ester are reacted together as described in example 1, whereby 2-(2'-hydroxyphenyl)-4,6-dichloromethyl-s-triazine is obtained. By reacting the latter s-triazine with an excess of ammonia, potassium hydroxyde, sodium octylate ($C_8H_{17}ONa$), sodium octyl mercaptide ($C_8H_{17}SNa$) or hexylamine in acetone, 2-(2'-hydroxyphenyl)-4,6-di-aminomethyl-s-triazine,
2-(2'-hydroxyphenyl)-4,6-di-hydroxymethyl-s-triazine,
2-(2'-hydroxyphenyl)-4,6-di-octyloxymethyl-s-triazine,
2-(2'-hydroxyphenyl)-4,6-di-octylthiomethyl-s-triazine,
2-(2'-hydroxyphenyl)-4,6-di-N-hexylaminomethyl-s-triazine is obtained.

EXAMPLE 13

33 g of ω-bromo undecanoic acid amidine hydrochloride, 6 g of dry sodium methylate and 11 g of 2-hydroxy benzoic acid phenylester are reacted together as described in example 1, whereby 2-(2'-hydroxyphenyl)-4,6-di-ω-bromodecyl-s-triazine is obtained. By reacting the latter s-triazine with an excess of ammonia, potassium hydroxide, sodium ethylate, sodium ethyl mercaptide, methylamine or dibutylamine in acetone, 2-(2'-hydroxyphenyl)-4,6-di-ω-amino-decyl-s-triazine,
2-(2'-hydroxyphenyl)-4,6-di-ω-hydroxy-decyl-s-triazine,
2-(2'-hydroxyphenyl)-4,6-di-ω-ethoxy-decyl-s-triazine,
2-(2'-hydroxyphenyl)-4,6-di-ω-ethylthio-decyl-s-triazine,
2-(2'-hydroxyphenyl)-4,6-di-ω-methylamino-decyl-s-triazine or
2-(2'-hydroxyphenyl)-4,6-di-ω-dibutylamino-decyl-s-triazine is obtained.

EXAMPLE 14

2.1 g of 2-(2',4'-dihydroxyphenyl)-4,6-dimethyl-s-triazine, 0.4 g of sodium hydroxide, 1 g of chloroformic acid methyl ester and 10 ml of water are mixed together at room temperature. After 4 hours, the reaction mixture is poured on water and the 2-(2'-hydroxy-4'methoxycarbonyloxy-phenyl)-4,6-dimethyl-s-triazine which has separated out is collected and recrystallized from hot ethanol. It melts at 122°.

By replacing in the aforesaid example the chloroformic acid methyl ester by an equivalent amount of the lauryl, cyclohexyl, benzyl or phenyl ester of chloroformic acid or the mono-chloride of sebacic, succinic or ethyl 1-methyl-propenyl malonic acid and otherwise following the procedure described in the example, 2-(2'-hydroxy-4'-dodecyloxycarbonyloxy-phenyl)-4,6-dimethyl-s-triazine,
2-(2'-hydroxy-4'-cyclohexyloxycarbonyloxy-phenyl)-4,6-dimethyl-s-triazine,
2-(2'-hydroxy-4'-benzyloxycarbonyloxy-phenyl)-4,6-dimethyl-s-triazine,
2-(2'-hydroxy-4'-phenoxycarbonyloxy-phenyl)-4,6-dimethyl-s-triazine,
2-(2'-hydroxy-4'-ω-carboxy-pelargonyloxy-phenyl)-4,6-dimethyl-s-triazine,
2-(2'-hydroxy-4'-ω-carboxy-propionyloxy-phenyl)-4,6-dimethyl-s-triazine or
2-(2'-hydroxy-4'-α-carboxy-α-(1''-methylpropenyl)-butyroyloxy-phenyl)-4,6-dimethyl-s-triazine is obtained.

EXAMPLE 15

2.1 g of 2-(2',4'-dihydroxyphenyl)-4,6-diethyl-s-triazine, 0.4 g of sodium hydroxide, 1 g of acryloylchloride and 10 ml of water are reacted together as described in example 14, whereby 2-(2'-hydroxy-4'-acryloyloxyphenyl)-4,6-diethyl-s-triazine is obtained.

By replacing in the aforesaid example the acryloyl chloride by the equivalent amount of oleic acid chloride and otherwise following the procedure described in the example, 2-(2'-hydroxy-4'-oleyloxy-phenyl)-4,6-diethyl-s-triazine is obtained.

EXAMPLE 16

A solution of 15 g of acetyl cellulose having on the average 2.5 acyloxy groups per glucose unit and 0.3 g of one of the UV absorbers given in the following Table I, 2.0 g of dibutyl phthalate and 82.7 g of acetone are painted to form a film on a glass plate. The cellulose acetate films obtained, after evaporation of the acetone, which are dried first at room temperature and then in an oven at 60°, are 0.04 mm thick. Samples of these films are exposed in a fadeometer for 1000 hours and then their brittleness is tested. The results are summarised in Table I:

Table I

| No. | UV absorber | behavior of film on folding before 1000 hours' exposure | after 1000 hours' exposure |
|---|---|---|---|
| I | 2-(2'-hydroxyphenyl)-4,6-dimethyl-s-triazine | can be folded | unchanged |
| II | 2-(2'-hydroxy-5'-methyl-phenyl)-4,6-dimethyl-s-triazine | do | do |
| III | 2-(hydroxyphenyl)-4,6-di-decyl-s-triazine | do | do |
| IV | 2-(2'-hydroxyphenyl)-4,6-dicyclohexyl-s-triazine | do | do |
| V | without UV absorber | do | breaks |

The results given in Table I show that acetyl cellulose films stabilised according to the invention have considerably better mechanical properties after exposure than untreated films.

Films made from cellulose triacetate, cellulose tripropionate and cellulose acetobutyrate can be stabilised against the effect of light in the same way.

EXAMPLE 17

Difficultly combustible liquid polyester resin, after the addition of 0.5% by weight of 2-(2'-hydroxy-4'-acetoxyphenyl)-4,6-dimethyl-s-triazine, is polymerised with 1% by weight of benzoyl peroxide at 80° to form sheets about 2.5 mm thick. Afterwards the sheets are cured at 120°.

The sheets so produced and exposed show a much less brown colouration than similarly exposed sheets which, however, have been produced without the addition of the additive mentioned above. After an exposure of 500 hours in the fadeometer, the stabilised sheet has a transmission of 83% of light at 500 mμ (transmission before exposure 88%) whilst an unstabilised sheet having the same transmission before exposure, after exposure has a transmission of only 73% of light at 500 mμ.

The polyester resin used is produced as follows: A mixture of 343 g of maleic acid anhydride and 428 g of tetrachlorophthalic acid anhydride is added at 80° in portions to a mixture of 170 g of ethylene glycol and 292 g of diethylene glycol. After replacing the air in the reaction vessel by nitrogen, the temperature is raised within 1 hour to 150° and then within 9 hours to 210° and is so maintained for 1 hour. The mass is then cooled to 180°, vacuum is applied and the pressure is slowly reduced to 100 mm. These conditions are maintained until the acid number of the reaction mixture has sunk to below 50.

100 g of the polyester so obtained are mixed with 50g of styrene and the mixture is polymerised under the conditions given above.

Similar results are obtained if, instead of the tetrachlorophthalic acid, the equivalent amount of phthalic acid anhydride is used. In this case, however, the resultant polyester resin is not difficultly combustible.

If, in the above method, the styrene is replaced by methyl methacrylate, sheets are obtained which have a slighter tendency to turn brownish but which are also easier to stabilise.

EXAMPLE 18

100 Parts of methacrylic acid methyl ester, 0.2 parts of 2-(2'-hydroxy-5'-chlorophenyl)-4,6-dimethyl-s-triazine and 0.2 parts of lauroyl peroxide are mixed and polymerised at a temperature of 50°–70° into sheets of 2 mm thickness.

As can be seen from the following Table, such sheets can be used as colourless UV filters.

Table II

| No. | UV absorber | % transmission of light of wavelength at | |
|---|---|---|---|
| | | 380 mµ | 450 mµ |
| 0 | without UV absorber | 90 | 92 |
| 1 | 2-(2'-hydroxy-5'-chlorophenyl)-4,6-dimethyl-s-triazine | 2 | 92 |

Corresponding results are obtained if, in 2 cm thick sheets, the concentration of UV absorber is reduced to 0.02%.

EXAMPLE 19

A mixture of 660 g of pulverulent emulsion polyvinyl chloride (K value 72, bulk density 0.42), 330 g of dioctyl phthalate and 10 g of 2-(2'-hydroxyphenyl)-4,6-diethyl-s-triazine are worked up on a two-roll mill at 150° into films.

On exposing films so produced, brown spots occur after a 1.5 to 2 times longer period than they occur on similar films produced without the addition of 2-(2'-hydroxyphenyl)-4,6-dibenzyl-s-triazine.

Similar results are obtained if polyvinyl chloride having a K value of 74 and bulk density of 0.46 is used.

The addition of 10 g of barium-cadmium laurate to the mixture described in the first paragraph of this example produces films which are stabilised both to heat and light.

EXAMPLE 20

Polyethylene of medium molecular weight of 28,000 and a density of 0.917 is mixed in a Brabender plastograph with 1% of its total weight of 2-(2'-hydroxyphenyl)-4,6-dinonyl-s-triazine at 180°. The mass so obtained is pressed in a platen press at 165° into 1 mm thick sheets.

The sheets obtained have considerably less tendency to brittleness on weathering than those produced without the addition of the triazine derivative mentioned.

Similar results are obtained if, instead of the polyethylene, polypropylene is used but then mixing must be performed at 220° and pressing at 180°.

EXAMPLE 21

100 Parts of granulated polycaprolactam (GRILON, Emserwerke AG, Domat-Ems, Switzerland) and 1 part of 2-(2'-hydroxyphenyl)-4,6-dipropyl-s-triazine are melted together at 255° in an autoclave having a die in the floor, while excluding air. The melt is pressed by nitrogen pressure through the die.

The homogeneous mass so obtained absorbs UV light and serves for the production of UV dense packing material.

The polymerisation of 100 parts of caprolactam in the presence of 1 part of 2-(2'-hydroxyphenyl)-4,6-dipropyl-s-triazine by the usual methods gives a polymer of similar properties.

If, instead of the polycaprolactam, polyhexamethylene adipamide is used, then a UV dense material is also obtained by the same method.

EXAMPLE 22

Bleached maple veneer is painted with a lacquer of the following composition:

15.0 parts of cellulose acetate CELLIT F 900 of Bayer, Leverkusen, Germany, having about 56% content of acetic acid, 10.0 parts of dimethyl glycol phthalate, 2.25 parts of 2-(2'-hydroxyphenyl)-4,6-dipropyl-s-triazine, (corresponding to 15% by weight calculated on the cellulose acetate), 5.0 parts of methyl alcohol, 10.0 parts of toluene, and 50.0 parts of ethyl acetate.

The natural yellowing of the wood is greatly retarded by this lacquer.

PART II

In a second aspect the present invention concerns a further class of new o-hydroxyphenyl-s-triazines, a process for the production thereof, their use for the stabilizing of certain light-sensitive organic materials and for the production of light filters of higher molecular absorption other than those obtained with the UV absorbers according to the invention described in Part I, and, as industrial product, the organic materials stabilized with the aid of the new o-hydroxyphenyl-s-triazines as well as light filters containing these triazines.

It has been found that valuable UV absorbers according to the second aspect of the invention are obtained by reacting equimolar amounts of an amidine of the formula

 (I)

and an amidine of the formula

 (II)

in which formulas

X and Y independently of each other represent hydrogen or, an alkyl, alkenyl, cycloalkyl or aralkenyl group, which groups may be substituted with an equimolar amount of an o-hydroxybenzene carboxylic acid ester of the formula

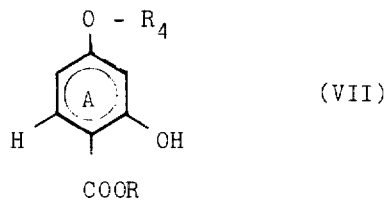

wherein

R₄ represents hydrogen or an alkyl, alkenyl or aralkyl group which may be substituted, and R represents a hydrocarbon radical which may be substituted, and the benzene ring A is optionally further substituted in the 3- and 5- positions by alkyl or alkenyl groups each having 1 to 10 carbon atoms, and/or by halogen atoms, especially chlorine or bromine, to form a compound of the formula

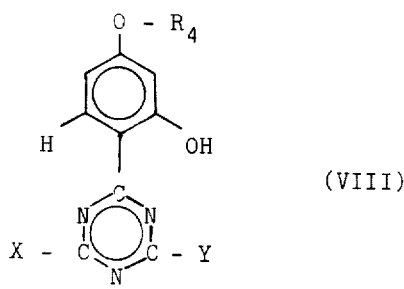

wherein

X and Y have the meanings given in formulas (I) and (II), and

R₄ and A have the meanings given in formula (VII).

In the formulas I, II and VIII, the alkyl groups symbolized by X and Y have, for example, 1 to 18 carbon atoms. Examples are the methyl, ethyl, propyl, isopropyl, butyl, tert. butyl, amyl, hexyl, octyl, decyl, dodecyl, tetradecyl, hexadecyl or octadecyl group; of these, alkyl groups having 1 to 10 carbon atoms are preferred. The alkyl groups may be further substituted in which case, for example, they may have, among others, the formula -alkylene-E-D₁. In this formula, "alkylene" represents a divalent aliphatic radical having in particular 1 to 12, preferably 1 to 4 carbon atoms, and E represents either —O— or —S— or —N(D₂)—.

Each of D₁ and D₂ independently represents an alkyl radical preferably containing 1 to 8 carbon atoms and each also represents hydrogen if E is oxygen or nitrogen. Suitable groups of the formula -alkylene-E-D₁ are, for example, the ω-hydroxyalkyl, ω-alkoxyalkyl, ω-alkylthioalkyl, ω-aminoalkyl groups such as the hydroxymethyl, 2-hydroxyethyl, 2-methoxyethyl, 2-ethoxyethyl, 2-butoxyethyl, 2-methylthioethyl, 2-butylthioethyl, 2-dodecylthioethyl, 2-N,N-dimethylaminoethyl, 2-N,N-diethylaminoethyl or the ω-aminodecyl group.

Each of X and Y can also be a halogenoalkyl group preferably containing 1 to 4 carbon atoms such as the chloromethyl, bromomethyl, 2-chloroethyl or 4-chlorobutyl group. As alkenyl group X or Y represent, e.g. the vinyl group, the Δ¹- or Δ²-propyl or the Δ⁸-heptadecenyl group, of which the low alkenyl groups having 2 to 6 carbon atoms are preferred. It is possible for the alkenyl groups to be substituted by aryl groups; then they represent e.g. the β-phenylvinyl(=styryl)-group or the β-methyl-β-phenylvinyl group. As cycloalkyl groups, X or Y have 5 to 10, preferably, however, 6 to 7 carbon atoms. Examples are the cyclohexyl, methylcyclohexyl or ethylcyclohexyl group. Compounds in which X is the same as Y are particularly easily produced.

Alkyl groups symbolized by R₄ in formulas VII and VIII preferably have 1 to 12 carbon atoms; thus R₄ is, for example, the methyl, ethyl, propyl, butyl, amyl, hexyl, octyl, decyl or dodecyl group. The alkyl groups may be substituted if desired. Examples of alkyl substituents are halogens such as chlorine or bromine, free or etherified hydroxyl or cyano groups as well as free or modified carboxylic acid ester, but also carboxylic acid amide groups are to be understood; in the latter case, carboxylic acid alkylamide groups, in particular those having a tertiary amide nitrogen atom, are preferred. Cyano and free or modified carboxyl groups can be at any C atom of the alkyl group whilst the halogens and the free or etherified hydroxyl groups are bound to a carbon atom of the alkyl group which is different from the α-carbon atom. Examples of further substituted alkyl groups R₄ are the 2-chloro- or 2-bromoethyl group, 2-hydroxyethyl, 4-hydroxybutyl, 2-methoxyethyl, 2-ethoxyethyl, 2-cyclohexyloxyethyl, 2-cyanoethyl, carboxymethyl, carbomethoxymethyl, carbethoxymethyl, carbodecyloxymethyl or the N,N-dimethylcarbmoylmethyl group. As alkenyl group, R₄ is in particular the Δ²-propenyl group which can be substituted by low alkyl groups. If R₄ is an aralkyl group then it contains 7 to 12, preferably 7 to 9, carbon atoms; examples are the benzyl or a methylbenzyl group. R in formula VII is an alkyl radical, which may be substituted, having 1 to 18, preferably 1 to 6, carbon atoms, e.g. the methyl, ethyl, methoxyethyl, ethoxyethyl, cyanomethyl or a carbalkoxyalkyl radical, particularly the carboxyethoxy, carbethoxy and carbopropoxy ethyl radical. Also, R₄ represents a cycloalkyl radical having 5 to 10, preferably 6 to 7, carbon atoms, particularly the cyclohexyl radical, or an aralkyl radical having 7 to 12 carbon atoms, mainly the benzyl radical. It is advantageous, however, if R₄ is a monocyclic aryl radical having 6 to 12, preferably 6 to 10 carbon atoms, such as the phenyl, a methylphenyl or a halogenophenyl radical.

It has further been found that particularly satisfactory results are obtained with the compounds of the formula

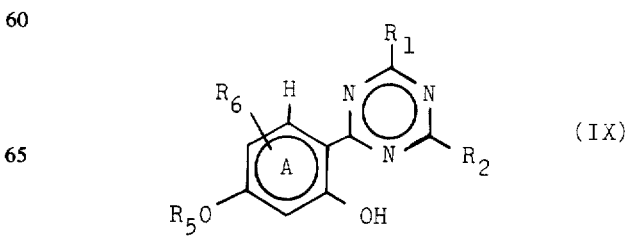

wherein
each of $R_1$ and $R_2$ represents hydrogen, alkyl of from 1 to 18 carbon atoms, amino-alkyl of 1 to 12 carbon atoms, hydroxy-alkyl of 1 to 12 carbon atoms, alkoxy-alkyl wherein the alkoxy moiety has from 1 to 8 carbon atoms and the alkyl moiety has from 1 to 12 carbon atoms, alkylthio-alkyl wherein the alkylthio moiety has from 1 to 8 carbon atoms and the alkyl moiety has from 1 to 12 carbon atoms, N-alkylamino-alkyl wherein the alkylamino moiety has from 1 to 8 carbon atoms and the alkyl moiety has from 1 to 12 carbon atoms, or N,N-di-(alkyl)-amino-alkyl wherein the N-alkyl groups have each from 1 to 8 carbon atoms, and the alkyl moiety bearing the amino group has from 1 to 12 carbon atoms, alkoxy-carbonyl-alkyl wherein the alkoxy moiety has from 1 to 8, and the alkyl moiety from 1 to 12 carbon atoms, carboxy-alkyl with a total of from 2 to 13 carbon atoms, chloro-alkyl of from 1 to 12 carbon atoms, bromo-alkyl of from 1 to 12 carbon atoms, cycloalkyl of from 5 to 10 carbon atoms, 5 to 6 of which are ring members, alkenyl of from 2 to 17 carbon atoms, phenylalkenyl of from 8 to 12 carbon atoms, alkyl-phenyl-alkenyl of from 9 to 12 carbon atoms, alkoxy-phenyl-alkenyl of from 9 to 12 carbon atoms, or chloro- or bromo-phenyl-alkenyl of from 8 to 12 carbon atoms, $R_5$ represents hydrogen, alkyl of from 1 to 12 carbon atoms, chloro-alkyl, bromo-alkyl and hydroxyalkyl, each of from 2 to 12 carbon atoms, alkoxy-alkyl of from 1 to 8 carbon atoms in the alkoxy moiety and from 2 to 4 carbon atoms in the alkyl moiety, cyclohexyloxy-alkyl of from 2 to 4 carbon atoms in the alkyl moiety, the heteroatom of the substituent in alkyl in the five last-mentioned members being removed by at least two carbon atoms from the —O— bridge in the above formula, cyano-alkyl of from 1 to 5 carbon atoms, in the alkyl moiety, carboxy-alkyl of from 2 to 6 carbon atoms, alkoxy-carbonyl-alkyl of 1 to 8 carbon atoms in the alkoxy moiety and from 1 to 5 carbon atoms in the alkyl moiety, N,N-di-(lower alkyl)-carbamyl-alkyl of from 1 to 5 carbon atoms in the last-mentioned alkyl moiety, alkenyl of from 3 to 8 carbon atoms, phenyl-alkyl of from 7 to 12 carbon atoms, or lower alkyl-phenyl-alkyl of from 1 to 5 carbon atoms in the last-mentioned alkyl moiety, and $R_6$ represents hydrogen, alkyl of from 1 to 10 carbon atoms, alkenyl of from 2 to 10 carbon atoms, chlorine or bromine.

The starting materials of formulas I, II and VII, some of which are known, can be produced by methods known per se. Amidines of the formulas I or II are obtained, for example, from nitriles of the formulas X—CN or Y—CN by conversion into corresponding iminoethers and reaction of the latter with ammonia; the o-hydroxy-benzene carboxylic acid esters of formula VII are obtained, for example, from the corresponding salicyclic acids by esterification. The salicylic acids are advantageously obtained by reacting the phenols of the formula

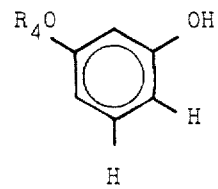

with carbon dioxide according to Kolbe whereby groups $R_4$ which are not hydrogen can be introduced before or after performing the Kolbe synthesis.

The reaction to form the o-hydroxyphenyl triazines is performed by heating the starting materials I, II and VII, preferably in about molar ratios. Advantageously, the reaction is performed in boiling organic solvents, particularly, when amidines having a high melting point are used. Suitable solvents are mainly alcohols such as methanol, ethanol, ethylene glycol monomethyl or monoethyl ether, or also dioxan.

If desired, any reactive substituents present in the new o-hydroxyphenyl-s-triazines can subsequently be altered. For example, if X or Y in formula VIII is an alkoxyalkyl group then this can be converted with hydrobromic acid into the corresponding bromoalkyl group. o-Hydroxyphenyl-s-triazines having halogenoalkyl side groups are produced advantageously by this method. Exchangeable halogen can also be replaced by reaction with aqueous sodium hydroxide solution, with alkali alcoholates or alkali phenolates, with ammonia, primary or secondary amines, by the hydroxyl group or by an ether group or by an amino group; if the o-hydroxyphenyl-s-triazines contain alcoholic or phenolic hydroxyl groups, these can be esterified or etherified.

In particular, the o-hydroxyphenyl-s-triazines in which $R_4$ is an alkyl, alkenyl or aralkyl group which may be substituted are obtained by etherifying the corresponding triazines having a free hydroxyl group. Suitable etherification agents are esters of strong acids such as hydrochloric, hydrobromic, hydroiodic acid, sulfuric acid or p-toluene sulfonic acid, with the corresponding alkyl, alkenyl or aralkyl alcohols. Compounds of formula VIII, in which X or Y is an alkenyl radical are produced advantageously from corresponding compounds in which X or Y is a halogenoalkyl, hydroxyalkyl, alkoxyalkyl or aminoalkyl radical by removal of halogen hydracid or splitting off of water or alcohol or amine, optionally after modification into quaternary ammonium salts, by the methods usual in organic chemistry. Such triazines having unsaturated side chains can also be produced by reacting simple alkyl triazines, particularly methyl triazines, with aldehydes while splitting off water.

The new o-hydroxyphenyl-s-triazines are distinguished by excellent fastness to light in polymeric carriers and have high molar extinction in the region of 290–350 m$\mu$ which has a favorable influence on the protective action. Compounds which contain double bonds in the side chains which are in conjugation with the triazine ring, i.e. those in which X and/or Y is/are a $\Delta^1$-alkenyl or $\Delta^1$-aralkenyl group, particularly a $\beta$-phenylvinyl group, are distinguished by particularly high absorption power. In general, however, they are somewhat less fast to light than compounds which do not contain such conjugated double bonds in the side chains. Compared with previously known compounds of similar constitution, with comparable solubility and light fastness the new triazines are distinguished by a less yellow coloration and, with comparable yellow coloration they are distinguished by better solubility in organic solvents and in polymers. This is important in two respects: the use of UV absorbers is to hinder, among other things, the photochemical discoloration, particularly of the colorless substrata such as polystyrene or polymethyl methacrylate. However, if the UV absorber has a yellow color of its own, the substratum to be protected is already discolored from the beginning so that in this connection the action of the UV absorber is illusory; in addition, better solubility with, at the same time, comparable inherent color of the UV absorber is of great importance in their application and in the production of very thin light filters.

Those compounds of formula IX are particularly advantageous in which the sum of the carbon atoms in $R_1$, $R_2$, $R_5$ and $R_6$ is greater than three but smaller than 25, and within this subclass, compounds of the formula

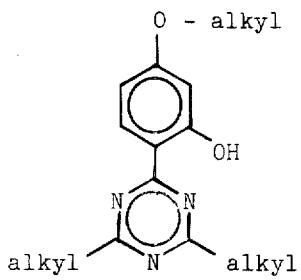

(X)

wherein the sum of the carbon atoms of all three alkyl groups ranges from 5 to 25 and the number of carbon atoms of each alkyl does not exceed 18, afford an optimal compromise of solubility of polyolefines, absorptivity and accessibility, while being practically colorless.

The same carrier materials including substrates to be stabilized against deterioration by ultraviolet light can be employed for incorporation of, and/or protected by the light-stabilizing compounds according to this second aspect of the invention as have been enumerated hereinbefore as useful in combination with the compounds according to the first aspect of the invention, taking, however, into account the differences in properties between the two classes of new light stabilizers which are more closely defined by Formulas IV and V, regarding the first aspect, and Formulas VIII and IX, regarding the second aspect of this invention.

New compositions of light-stabilized polymeric materials in which compounds falling under Formulas VIII or IX are the light-stabilizing ingredients, are produced in the same manner as described under the first aspect of this invention with regard to the incorporation of compounds falling under Formulas IV and V, supra, into the various carriers, listed under the first aspect of the invention.

Thus, what has been said there about the incorporation of light-stabilizing compounds having reactive groupings into polymer melts or monomer mixtures being polymerized, applies equally to the compounds falling under the second aspect of the invention.

Likewise, protective coatings and covers containing compounds falling under Formulas VIII and IX as UV-absorbers can be produced and employed in the same general manner as described under the first aspect of the invention.

The compounds of Formula IX can be used in substantially lower concentration than the comparably substituted compounds of Formula IV in order to achieve the same absorption in the range of 330 to 350 mμ.

The new o-hydroxyphenyl-s-triazines of Formula VIII are incorporated into the light-sensitive carriers or polymeric carriers for light filters in amounts of 0.01 to 30%. The amount of triazine to be used depends, among other things, on the thickness of the light filter to be produced. For very thin layers, such as for lacquer coatings, amounts of 1 to 20% are preferred, for thick layers such as in polymethacrylate sheets on the other hand, amounts of 0.01 to 1% are preferred.

The following examples are used to illustrate the second aspect of the invention. The scales used for temperature and magnitudes in these examples and in those illustrating subsequent aspects of this invention, are the same as those used in the examples illustrating Part I.

EXAMPLE 23

9.5 g of acetamidine hydrochloride are added in portions to a solution of 5.5 g of dry sodium methylate in 50 ml of anhydrous ethanol, whereby the former is converted into the free amidine. The suspension of sodium chloride in the acetamidine solution so obtained is stirred for 1 hour at room temperature. 10.5 g of 2,4-dihydroxybenzoic acid phenyl ester are then added to this suspension and the mixture is refluxed for 8 hours while stirring well. After cooling, water is added to the reaction mixture until the sodium chloride has dissolved and the reaction product has separated out. The 2-(2′,4′-dihydroxyphenyl)-4,6-dimethyl-s-triazine so obtained is filtered off under suction, dried and recrystallized from n-butanol. It then melts at 277°.

The product described above is also obtained by replacing in the aforesaid example the 2,4-dihydroxybenzoic acid phenyl ester by the corresponding methyl, ethyl, benzyl, cyanomethyl, m-tolyl or p-chlorophenyl ester.

EXAMPLE 24

21 g of capric acid amidine hydrochloride (decanoic acid amidine hydrochloride) are added to a solution of 2.5 g of metallic sodium in 100 ml of isopropanol. The suspension of sodium chloride in the amidine solution obtained is then stirred for 1 hour at room temperature and 11.5 g of 2,4-dihydroxybenzoic acid phenyl ester are added. The resultant mixture is heated for 10 hours on a boiling water bath and then poured into water. The 2-(2′,4′-dihydroxyphenyl)-4,6-dinonyl-s-triazine which is precipitated is filtered off under suction, dried and recrystallized from a mixture of methanol and water. It then melts at 79°.

By replacing in the aforesaid example the capric acid amidine hydrochloride by equimolar amounts of the amidine hydrochlorides of cyclohexyl-methanoic acid, chloro acetic acid, undecanoic acid, ω-chloro undecanoic acid, octa-decanoic acid, 3′-methylcyclohexylmethanoic acid or ω-bromo propanoic acid and otherwise following the same procedure as described in the example, the following products are obtained:

2-(2′,4′-dihydroxyphenyl)-4,6-dicyclohexyl-s-triazine, 2-(2',4'-dihydroxyphenyl)-4,6-dichloromethyl-s-triazine,
2-(2',4'-dihydroxyphenyl)-4,6-didecyl-s-triazine,
2-(2',4'-dihydroxyphenyl)-4,6-di-ω-chlorodecyl-s-triazine,
2-(2',4'-dihydroxyphenyl)-4,6-diheptadecyl-s-triazine,
2-(2',4'-dihydroxyphenyl)-4,6-di-3'-methylcyclohexyl-s-triazine or
2-(2',4'-dihydroxyphenyl)-4,6-di-β-bromoethyl-s-triazine.

By reacting the latter s-triazine with an excess of potassium hydroxyde in n-butanol, 2-(2',4'-dihydroxyphenyl)-4,6-divinyl-s-triazine is obtained.

EXAMPLE 25

16 g of β-methylmercapto-propionic acid amidine hydrochloride (produced by Pinner's method from β-methylmercapto-propionic acid nitrile) are converted with 5.6 g of sodium methylate as described in example 23 into the free amidine and this is condensed with 11.5 g of 2,4-dihydroxybenzoic acid phenyl ester. After recrystallization from ligroin, the 2-(2',4'-dihydroxyphenyl)-4,6-bis(β-methylmercaptoethyl)-s-triazine so obtained melts at 124°.

By replacing in the procedure given in the above example, the β-methylmercapto-propionic acid amidine hydrochloride by equimolar amounts of β-methoxypropionic acid-, β-dimethylaminopropionic acid-, formic acid-, ω-carboxynonanoic acid-, ω-methoxy-carbonyl nonanoic acid-, oleic acid- or carboxyacetamidine hydrochloride, the following compounds are obtained:

2-(2',4'-dihydroxyphenyl)-4,6-bis-(β-methoxyethyl)-s-triazine,
2-(2',4'-dihydroxyphenyl)-4,6-bis-(β-dimethylaminoethyl)-s-triazine,
2-(2',4'-dihydroxyphenyl)-s-triazine,
2-(2',4'-dihydroxyphenyl)-4,6-bis-(ω-carboxyoctyl)-s-triazine,
2-(2',4'-dihydroxyphenyl)-4,6-bis-(ω-methoxycarbonyloctyl)-s-triazine,
2-(2',4'-dihydroxyphenyl)-4,6-bis-(heptadecen-8''-yl)-s-triazine or
2-(2',4'-dihydroxyphenyl)-4,6-bis-(carboxymethyl)-s-triazine, the latter of which, on esterifying with methanol or octanol and hydrochloric acid produces
2-(2',4'-dihydroxyphenyl)-4,6-bis-(methoxycarbonylmethyl)-s-triazine or
2-(2',4'-dihydroxyphenyl)-4,6-bis-(octoxycarbonylmethyl)-s-triazine.

EXAMPLE 26

14 g of butyric acid amidine hydrochloride, 6.2 g of sodium methylate and 13 g of 2-hydroxy-4-ethoxybenzoic acid phenyl ester are reacted according to example 23. After recrystallization from a mixture of alcohol and water, the 2-(2'-hydroxy-4'-ethoxyphenyl)-4,6-dipropyl-s-triazine formed melts at 55°.

The same product is also obtained on etherification of 2-(2',4'-dihydroxyphenyl)-4,6-dipropyl-s-triazine in the following way: 6 g of 2-(2',4'-dihydroxyphenyl)-4,6-dipropyl-s-triazine (M.P. 118°, produced analogously to example 23 from butyric acid amidine hydrochloride and 2,4-dihydroxybenzoic acid phenyl ester) are dissolved in a solution of 1.2 g of sodium methylate in 30 ml of n-butanol. 2.4 g of ethyl bromide are added to this solution and the whole is refluxed for 4 hours. Sodium bromide is removed from the reaction mixture by filtration and the latter is diluted with a maximum of methanol and water in a volume ratio of 1:1 until the reaction product separates out. It proves to be identical to the 2-(2'-hydroxy-4'-ethoxyphenyl)-4,6-dipropyl-s-triazine described above.

By replacing in the aforesaid example the ethyl bromide by the equivalent amount of 1,2-di-bromo ethane, 1,2-dichloro ethane, 1,10-dibromo decane, ω-bromo decanol, 2-bromo ethanol, ω-hexyloxybutyl bromide, 2-phenyl ethylbromide or the mixture of bromides which is obtained by bromination of octen-1 with N-bromo succinimide,
2-(2'-hydroxy-4'-β-bromoethoxyphenyl)-4,6-dimethyl-s-triazine,
2-(2'-hydroxy-4'-β-chloroethoxyphenyl)-4,6-dimethyl-s-triazine,
2-(2'-hydroxy-4'-ω-bromodecyloxyphenyl)-4,6-dimethyl-s-triazine,
2-(2'-hydroxy-4'-ω-hydroxydecyloxyphenyl)-4,6-dimethyl-s-triazine,
2-(2'-hydroxy-4'-β-hydroxyethoxyphenyl)-4,6-dimethyl-s-triazine,
2-(2'-hydroxy-4'-ω-hexyloxybutoxyphenyl)-4,6-dimethyl-s-triazine,
2-(2'-hydroxy-4'-β-phenylethoxyphenyl)-4,6-dimethyl-s-triazine or a mixture of
2-(2'-hydroxy-4'-octen-2''-yloxyphenyl)-4,6-dimethyl-s-triazine and
2-(2'-hydroxy-4'-α-vinyl-hexyloxyphenyl)-4,6-dimethyl-s-triazine is obtained.

EXAMPLE 27

8 g of 2-(2',4'-dihydroxyphenyl)-4,6-dimethyl-s-triazine, (M.P. 277°) are added to a mixture of 2.2 g of sodium methylate, 0.5 g of sodium iodide and 60 ml of acetone. After stirring for 10 minutes, 3.2 g of allyl chloride are added and the whole is refluxed for 4 hours. After cooling, water is added to the reaction mixture and it is made weakly acid. The reaction product is filtered off under suction, washed with water, dried and recrystallized from alcohol. The 2-(2'-hydroxy-4'-allyloxyphenyl)-4,6-dimethyl-s-triazine so obtained melts at 110°.

By replacing in the aforesaid example the allyl chloride by an equivalent amount of benzyl chloride, methyl iodide, decyl bromide, β-methoxyethyl bromide, p-ethyl benzyl chloride, β-cyclohexyloxy ethyl bromide, β-cyano ethyl bromide, α-bromo capronic acid hexyl ester, α-bromo capronic acid N,N-dimethyl amide or the sodium salt of chloroacetic acid, α-bromo capronic acid or by chloroacetic acid ethyl ester, then
2-(2'-hydroxy-4'-benzyloxyphenyl)-4,6-dimethyl-s-triazine,
2-(2'-hydroxy-4'-methoxyphenyl)-4,6-dimethyl-s-triazine,
2-(2'-hydroxy-4'-decyloxyphenyl)-4,6-dimethyl-s-triazine,
2-(2'-hydroxy-4'-β-methoxyethoxyphenyl)-4,6-dimethyl-s-triazine,
2-(2'-hydroxy-4'-p-ethylbenzyloxyphenyl)-4,6-dimethyl-s-triazine,
2-(2'-hydroxy-4'-β-cyclohexyloxyethoxyphenyl)-4,6-dimethyl-s-triazine, 2-(2'-hydroxy-4'-β-cyanoethoxyphenyl)-4,6-dimethyl-s-triazine, 2-(2'-hydroxy-4'-α-hexyloxycarbonyl-pentoxyphenyl)-4,6-dimethyl-s-triazine, 2-(2'-hydroxy-4'-α-N,N-dimethylcarbamyl-pentoxyphenyl)-4,6-dimethyl-s-triazine, 2-(2'-hydroxy-4'-carboxymethoxyphenyl)-4,6-dimethyl-s-triazine, 2-(2'-hydroxy-4'-α-carboxypentyloxyphenyl)-4,6-dimethyl-s-triazine or 2-(2'-hydroxy-4'-carbethoxymethoxyphenyl)-4,6-dimethyl-s-triazine is obtained.

EXAMPLE 28

12 g of 2-hydroxy-4-methoxybenzoic acid phenyl ester, 17 g of cyclohexane carboxylic acid amidine hydrochloride and 5.8 g of sodium methylate in 100 ml of anhydrous ethanol are reacted as described in example 23. 50 ml of water are added to the reaction mixture, the product which crystallizes out is filtered off under suction, well washed with water and, after drying, recrystallized twice from alcohol. The 2-(2'-hydroxy-4'-methoxyphenyl)-4,6-bis-cyclohexyl-s-triazine so obtained melts at 128°.

By replacing in the aforesaid example the cyclohexane carboxylic acid amidine hydrochloride by the equivalent amount of cinnamic acid amidine hydrochloride, 2-(2'-hydroxy-4'-methoxyphenyl)-4,6-bis-β-phenylvinyl-s-triazine is obtained. This is also obtained by reacting 2-(2'-hydroxy-4'-methoxyphenyl)-4,6-dimethyl-s-triazine with benzaldehyde using methanolic potassium hydroxide solution as condensing agent.

By replacing in the aforesaid example the benzaldehyde by p-ethyl benzaldehyde, m-ethoxy benzaldehyde, o-chloro benzaldehyde or p-bromo benzaldehyde 2-(2'-hydroxy-4'-methoxyphenyl)-4,6-bis-β-p-ethylphenylvinyl-s-triazine, 2-(2'-hydroxy-4'-methoxyphenyl)-4,6-bis-β-m-ethoxyphenylvinyl-s-triazine, 2-(2'-hydroxy-4'-methoxyphenyl)-4,6-bis-β-o-chlorophenylvinyl-s-triazine or 2-(2'-hydroxy-4'-methoxyphenyl)-4,6-bis-β-p-bromophenylvinyl-s-triazine is obtained.

EXAMPLE 29

12.9 g of 2-hydroxy-4-ethoxybenzoic acid phenyl ester and 16.8 g of valeric acid amidine hydrochloride are reacted as described in example 24 in a solution of 2.6 g sodium metal in 100 ml of isopropanol. In this way, after recrystallization from methanol/water, 2-(2'-hydroxy-4'-ethoxyphenyl)-4,6-dibutyl-s-triazine is obtained. It melts at 43°.

By replacing in the aforesaid example the 2-hydroxy-4-ethoxybenzoic acid phenyl ester by the equivalent amount of 2,4-dihydroxy-3-methylbenzoic acid phenyl ester, 2,4-dihydroxy-5-tert.butylbenzoic acid phenyl ester, 2,4-dihydroxy-5-chlorobenzoic acid phenyl ester, 2,4-dihydroxy-5-bromobenzoic acid phenyl ester or 2,4-dihydroxy-5-allylbenzoic acid phenyl ester, 2-(2',4'-dihydroxy-3'-methylphenyl)-4,6-dibutyl-s-triazine, 2-(2',4'-dihydroxy-5'-tert.butylphenyl)-4,6-dibutyl-s-triazine, 2-(2',4'-dihydroxy-5'-chlorophenyl)-4,6-dibutyl-s-triazine, 2-(2',4'-dihydroxy-5'-bromophenyl)-4,6-dibutyl-s-triazine or 2-(2',4'-dihydroxy-5'-allylphenyl)-4,6-dibutyl-s-triazine is obtained.

EXAMPLE 30

14 g of chloroacetamidine hydrochloride, 6 g of sodium methylate and 14 g of 2-hydroxy-4-methoxy benzoic acid phenyl ester are reacted together as described in example 23, whereby 2-(2'-hydroxy-4'-methoxyphenyl)-4,6-dichloromethyl-s-triazine is obtained. By reacting the latter s-triazine with an excess of ammonia, potassium hydroxide or hexylamine in methylethyl ketone, 2-(2'-hydroxy-4'-methoxyphenyl)-4,6-di-aminomethyl-s-triazine, 2-(2'-hydroxy-4'-methoxyphenyl)-4,6-di-hydroxymethyl-s-triazinee or 2-(2'-hydroxy-4'-methoxyphenyl)-4,6-di-N-hexylaminomethyl-s-triazine is obtained.

EXAMPLE 31

33 g of ω-bromo undecanoic acid amidine hydrochloride, 6 g of dry sodium methylate and 14 g of 2-hydroxy-4-methoxy benzoic acid phenyl ester are reacted together as described in example 23, whereby 2-(2'-hydroxy-4'-methoxyphenyl)-4,6-di-ω-bromodecyl-s-triazine is obtained. By reacting the latter s-triazine with an excess of ammonia, potassium hydroxide, sodium octylate ($C_8H_{17}ONa$), sodium octyl mercaptide ($C_8H_{17}SNa$), methylamine or dibutylamine in acetone, 2-(2'-hydroxy-4'-methoxyphenyl)-4,6-di-ω-amino-decyl-s-triazine, 2-(2'-hydroxy-4'-methoxyphenyl)-4,6-di-ω-hydroxy-decyl-s-triazine, 2-(2'-hydroxy-4'-methoxyphenyl)-4,6-di-ω-octyloxy-decyl-s-triazine, 2-(2'-hydroxy-4'-methoxyphenyl)-4,6-di-ω-octylthio-decyl-s-triazine, 2-(2'-hydroxy-4'-methoxyphenyl)-4,6-di-ω-methylamino-decyl-s-triazine or 2-(2'-hydroxy-4'-methoxyphenyl)-4,6-di-ω-dibutylamino-decyl-s-triazine is obtained.

EXAMPLE 32

In contrast to films produced without UV absorbers, cellulose-2½-acetate films containing 1.7% of the UV absorbers given in the following Table 1 (calculated on the dry content of the films) have less mechanical brittleness after exposure. The results after exposure of 1000 hours in the fadeometer are summarised in Table 1.

Table 1

| No. | UV absorber | behaviour of films on folding before and after exposure | | |
|---|---|---|---|---|
| 1. | 2-(2'-hydroxy-4'-ethoxyphenyl)-4,6-dipropyl-s-triazine | can be folded | | can be folded |
| 2. | 2-(2',4'-dihydroxyphenyl)-4,6-bis-(methylmercaptoethyl)-s-triazine | can be folded | | can be folded |

Table 1—Continued

| No. | UV absorber | behaviour of films on folding before exposure | behaviour of films on folding after exposure |
|---|---|---|---|
| 3. | 2-(2'-hydroxy-4'-decyloxyphenyl)-4,6-dimethyl-s-triazine | can be folded | can be folded |
| 4. | 2-(2'-hydroxy-4'carbethoxymethoxyphenyl)-4,6-dimethyl-s-triazine | can be folded | can be folded |
| 5. | without | can be folded | brittle |

The films mentioned are produced as follows: Films are drawn from a solution of 15 g of acetyl cellulose (on the average 2½ of three hydroxy groups of a glucose unit are acetylated), 0.3 g of UV absorber and 2.0 g of dibutyl phthalate in 83 g of acetone in the usual way. The films are dried at room temperature and then at 60° and are then 0.04 mm thick.

EXAMPLE 33

Difficultly combustible liquid polyester resin, after the addition of 0.5% by weight of 2-(2',4'-dihydroxyphenyl)-4,6-dimethyl-s-triazine, is polymerised with 1% by weight of benzoyl peroxide at 80° to form sheets about 2.5 mm thick. Afterwards the sheets are cured at 120°.

On exposure, the sheets so produced show a much less brown colouration than sheets produced without the addition of the s-triazine derivative mentioned. After an exposure of 500 hours in the fadeometer, the stabilised sheet has a transmission of 84% (500 m$\mu$, transmission before exposure 88%). An unstabilised sheet having 88% transmission before exposure transmits only 73% of the light at 500 m$\mu$ after the same exposure time.

The polyester resin used is produced as follows: A mixture of 343 g of maleic acid anhydride and 428 g of tetrachlorophthalic acid anhydride is added in portions at 80° to a mixture of 170 g of ethylene glycol and 292 g of diethylene glycol. After replacing the air in the reaction vessel by nitrogen, the temperature is raised to 150° within 1 hour, then raised to 210° within 9 hours, kept at this temperature for 1 hour and then reduced to 180°. Vacuum is then applied and the pressure is slowly reduced to 100 mm. These conditions are maintained until the acid number of the reaction mixture has sunk below 50.

100 g of this polyester are mixed with 50 g of styrene and the mixture is polymerised as described above.

Similar results are obtained if, instead of tetrachlorophthalic acid, an equimolecular amount of phthalic acid anhydride is used. In this case, however, the resultant polyester resin is not difficultly combustible.

If, in the above method, the styrene is replaced by methylmethacrylate, sheets are obtained which have a slighter tendency to turn brownish but which are also easier to stabilise.

EXAMPLE 34

100 Parts of methacrylic acid methyl ester, 0.2 parts of 2-(2'-hydroxy-4'-ethoxyphenyl)-4,6-dimethyl-s-triazine and 0.2 parts of lauroyl peroxide are mixed and, at a temperature of 50°–70°, polymerised into sheets of 2 mm thickness.

As can be seen from the following Table, such sheets can be used as colourless UV filters.

Table 2

| No. | UV absorber | % transmission of light of wavelength at 380 m$\mu$ | % transmission of light of wavelength at 450 m$\mu$ |
|---|---|---|---|
| 1. | without UV absorber | 90 | 92 |
| 2. | 2-(2'-hydroxy-4'-ethoxyphenyl)-4,6-dimethyl-s-triazine | 1 | 92 |

Corresponding results are obtained if, with 2 cm thick sheets, the concentration of UV absorber is reduced to 0.02%.

EXAMPLE 35

A mixture of 660 g of pulverulent emulsion polyvinyl chloride (K value 72, bulk density 0.43), 330 g of dioctyl phthalate and 10 g of 2-(2',4'-dihydroxyphenyl)-4,6-di-ethyl-s-triazine is worked up on a two-roll mill at 150° into films.

The exposure time after which brown spots occur on films so produced is 1.5 to 2 times longer than that of films which are produced without the addition of 2-(2',4'-dihydroxyphenyl)-4,6-dibenzyl-s-triazine.

Similar results are obtained if polyvinyl chloride having a K value of 74 and a bulk density of 0.46 is used.

The addition of 10 g of barium-cadmium laurate to the mixture above mentioned produces films which are stabilised to the effect of both heat and light.

EXAMPLE 36

Polyethylene of medium molecular weight of 28,000 and a density of 0.917 is mixed at 180° in a Brabender plastograph with 1% of its total weight of 2-(2'-hydroxy-4'-ethoxyphenyl)-4,6-dinonyl-s-triazine. The mass so obtained is pressed in a platen press at 165° into 1 mm thick sheets.

The sheets so obtained have considerably less tendency to brittleness on weathering than those produced without the addition of the triazine derivative mentioned.

Similar results are obtained if, instead of the polyethylene, polypropylene is used but then mixing must be performed at 220° and pressing at 180°.

EXAMPLE 37

100 Parts of granulated polycaprolactam (Grilon, Emserwerk A.G., Domat-Ems Switzerland) and 1 part of 2-(2', 4'-dihydroxyphenyl)-4,6-dipropyl-s-triazine are melted together at 255° in an autoclave having a die in the floor, while excluding air. The melt is pressed by nitrogen pressure through the die.

The homogeneous mass so obtained absorbs UV light and can be used for the production of UV dense packing material.

The polymerisation of 100 parts of caprolactam in the presence of 1 part 2-(2',4'-dihydroxyphenyl)-4,6-dipropyl-s-triazine by the usual methods gives a polymer of similar properties.

UV dense material is also obtained if, instead of the polycaprolactam, polyhexamethylene adipamide is used.

EXAMPLE 38

Bleached maple veneer is painted with a lacquer for wood of the following composition: 15.0 parts of Cellit F 900 (of Bayer, Leverkusen, Germany) (about 56% acetic acid content), 10.0 parts of dimethyl glycol phthalate, 2.25 parts of 2-(2'-hydroxy-4'-ethoxyphenyl)-4,6-dipropyl-s-triazine (corresponding to 15% by weight calculated on the acetyl cellulose), 5.0 parts of methyl alcohol, 10.0 parts of toluene and 50.0 parts of ethyl acetate. The natural yellowing of the wood is greatly retarded by this lacquer.

PART III

In a third aspect the present invention concerns a third class of new o-hydroxyphenyl-s-triazines of somewhat more gradual slope of the absorption maximum than the compounds described in the preceding parts of this specification, a novel process for the production of said new triazines, their use for the stabilization of certain light-sensitive organic materials, and for the production of light filters of improved constancy of light transmission, due to better inherent light fastness than the compounds according to Parts I and II of this invention, and of improved compatibility with polymeric substrata as compared with that of known compounds of related structure, also, as industrial products, the organic material stabilised with the aid of these triazines, as well as light filters which contain the new o-hydroxyphenyl-s-triazines.

It has been found that valuable UV absorbers are obtained by reacting substantially equimolar amounts of an oxazine compound of the formula

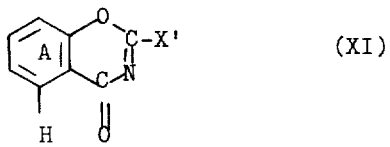

wherein X' represents an alkyl, alkenyl, cycloalkyl or aralkenyl group, all of which groups may be substituted and of an amidine of the formula

wherein Y' represents a monovalent aromatic radical of the formula given further below, with each other, or by reacting equimolar amounts of a compound of the formula

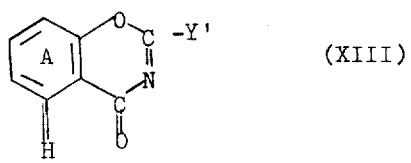

wherein Y' has the aforesaid meaning, and of a compound of the formula

wherein X represents hydrogen, an alkyl, alkenyl, cycloalkyl or aralkenyl radical which radicals may be substituted, to form a triazine compound of the formula

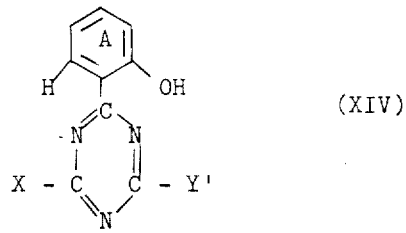

wherein X and Y' have the aforesaid meaning, Y being of the formula

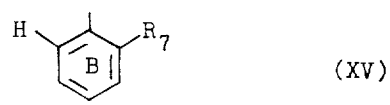

and wherein $R_7$ represents hydrogen, halogen or an alkyl, aralkyl or an alkoxy or acyloxy group, and the benzene rings A and B can be further substituted in each of the 3-, 4- and 5-positions by alkyl, alkenyl, cycloalkyl, aralkyl, aryl groups, by free, etherified or acylated hydroxyl groups and by halogens, and if desired, subsequently chemically modifying other reactive substituents present.

$R_7$ in Formula XV represents the following:
a. halogen, preferably chlorine or bromine
b. alkyl groups which have advantageously 1 to 8 carbon atoms, such as the methyl, ethyl, butyl, or tert. octyl group alkyl groups having 1 to 4 carbon atoms being preferred,
c. aralkyl groups of preferably 7 to 12 carbon atoms, for example, the benzyl, a methylbenzyl, a chlorobenzyl or the o-amylbenzyl group, aralkyl groups having 7 to 9 carbon atoms being preferred;
d. alkoxy groups symbolized by $R_7$ have 1 to 8 carbon atoms.

Examples are the methoxy, ethoxy, butoxy or octyloxy group. Of these, alkoxy groups having 1 to 4 carbon atoms are preferred.

Acyloxy groups symbolized by $R_7$ correspond in particular to the formula U—COO—, in which U is hydrogen, an alkyl radical having 1 to 8 carbon atoms, a phenyl radical which may be substituted by low alkyl groups, low alkoxy groups or by chlorine or bromine, or an alkoxy group having 1 to 10 carbon atoms. The acyl radical or these acyloxy groups is thus, for example, the formyl, acetyl, propionyl, butyryl, capronyl, hexanoyl, benzoyl, o-chlorobenzoyl, p-methoxybenzoyl, m-methylbenzoyl, methoxycarbonyl or decyloxycarbonyl group. These acyl radicals preferably contain 1 to 6 carbon atoms.

Alkyl groups symbolized by X in the formulas I and XIV and X' in formula (XI) have, 1 to 18 carbon atoms. Examples are the methyl, ethyl, propyl, isopropyl, butyl, tert. butyl, amyl, hexyl, octyl, decyl, dodecyl, tetradecyl, hexadecyl or octadecyl group; of these, alkyl groups having 1 to 10 carbon atoms are preferred. The alkyl groups may be further substituted if desired. Substituted alkyl groups correspond, among others, to the formula -alkylene-E-D₁ for example. In this formula, alkylene represents a divalent aliphatic radical having in particular 1 to 12, preferably 1 to 4 carbon atoms, and E represents either —O— or —S— or —N(D₂)—. D₁ and D₂ independently of each other represent an alkyl radical containing preferably 1 to 8 carbon atoms, and if E is oxygen or nitrogen D₁ or D₂ can also be hydrogen. Suitable groups of the formula -alkylene-E-D₁ are, for example, the ω-hydroxy-alkyl, ω-alkylmercaptoalkyl, ω-aminoalkyl groups, that is, e.g. that hydroxymethyl, 2-hydroxyethyl, 2-methoxyethyl, 2-ethoxyethyl, 2-butoxyethyl, 2-methylmercaptoethyl, 2-butylmercaptoethyl, 2-dodecylmercaptoethyl, 2-N,N-dimethylaminoethyl or 2-N,N-diethylamonoethyl or the ω-aminodecyl group. Each of X or X' can also be a halogenoalkyl group having preferably 1 to 4 carbon atoms such as the chloromethyl, bromoethyl, 2-chloroethyl or 4-chlorobutyl group. As alkenyl groups, X and X' represent for example the vinyl group, the Δ¹- or Δ²-propenyl or Δ⁸-heptadecenyl group; of these low alkenyl groups having 2 to 6 carbon atoms are preferred. It is possible for the alkenyl groups to be substituted by aryl groups. They can then represent e.g. the β-phenylvinyl (styryl group) or the β-phenyl-β-methyl-vinyl group. If X or X' represents such an aralkenyl group, then this contains 8 to 12 carbon atoms. As cycloalkyl groups, X and X' contain 5 to 10, preferably however, 6 to 7 carbon atoms. Examples are the cyclohexyl, methylcyclohexyl or ethylcyclohexyl group.

The benzene rings can be further substituted as defined. The alkyl groups which can be substituents of the benzene rings have 1 to 18, preferably 1 to 10 carbon atoms, alkenyl groups as ring substituents have 2 to 18, preferably 2 to 5 carbon atoms; such substituents are thus, e.g. the methyl, tert. butyl or tert. octyl group or the allyl or methallyl group. Cycloalkyl or aralkyl groups as substituents of the benzene rings advantageously are those having 5 to 8 and 7 to 10 carbon atoms respectively, e.g. the cyclohexyl group and the benzyl or 1-phenylethyl group respectively. Aryl groups used as benzene ring substituents are, in particular, of the benzene series and have 6 to 10 carbon atoms. Examples are the phenyl, a methylphenyl, chlorophenyl or methoxyphenyl group. If the benzene rings contain acylated hydroxyl groups, then the acyl radical thereof is derived in particular from an aliphatic carboxylic acid having at most one carbon-carbon double bond and having 1 to 18, preferably 1 to 10 carbon atoms, whereby the carboxylic acid radical can be substituted, in particular by carboxyl, carbo-low alkoxy or low alkoxy groups. The acyl radical can also be derived from a cycloaliphatic carboxylic acid having 6 to 8 carbon atoms or from an araliphatic carboxylic acid having 8 to 10 carbon atoms or from an aromatic carboxylic acid, in the latter case particularly from a carboxylic acid of the benzene series having 7 to 11 carbon atoms. The acyl radical can also consist of a carbonic acid monoester radical having 2 to 11 carbon atoms. Example of acyl radicals in acyloxy substituents of the benzene rings are the radical of acetic, propionic, stearic, acrylic, crotonic, β-carboxypropionic, β-carbo-methoxypropionic, β-carboethoxypropionic, β-carbohexyloxypropionic, butoxyacetic, β-methoxypropionic, cyclohexane carboxylic, phenylacetic, cinnamic, benzoic, chlorobenzoic, methylbenzoic, methoxybenzoic, butylbenzoic or o-carboxybenzoic acid or the carbomethoxy, carbethoxy, carbobutoxy, carbodecyloxy, carbocyclohexyloxy, carbobenzyloxy, carbophenyloxy, carbochlorophenyloxy or carbocresyloxy radical.

As etherified hydroxyl groups, the benzene rings contain substituents of the formula R'₄—O—. Herein, R'₄ represents, in particular, an alkyl, alkenyl or aralkyl group which may be substituted. Alkyl groups symbolized by R'₄ have preferably 1 to 12 carbon atoms. The alkyl groups may be substituted, examples of substituents being halogens such as chlorine or bromine, free or etherified hydroxyl or cyano groups as well as free or modified carboxyl groups. By "modified carboxyl groups" chiefly carboxylic acid ester but also carboxylic acid amide groups are to be understood; in the latter case, carboxylic acid alkylamide groups, in particular those having a tertiary amide nitrogen atom are preferred. cyano and free or modified carboxyl groups can be at any carbon atom of the alkyl group R'₄ whilst the halogens and free of etherified hydroxyl groups are bound to a carbon atom of this alkyl group which is different from the α-carbon atom. Examples of further substituted alkyl groups R'₄ are the 2-chloroethyl, 2-bromoethyl, 2-hydroxyethyl, 4-hydroxybutyl, 2-methoxyethyl, 2-ethoxyethyl, 2-cyclohexyloxyethyl, 2-cyanoethyl, carboxymethyl, carbomethoxymethyl, carbethoxymethyl, carbodecyloxymethyl or the N,N-dimethylcarbamoylmethyl group. As alkenyl group, R'₄ represents in particular a Δ²-propenyl group which can be substituted by low alkyl groups, If R'₄ is an aralkyl group, it contains 7 to 12, preferably 7 to 9 carbon atoms; examples are the benzyl or a methylbenzyl group.

Particularly satisfactory all round properties are shown by the substantially non-coloring light stabilizers for organic, particularly organic polymeric materials, according to the invention, which are sufficiently stable to heat up to at least 200°C to withstand incorporation at such temperature into such substrata, and which are of the formula

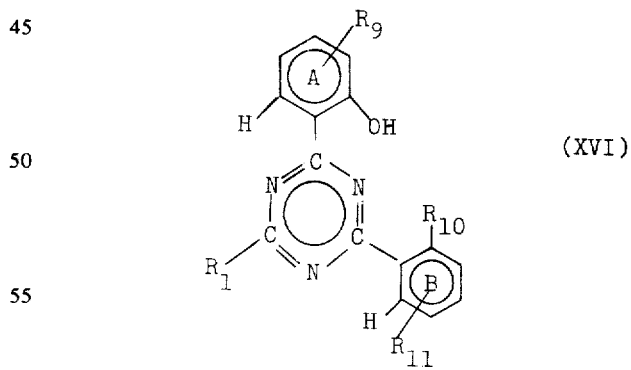

(XVI)

wherein R₁ represents hydrogen, alkyl of from 1 to 18 carbon atoms, amino-alkyl of 1 to 12 carbon atoms, hydroxy-alkyl of 1 to 12 carbon atoms, alkoxy-alkyl wherein the alkoxy moiety has from 1 to 8 carbon atoms and the alkyl moiety has from 1 to 12 carbon atoms, alkylthio-alkyl wherein the alkylthio moiety has from 1 to 8 carbon atoms and the alkyl moiety has from 1 to 12 carbon atoms, N-alkylamino-alkyl wherein the alkylamino moiety has from 1 to 8 carbon atoms and the alkyl moiety has from 1 to 12 carbon atoms, or N,N-di-(alkyl)-amino-alkyl wherein the N-alkyl groups have each from 1 to 8 carbon atoms, and the alkyl moiety bearing the amino group has from 1 to 12 carbon atoms, alkoxy-carbonyl-alkyl wherein the alkoxy moiety has from 1 to 8, and the alkyl moiety from 1 to 12 carbon atoms, carboxy-alkyl with a total of from 2 to 13 carbon atoms, chloro-alkyl of from 1 to 12 carbon atoms, bromo-alkyl of from 1 to 12 carbon atoms, cycloalkyl of from 5 to 10 carbon atoms, 5 to 6 of which are ring members, alkenyl of from 2 to 17 carbon atoms, alkyl-phenyl-alkenyl of from 9 to 12 carbon atoms, alkoxy-phenyl-alkenyl of from 9 to 12 carbon atoms, or chloro- or bromo- phenyl-alkenyl of 8 to 12 carbon atoms, $R_9$ represents hydrogen, chlorine, bromine, alkyl of from 1 to 18 carbon atoms, alkenyl of from 2 to 18 carbon atoms, cycloalkyl of from 5 to 8 carbon atoms, 5 to 6 of which are ring members, phenylalkyl of from 7 to 10 carbon atoms, alkylphenylalkyl of from 8 to 10 carbon atoms, chloro- or bromo-phenylalkyl of from 7 to 10 carbon atoms, phenyl, alkylphenyl of from 7 to 10 carbon atoms, chlorophenyl, bromophenyl, or acyloxy which term is used for one of the following acyloxy radicals: alkanoyloxy of from 1 to 18 carbon atoms, alkenoyloxy of from 3 to 18 carbon atoms and one double bond, carboxy-alkanoyloxy of from 4 to 12 carbon atoms, alkoxy-carbonyl-alkanoyloxy of from 3 to 13 carbon atoms, carboxy-alkenoyloxy of from 4 to 12 carbon atoms, alkoxy-carbonyl-alkenoyloxy of from 5 to 13 carbon atoms, benzoyloxy, alkylbenzoyloxy of from 7 to 10 carbon atoms, chloro- or bromo-benzoyloxy alkoxy-carbonyloxy of from 2 to 13 carbon atoms, cyclohexyloxycarbonyloxy benzyloxycarbonyloxy, or phenoxycarbonyloxy, or a radical of the formula —O—$R_5$ wherein $R_5$ represents hydrogen, alkyl of from 1 to 12 carbon atoms, chloro-alkyl, bromo-alkyl and hydroxyalkyl, each of from 2 to 12 carbon atoms, alkoxy-alkyl of from 1 to 8 carbon atoms in the alkoxy moiety and from 2 to 4 carbon atoms in the alkyl moiety, cyclohexyloxy-alkyl of from 2 to 4 carbon atoms in the alkyl moiety, the heteroatom of the substituent in alkyl in the five last-mentioned members being removed by at least two carbon atoms from the oxygen atom in —O—$R_5$; cyano-alkyl of from 1 to 5 carbon atoms, in the alkyl moiety, carboxy-alkyl of from 2 to 6 carbon atoms, alkoxy-carbonyl-alkyl of 1 to 8 carbon atoms in the alkoxy moiety and from 1 to 5 carbon atoms in the alkyl moiety, N,N-di-(lower alkyl)-carbamyl-alkyl of from 1 to 5 carbon atoms in the last-mentioned alkyl moiety, alkenyl of from 3 to 8 carbon atoms, phenyl-alkyl of from 7 to 12 carbon atoms, or lower alkyl-phenyl-alkyl of from 1 to 5 carbon atoms, in the last-mentioned alkyl moiety;

$R_{10}$ represents hydrogen, chlorine, bromine, alkyl of from 1 to 8 carbon atoms, phenyl-alkyl of from 7 to 12 carbon atoms, alkyl-phenyl-alkyl of from 8 to 13 carbon atoms, chlorophenylalkyl of from 7 to 12 carbon atoms, alkoxy of from 1 to 8 carbon atoms, alkanoyloxy of from 1 to 9 carbon atoms, benzoyloxy, lower alkylbenzoyloxy, lower alkoxybenzoyloxy, chlorobenzoyloxy, bromobenzoyloxy; and $R_{11}$ represents hydrogen, alkyl of from 1 to 10 carbon atoms, alkenyl of from 2 to 5 carbon atoms, cycloalkyl of from 5 to 8 carbon atoms, 5 to 6 of which are ring members, phenylalkyl of from 7 to 10 carbon atoms, lower-alkylphenyl-lower-alkyl, chlorophenyl-lower alkyl, bromophenyl-lower alkyl, lower alkoxy-phenyl-lower alkyl, hydroxy, alkoxy of from 1 to 8 carbon atoms, alkanoyloxy of from 1 to 9 carbon atoms, alkenoyloxy of from 3 to 5 carbon atoms, chlorine or bromine.

Compounds of Formula (XVI) which possess a molecular weight between 248 and about 650 are distinguished by a particularly favorable combination of good absorptivity and solubility. Compounds showing an optimal combination of good absorptivity and solubility properties are those of Formula (XVI) having molecular weight between 260 and 510.

Compounds falling under Formula (XVI) which possess especially satisfactory light-protective power for polyester resins are those of the formula

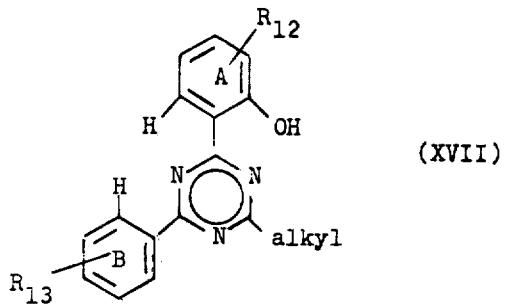

(XVII)

wherein each of $R_{12}$ and $R_{13}$, independently of each other, represents hydrogen or alkyl or from 1 to 8 carbon atoms, and alkyl in Formula XVII is an alkyl radical of from 1 to 12 carbon atoms.

Compounds falling under Formula XVI with particularly good absorptivity to light of wavelengths in the range of from about 330 to 350 mμ, substantially independently of the type of organic polymeric substrate, are those of the formula

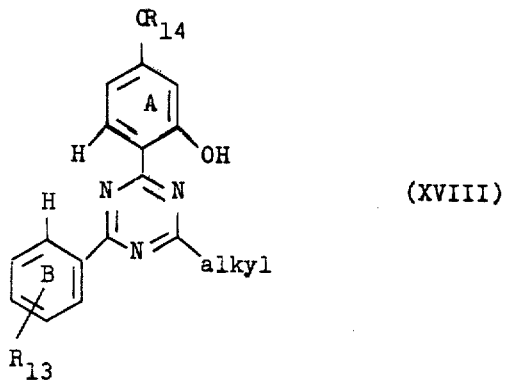

(XVIII)

wherein $R_{13}$ and alkyl have the same meanings as given in connection with Formula XVII, and $R_{14}$ represents either hydrogen or alkyl of from 1 to 12 carbon atoms.

On the other hand, compounds falling under Formula XVI with particularly good absorptivity to light of wavelength in the range of from about 300 to 320 m$\mu$, also substantially independently of the type of substrate, are those of the formula

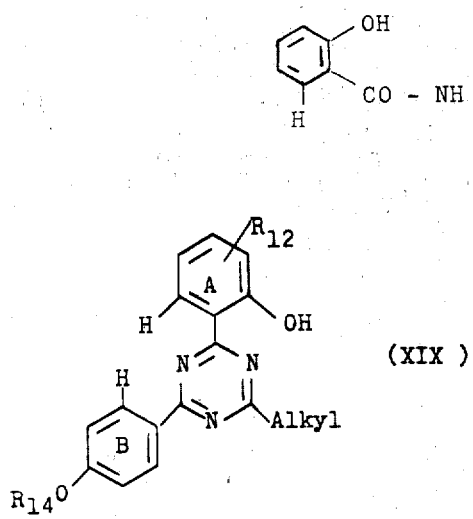

(XIX)

wherein $R_{12}$, $R_{14}$ and alkyl have the same meanings as given above in connection with Formulas XVII and XVIII.

Finally, compounds falling under Formula (XVI) which are particularly suited for light filters, covering a wider range of wavelenths are those of Formula

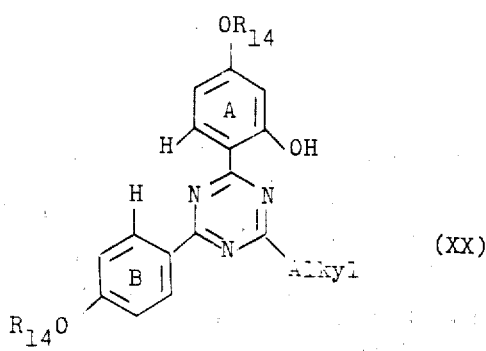

(XX)

wherein $R_{14}$ and alkyl have the meanings given hereinbefore, in connection with Formulas (XVII) to (XIX); the compounds of Formula XX show particularly good absorption in the range of 300 to 350 m$\mu$, thus embracing the range of compounds of Formulas XVIII and XIX, but do not show a correspondingly greater improvement in protective power on polyester resin substrata, compared with that of compounds of Formulas XVIII and XIX.

Compounds of Formulas XVIII to XX in which $R_{14}$ is alkyl, show better compatibility with non-polar substrates such as polyethylene or propylene, than correspondingly substituted compounds falling under the same Formulas, in which $R_{14}$ is hydrogen.

On the other hand, compounds falling under Formula XVII are better soluble in non-polar substrates than compounds of comparable molecular weight falling under Formulas XVIII to XX.

Some of the starting materials of Formulas XI and XIII are known, or can be obtained by methods known per se, for example, from compounds of the formulas

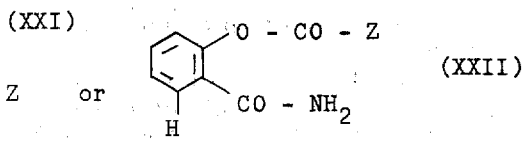

(XXI) or (XXII)

wherein Z is one of X' and Y' by splitting off water, (T. Hanada, Bull. Chem. Soc. Japan, 31, 1024 (1958) or A. Mustafa, J.Am. Chem. Soc. 79, 3846 (1957)).

Examples of suitable starting materials of the formula (XIII) in which Y' is the group

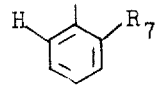

are 2-phenyl-, 2-(3'-chlorophenyl)-, 2-(2'-methylphenyl)-, 2-(4'-tert. octylphenyl)-, 2-(2'-methoxyphenyl)-, 2-(4'-butoxyphenyl)-, 2-(4'-acetyloxyphenyl)- or 2-phenyl-6,7-dimethyl- 4 H-1,3-benzoxazine-(4).

Amidines of Formula I to be reacted therewith, in which X is hydrogen or an alkyl, alkenyl, cycloalkyl or aralkenyl group which may be substituted, are e.g. amidines of propionic, butyric, cyclohexane carboxylic or cinnamic acid.

Examples of starting materials of Formula XI in which X' is an alkyl, alkenyl, cycloalkyl or aralkenyl group which may be substituted are 2-methyl-, 2-propyl-, 2-octyl-, 2-heptadecyl-, 2-cyclohexyl-, 2-propyl-6-chloro-, 2-methyl-7-octyloxy-, 2-methyl-6,8-dichloro-, 2-ethyl-6-cyclohexyl-, 2-methyl-6-tert- octyl-, 2-butyl-8-phenyl-, 2-methyl-7-acetoxy- or 2-cyclohexyl-7-methyl-4H-1,3-benzoxazinone-(4).

Amidines of Formula XII to be reacted with the aforesaid benzoxazinones are, e.g. benzamidine, 2-methylbenzamidine, 4-butoxybenzamidine, 2-chlorobenzamidine, 3-methylbenzamidine, 4-butylbenzamidine or 2-methoxybenzamidine.

The reaction to form the o-hydroxyphenyl triazines is performed by heating the starting materials of Formulas XI and XII, or I and XIII preferably in about molar ratios. The reaction is performed advantageously in organic solvents, at reflux temperature, particularly when amidines having a high melting point are used. Suitable solvents are mainly alcohols such as methanol, ethanol, and ethylene glycol monomethyl or monoethyl ether and, also, dioxan.

Any reactive substituents present in the new o-hydroxyphenyl-s-triazines can be subsequently altered if desired. For example, if X in formula XIV is an alkoxyalkyl group, this can be converted by treatment with hydrobromic acid into the corresponding bromoalkyl group. o-Hydroxyphenyl-s-triazines having halogenoalkyl groups are produced advantageously by this method. If a compound of Formula XIV contains halogen which can be exchanged, this can be replaced by the hydroxyl group, or an ether group or an amino group by reaction with aqueous sodium hydroxide solution, with alkali alcoholates or phenolates, with ammonia or with primary or secondary amines. If the o-hydroxyphenyl-s-triazines of Formula XIV contain alcoholic or other phenolic hydroxyl groups, these can be esterified or etherified. In this way, o-hydroxyphenyl-s-triazines which contain etherified or acylated hydroxyl groups in m- and/or p-position to the bond to the triazine ring a substituents of the benzene ring can be produced advantageously by etherification or acylation of the corresponding di- or polyhydroxyphenyl-s-triazines. Suitable acylating agents for this purpose are the carboxylic acid anhydrides and, chiefly, the halides of carboxylic acids, of carbonic acid monoesters. i.e., for example, acetanhydride, acetyl chloride, benzoyl chloride, and chloroformic acid alkyl ester. Ketenes, however, can also be used acylating agents. Suitable etherifying agents are the esters of strong acids such as hydrochloric, hydrobromic, hydroiodic acid or sulfuric acid, benzene sulfonic acid or p-toluene sulfonic acid with alcohols, particularly with low alkanols or with aralkyl alcohols. Examples of suitable etherifying agents are: dimethyl or diethyl sulfate, butyl bromide or iodide, allyl chloride or benzyl chloride. It is also possible, however, to etherify or acylate one of the two o-hydroxyl groups in 2,4-bis-(2'-hydroxyphenyl)-s-triazines. The etherifying or acylating agents mentioned above can be used for this purpose. Compounds of Formula XIV in which X is an alkenyl radical are obtained by the methods usual in organic chemistry advantageously from corresponding compounds in which one of these symbols is a halogenoalkyl, hydroxyalkyl, alkoxyalkyl or aminoalkyl radical, by removal of hydrohalic acid or by splitting off water or alcohol or amine, (in the latter case possibly after conversion into quaternary ammonium salts).

Such triazines having unsaturated side chains can also be produced by reacting simple alkyl triazines, particularly methyl triazines, with aldehydes while splitting off water.

A modification of the process according to the invention consists in reacting substantially equimolar amounts of compounds of Formula XI and of Formula XII to form a compound of Formula XIV and, if desired, subsequently chemically modifying any reactive substituents present.

The compounds of Formula XXI are obtained by methods known per se (A. Einhorn, B.38, 2795, (1905) or J. McConnan and A. W. Titherley, Soc. 89, 1318 (1906)), namely by reacting equimolar amounts of compounds of the formula

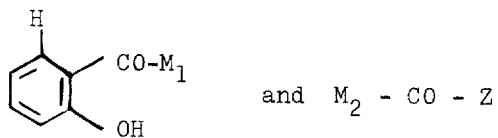

and $M_2 - CO - Z$ wherein one of $M_1$ and $M_2$ represents the $NH_2$- group and the other a lower alkoxy, cycloalkoxy, aralkoxy, aryloxy group or, preferably, chlorine or bromine.

The reaction of the reactive partners of Formula XI and XII is performed in a manner similar to that described in the first process.

The new o-hydroxyphenyl-s-triazines are distinguished by excellent fastness to light in polymeric carriers.

Compounds which contain double bonds in the side chains which are in conjugation with the triazine ring, i.e. those in which X is a $\Delta^1$-alkenyl or preferably a $\Delta^1$ aralkenyl group, particularly a $\beta$-phenylvinyl group, are distinguished by particularly high absorption power. In general, however, they are somewhat less fast to light than compounds which do not contain such conjugated double bonds in the side chains.

The new o-hydroxyphenyl-s-triazines have less yellow coloration than previously known compounds of comparable constitution, solubility and lightfastness. Because of this slight inherent color they are particularly suitable for use in colorless polymers, the lightinduced discoloration of which is to be reduced by the action of the UV absorbers. In addition, in comparison with previously known comparably substituted compounds they are distinguished by improved solubility or organic solvents and organic polymeric carriers. They can thus be particularly easily incorporated into polymers, which is of advantage in the production of thin light filters having a high content of UV absorber.

The new o-hydroxyphenyl-s-triazines of Formula XIV are incorporated into the light-sensitive carriers or polymeric carriers for light filters in amounts of 0.01 to 30% calculated on the total weight of the resulting composition. The amount of triazines to be used depends, among other things, on the thickness of the light filter to be produced. For very thin layers such as, e.g. for laquer coatings, amounts of 1 to 20% are preferred, for thick layers such as, e.g. in polymethacrylate sheets on the other hand amounts of 0.01 to 1% calculated on the total weight of the resulting composition are preferred.

The same carrier materials including substrates to be stabilized against deterioration by ultraviolet light can be employed for incorporation, of and/or protected by the light-stabilizing compounds according to this third aspect of the invention as have been enumerated hereinbefore as useful in combination with the compounds according to the first aspect of the invention, taking, however, into account the differences in properties between the two classes of new light stabilizers which are more closely defined by Formulas IV and V, regarding the first aspect, and Formulas XIV and XVI through XX regarding the third aspect of this invention.

New compositions of light-stabilized polymeric materials in which compounds falling under Formulas XIV and XVI through XX are the light-stabilizing ingredients, are produced in the same manner as described under the first aspect of this invention with regard to the incorporation of compounds falling under Formulas IV and V, supra, into the various carriers, listed under the first aspect of the invention.

Thus, what has been said there about the incorporation of light-stabilizing compounds having reactive groupings into polymer melts or monomer mixtures being polymerized, applies equally to the compounds falling under the third aspect of the invention.

Likewise, protective coatings and covers containing compounds falling under Formulas XIV and XVI, through XX as UV-absorbers can be produced and employed in the same general manner as described under the first aspect of the invention.

The following examples illustrate this aspect of the invention.

EXAMPLE 39

6 of benzamidine hydrochloride are added in portions to a solution of 2.1 g of dry sodium methylate in 50 ml of anhydrous ethanol. The mixture so obtained is stirred for 1 hour at room temperature, 6.6 g of 2-ethyl-4H-1,3-benzoxazinone-(4) are then added and the whole is refluxed for 4 hours. Water is added dropwise to the cooled reaction mixture until the sodium chloride has dissolved and the 2-(2-hydroxyphenyl)-4-phenyl-6-ethyl-s-triazine has precipitated. The latter is filtered off under suction and recrystallized from methyl alcohol whereupon it melts at 87°.

EXAMPLE 40

6 g of acetamidine hydrochloride are added in portions to a solution of 3.8 g of sodium methylate in 50 ml anhydrous ethanol. The mixture so obtained is stirred for 1 hour at room temperature, 17 g of N-p-methylbenzoylsalicylic acid amide are then added and the whole is refluxed for 10 hours. The cooled reaction mixture is filtered, the solvent is removed under vacuum from the filtrate and the residue is recrystallized from methyl alcohol. The 2-(2'-hydroxyphenyl)-4-methyl-6-p-tolyl-s-triazine so obtained melts at 121°.

EXAMPLE 41

7 g of cyclohexane carboxylic acid amidine hydrochloride are added in portions to a solution of 2.3 g of sodium methylate in 50 ml of anhydrous isopropanol and the mixture obtained is stirred for 1 hour at room temperature. The precipitated sodium chloride is filtered off, 9 g of 2-phenyl-4H-1,3-benzoxazinone-(4) are added to the filtrate and the whole is refluxed for 4 hours. On cooling the reaction mixture, 2-(2'-hydroxyphenyl)-4-phenyl-6-cyclohexyl-s-triazine precipitates in crystalline form. It is recrystallized from ethanol and then melts at 147°.

EXAMPLE 42

5.0 g of undecanoic acid amidine hydrochloride are added in portions to a solution of 1.1 g of dry sodium methylate in 50 ml of anhydrous ethanol. The mixture so obtained is stirred for 1 hour at room temperature, 4.4 g of 2-phenyl-4H-1,3-benzoxazinone-(4) are then added and the whole is refluxed for 4 hours. The cooled reaction mixture is filtered, the sodium chloride is washed out of the reaction product with water and the remaining 2-(2'-hydroxyphenyl)-4-phenyl-6-decyl-s-triazine is recrystallized from a little ethanol, whereupon it melts at 62°.

EXAMPLE 43

1.9 g of caprylic acid amidine hydrochloride and 2 g of 2-(4'-methoxyphenyl)-4H-1,3-benzoxazinone-(4) in 40 ml of anhydrous alcohol are reacted with 0.7 g of sodium methylate as described in example 42 and the product is worked up. The 2-(2'-hydroxyphenyl)-4-(4''-methoxyphenyl)-6-heptyl-s-triazine so obtained melts at 50° after recrystallizing twize from methanol.

EXAMPLE 44

6.6 g of undecanoic acid amidine hydrochloride and 5.7 g of 2-(4'-methoxyphenyl)-7-methoxy-4H-1,3-benzoxazinone-(4) are reacted as described in example 41 with 1.6 g of sodium methylate in 50 ml of anhydrous alcohol and the product is worked up. The 2-(2'-hydroxy-4'-methoxyphenyl)-4-(4''-methoxyphenyl)-6-decyl-s-triazine so obtained melts at 70° after recrystallization from ethanol.

EXAMPLE 45

1.5 g of acetamidine hydrochloride and 3 g of 2-(4'-methoxyphenyl)-7-methoxy-4H-1,3-benzoxazinone-(4) are reacted according to example 41 with 0.8 g of sodium methylate in 30 ml of anhydrous alcohol and the product is worked up. The crude 2-(2'-hydroxy-4'-methoxyphenyl)-4-(4''-methoxyphenyl)-6-methyl-s-triazine is recrystallized twice from ethanol and then melts at 130°.

EXAMPLE 46

1.1 g of acetamidine hydrochloride and 2.5 g of 2-(4'-chlorophenyl)-7-methoxy-4H-1,3-benzoxazinone-(4) are reacted with 0.65 g of sodium methylate in 20 ml of anhydrous alcohol as described in example 3 and the product is worked up. The 2-(2'-hydroxy-4'-methoxyphenyl)-4-(4''-chlorophenyl)-6-methyl-s-triazine so obtained melts, after recrystallizing twice from ethylene glycol monomethyl ether, at 200°.

By the same methods as described in the foregoing examples, identified in the last column of the table below, there are obtained compounds falling under Formula XVI having substituents $R_1$, $R_9$, $R_{10}$ and $R_{11}$ from starting materials of Formulas XI and XII or Formulas I and XIII, in which formulas Y' stands for

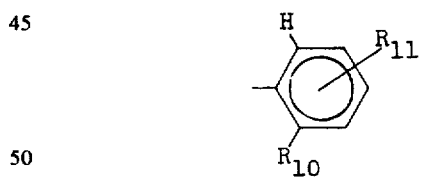

and wherein X and X', respectively correspond to $R_1$, and $R_9$ corresponds to the substituents of Ring A in Formulas XI and XIII, which substituents $R_1$, $R_9$, $R_{10}$ and $R_{11}$ are given in the table below:

Table 3

| Example No. | $R_1$ | $R_9$ | $R_{10}$ | $R_{11}$ | Method of preparation according to Example No. |
|---|---|---|---|---|---|
| 47 | heptadecyl | 3'-phenyl | H | H | 39 |
| 48 | methyl | 5'-chloro | octyloxy | H | 39 |
| 49 | methyl | 5'-bromo | H | 4''-allyl | 39 |
| 50 | 4'''-methylcyclohexyl | 3,5-dimethyl | H | 4''-octyloxy | 39 |
| 51 | cyclohexyl | 5'-dodecyl | H | H | 39 |
| 52 | methyl | 3'-allyl | H | 4''-α-methyl-acryloyloxy | 39 |
| 53 | heptadecen-8-yl | 5'-p-chlorophenyl | H | H | 40 |
| 54 | H | 5'-α-phenylethyl | chloro | H | 40 |

Table 3—Continued

| Example No. | R₁ | R₉ | R₁₀ | R₁₁ | Method of preparation according to Example No. |
|---|---|---|---|---|---|
| 55 | β-methylthioethyl | 3'-octen-2-yl | bromo | 4''-bromo | 40 |
| 56 | β-methoxyethyl | 5'-cyclohexyl | methyl | H | 40 |
| 57 | methoxycarbonylmethyl | 5'-(4''-methylcyclohexyl | H | H | 40 |
| 58 | β-octoxycarbonylethyl | H | H | H | 40 |
| 59 | ω-carboxydecyl | 5'-p-methylbenzyl | H | H | 40 |
| 60 | carboxymethyl | H | benzyloxy | H | 40 |
| 61 | ω-methoxycarbonyldecyl | 5'-o-chlorobenzyl | H | H | 40 |
| 62 | chloromethyl | H | H | 4''-butyl | 40 |
| 63 | bromomethyl | H | H | H | 40 |
| 64 | methyl | 5'-p-bromobenzyl | H | H | 40 |
| 65 | methyl | 5'-p-tert.butyl-phenyl | H | H | 40 |
| 66 | methyl | 5'-p-bromophenyl | H | H | 41 |
| 67 | β-bromoethyl | 4'-acetoxy | H | 4''-hydroxy | 41 |
| 68 | methyl | 4'-stearoyloxy | H | 4''-cyclohexyl | 41 |
| 69 | methyl | 4'-methacryloyloxy | H | 3''-chloro | 41 |
| 70 | methyl | 5'-oleoyloxy | H | 4''-hydroxy | 41 |
| 71 | methyl | 4'-γ-carboxypropionyloxy | octyl | H | 41 |
| 72 | methyl | 4'-ω-carboxynonanoyloxy | benzyl | H | 41 |
| 73 | methyl | 4'-γ-methoxycarbonylpropionyloxy | H | H | 41 |
| 74 | methyl | 4'-δ-hexyloxycarbonylvaleroyloxy | H | H | 41 |
| 75 | methyl | 5'-β-carboxyacryloyloxy | p-methylbenzyl | H | 42 |
| 76 | methyl | 5'-β-carboxy-β-octylacryloyloxy | H | H | 42 |
| 77 | methyl | 5'-β-ethoxycarbonylacryloyloxy | H | 4''-o-methoxybenzyl | 42 |
| 78 | methyl | 5'-β-methoxycarbonyl-β-octylacryloxy | H | H | 42 |
| 79 | methyl | 4'-benzoyloxy | p-chlorobenzyl | H | 42 |
| 80 | methyl | 5'-p-methylbenzoyloxy | H | H | 42 |
| 81 | methyl | 5'-p-chlorobenzoyloxy | H | 4''-p-methylcyclohexyl | 42 |
| 82 | methyl | 4'-2''',4'''-dibromobenzoyloxy | H | H | 42 |
| 83 | methyl | 5'-methoxycarbonyloxy | H | 3''-octyl | 42 |
| 84 | methyl | 4'-dodecyloxycarbonyloxy | H | H | 42 |
| 85 | methyl | 4'-cyclohexyloxycarbonyloxy | H | H | 42 |
| 86 | methyl | 4'-benzyloxycarbonyloxy | H | 4''-β-phenylethyl | 43 |
| 87 | methyl | 5'-phenoxycarbonyloxy | H | H | 43 |
| 88 | methyl | 4'-hydroxy | acetoxy | H | 43 |
| 89 | methyl | 4'-methoxy | octanoyloxy | H | 43 |
| 90 | methyl | 4'-dodecyloxy | methoxy | H | 43 |
| 91 | methyl | 4'-butoxy | benzoyloxy | H | 43 |
| 92 | methyl | 4'-β-chloroethoxy | H | H | 43 |
| 93 | methyl | 4'-δ-bromobutoxy | H | H | 43 |
| 94 | methyl | 4'-(α-bromomethyl)-heptyloxy | H | H | 43 |
| 95 | methyl | 4'-β-hydroxyethoxy | p-chlorobenzoyl | H | 43 |
| 96 | methyl | 4'-ω-hydroxydecyloxy | H | H | 43 |
| 97 | methyl | 4'-β-octoxyethoxy | H | 4''-p-methylbenzyl | 43 |
| 98 | methyl | 4'-δ-methoxybutoxy | H | H | 43 |
| 99 | methyl | 4'-β-cyclohexyloxyethoxy | H | H | 44 |
| 100 | methyl | 4'-cyanomethoxy | o-bromobenzoyl | H | 44 |
| 101 | methyl | 4'-β-cyanopropyloxy | H | 4''-octanoyloxy | 44 |
| 102 | methyl | 5'-carboxymethoxy | o-methoxybenzoyl | H | 44 |
| 103 | methyl | 4'-γ-carboxypropyloxy | H | H | 44 |
| 104 | methyl | 5'-octoxycarbonylmethoxy | H | 4''-acetoxy | 44 |
| 105 | methyl | 4'-γ-methoxycarbonylpropyloxy | H | H | 44 |
| 106 | methyl | 5'-N,N-dimethylcarbonylmethoxy | H | 4''-p-bromobenzyl | 44 |
| 107 | methyl | 5'-γ-N,N-dimethylcarbonylpropyloxy | H | H | 44 |
| 108 | methyl | 5'-allyloxy | H | 4''-p-chlorobenzyl | 45 |
| 109 | methyl | 4'-octen-(2''')-yloxy | H | H | 45 |
| 110 | methyl | 4'-benzyloxy | p-methylbenzoyl | H | 45 |
| 111 | methyl | 4'-α-phenylethoxy | H | H | 45 |
| 112 | methyl | 4'-p-methylbenzyloxy | H | H | 45 |
| 113 | methyl | 4'-p-ethyl-α-butylbenzyloxy | H | H | 45 |
| 114 | ω-bromodecyl | H | H | 4''-chloro | 45 |
| 115 | ω-chlorodecyl | H | H | H | 45 |
| 116 | nonyl | 3',5'-dimethyl | H | H | 45 |
| 117 | methyl | 4'-octyloxy | H | H | 46 |
| 118 | β-phenyl-β-methyl-vinyl | H | H | H | 46 |
| 119 | β-bromoethyl | H | H | H | 46 |

EXAMPLE 120

A mixture of 7 g of 2-(2'-hydroxyphenyl)-4-phenyl-6-bromomethyl-s-triazine (see Example No. 63), 5 g of sodium hydroxide, 50 ml of water and 100 ml of dioxane is refluxed for 4 hours. The reaction mixture is cooled and acidified with 2N hydrochloric acid. The precipitated 2-(2'-hydroxyphenyl)-4-phenyl-6-hydroxymethyl-s-triazine is filtered off under suction, dried and recrystallized several times from ethylene glycol monomethyl ether until it is colorless.

By using instead of sodium hydroxide and water the equivalent amount of the reagents listed in column 2 of the table below and following otherwise the description given in the foregoing example, there are obtained triazines of Formula XVI, the $R_9$, $R_{10}$ and $R_{11}$ of which are hydrogen and the $R_1$ of which is listed in column 3 of the following table:

Table 4

| Example No. | Reagent | $R_1$ |
|---|---|---|
| 120a | ammonia and water | aminomethyl |
| 121 | sodiumoctylate ($C_8H_{17}ONa$) and octanol | octyloxymethyl |
| 122 | sodium octylmercaptide ($C_8H_{17}SNa$) and octanol | octylthiomethyl |
| 123 | hexylamine | N-hexylaminomethyl |
| 124 | N,N-dioctylamine | N,N-dioctylaminomethyl |

EXAMPLE 125

A mixture of 9.4 g of 2-(2'-hydroxyphenyl)-4-4''-chlorophenyl-6-ω-bromodecyl-s-triazine (see Example No. 114), 5 g of sodium hydroxide, 50 ml of water and 100 ml of dioxane is refluxed for 6 hours. The reaction mixture is cooled and acidified with 2N hydrochloric acid. The precipitated 2-(2'-hydroxyphenyl)-4-phenyl-6-ω-hydroxydecyl-s-triazine is filtered off under suction, dried and recrystallized several times from ethanol until it is colourless.

By using instead of sodium hydroxide and water the equivalent amount of the reagents listed in column 2 of the table below and following otherwise the description given in the foregoing example, there are obtained triazines of Formula XVI, the $R_9$ and $R_{10}$ of which are hydrogen, the $R_{11}$ of which is 4''-chloro and the $R_1$ of which is listed in column 3 of the following table:

Table 5

| Example No. | Reagent | R |
|---|---|---|
| 126 | ammonia and water | ω-aminodecyl |
| 127 | sodium methylate and methanol | ω-methoxydecyl |
| 128 | sodium mercaptide and methanol | ω-methylthiodecyl |
| 129 | ethylamine | ω-N-ethylaminodecyl |
| 130 | N,N-dimethylamine | ω-N,N-dimethylaminodecyl |

EXAMPLE 131

By reacting 2-(2'-hydroxyphenyl)—4-phenyl-6-β-bromoethyl-s-triazine (Example 119) with an excess of sodium butanolate in n-butanol, 2-(2'-hydroxyphenyl)-4-phenyl-6-vinyl-s-triazine is obtained.

EXAMPLE 132

5.5 g of 2-(2'-hydroxyphenyl)-4-p-tolyl-6-methyl-s-triazine (see Example 40) are mixed with 8.5 g of benzaldehyde and 11 ml of a 10% alcoholic potassium hydroxide solution and the mixture is left to stand for 24 hours. The precipitated 2-(2'-hydroxyphenyl)-4-p-tolyl-6-styryl-s-triazine is filtered off under suction and recrystallized from a mixture of ethanol and water.

By using instead of benzaldehyde the equivalent amounts of the substituted benzaldehydes listed in column 2 of the table below and following otherwise the description given in the foregoing example, there are obtained triazines of Formula XVI, the $R_9$ and $R_{10}$ of which are hydrogen, the $R_{11}$ of which is 4''-methyl and the $R_1$ of which is listed in column 3 of the following table:

Table 6

| Example No. | Substituted benzaldehydes | $R_1$ |
|---|---|---|
| 133 | p-ethylbenzaldehyde | p-ethylstyryl |
| 134 | m-ethoxybenzaldehyde | m-ethoxystyryl |
| 135 | o-chlorobenzaldehyde | o-chlorostyryl |
| 136 | p-bromobenzaldehyde | p-bromostyryl |

EXAMPLE 137

A solution of 15 g of acetyl cellulose (having on the average 2.5 esterified hydroxyl groups per glucose unit), 0.3 g of a UV absorber described in the following Table 7 and 2.0 g of dibutyl phthalate in 82.7 g of acetone are painted to form a film on a glass plate. The cellulose acetate films, which are first dried at room temperature and then in an oven at 60°, are 0.04 mm thick. Samples of these films are exposed in a fadeometer for 1000 hours and then their brittleness is tested. The results are summarised in Table 7:

Table 7

| No. | UV absorber | behaviour of film on folding | |
|---|---|---|---|
| | | before | after 1000 hours' exposure |
| 1. | 2-(2'-hydroxyphenyl)-4-methyl 6-phenyl-s-triazine | unchanged | unchanged |
| 2. | 2-(2'-hydroxyphenyl)-4-ethyl-6-phenyl-s-triazine | do | do |
| 3. | 2-(2'-hydroxyphenyl)-4-cyclohexyl-6-phenyl-s-triazine | do | do |
| 4. | 2-(2',4'-dihydroxyphenyl)-4-cyclohexyl-6-phenyl-s-triazine | do | do |
| 5. | without UV absorber | do | breaks |

The results given in Table 7 show that acetyl cellulose films stabilised according to the invention have considerably better mechanical properties than untreated films.

Films made from cellulose triacetate, cellulose tripropionate and cellulose acetobutyrate can be stabilised against the effect of light in the same way.

EXAMPLE 138

Difficulty combustible polyester resin, after the addition of 0.5% by weight of 2-(2',4'-dihydroxyphenyl)-4- cyclohexyl-6-phenyl-s-triazine, is polymerised with 1% by weight of benzoyl peroxide at 80° to form sheets about 2.5 mm thick. The sheets are cured at 120°.

Sheets so produced show considerably less brown colouration on exposure than those produced without the addition mentioned above of the s-triazine derivative. After an exposure of 500 hours in the fadeometer, the stabilised sheets has a transmission of 82% (measured at 500 m$\mu$, transmission before exposure 88% whilst an unstabilised sheet having the same transmission before exposure only transmits 73% of the light at 500 m$\mu$ after the same exposure time.

The polyester resin used is produced as follows: A mixture of 343 g of maleic acid anhydride and 428 g of tetrachlorophthalic acid anhydride is added in portions at 80° to a mixture of 170 g of ethylene glycol and 292 g of diethylene glycol. After replacing the air in the reaction vessel by nitrogen, the temperature is raised within 1 hour to 150° and then to 210° within 9 hours, kept there for 1 hour and then reduced to 180°. Vacuum is applied and the pressure is slowly reduced to 100 mm. These conditions are maintained until the acid number of the reaction mixture has sunk below 50.

100 g of this polyester are mixed with 50 g of styrene and the mixture is polymerised under the conditions given above.

Instead of the difficulty combustible polyester resin, also other polyester resins can be protected from browning due to light by the process given in the first paragraph of this example with the same result. Such a polyester resin is obtained if the terachlorophthalic acid anhydride in the third paragraph of this example is replaced by equimolar amounts of phthalic acid anhydride and otherwise the same procedure is followed.

Polyester resins which are produced according to the process given in the third paragraph of this example but with the use of methylmethacrylate instead of styrene, have less tendency to turn brown and also can be stabilised by smaller amounts of the UV absorbers mentioned above.

EXAMPLE 139

100 Parts of methacrylic acid methyl ester, 0.2 parts of 2-(2'-hydroxy-5'-chlorophenyl)-4-phenyl-6-decyl-s-triazine and 0.2 parts of lauroyl peroxide are mixed and polymerised at a temperature of 50°–60° into sheets of 2 mm thickness.

As can be seen from the following Table, such sheets can be used as colourless UV filters.

Table 8

| No. | UV absorber | % transmission of light of wavelength at | |
|---|---|---|---|
| | | 380 m$\mu$ | 450 m$\mu$ |
| 1. | without UV absorber | 90 | 92 |
| 2. | 2-(2'-hydroxy-5'-chlorophenyl)-4-phenyl-6-cyclohexyl-s-triazine | 4 | 92 |

Corresponding results are obtained if, with sheets of 2 cm thickness, the concentration of UV absorber is reduced to 0.02 %.

EXAMPLE 140

A mixture of 660 g of pulverulent emulsion polyvinyl chloride (K value 72, bulk density 0.43), 330 g of dioctyl phthalate and 10 g of 2-(2'-hydroxyphenyl)-4-$\beta$-methylmercaptoethyl-6-phenyl-s-triazine are worked up on a two roll mill at 150° into films.

On exposing films so produced, brown spots occurs after a 1.5 to 2 times longer period than they occur on films produced without the addition of 2-(2'-hydroxyphenyl)-4-$\beta$-methylmercaptoethyl-6-phenyl-s-triazine.

Similar results are obtained if polyvinyl chloride having a K value of 74 and a bulk density of 0.46 is used.

The addition of 10 g of barium-cadmium laurate to the above mixture produces films which are stabilised both to the effect of heat as well as light.

EXAMPLE 141

Polyethylene of medium molecular weight of 28,000 and a density of 0.917 is mixed at 180° in a Brabender plastograph with 1% of its total weight of 2-(2'-hydroxyphenyl)-4-decyl-6-phenyl-s-triazine and the mass so obtained is pressed in a platen press at 165° into 1 mm thick sheets.

These sheets have considerably less tendency to brittleness on weathering than those produced without the addition of the triazine derivative mentioned.

Similar results are obtained if, instead of the polyethylene, polypropylene is used but then mixing must be done at 220° and pressing at 180°.

EXAMPLE 142

100 Parts of granulated polycaprolactam (Grilon, Emserwerke AG, Domat-EMS, Switzerland) and 1 part of 2-(2'-hydroxy-4'-methoxyphenyl)-4-phenyl-6-cyclohexyl-s-triazine are melted together at 255° in an autoclave having a die in the floor, while excluding air. The melt is pressed by nitrogen pressure through the die.

The homogeneous mass so obtained absorbs UV light and can be used for the production of UV dense packing material.

The polymerisation of 100 parts of caprolactam in the presence of 1 part of 2-(2'-hydroxy-4'-methoxyphenyl)-4-phenyl-6-cyclohexyl-s-triazine by usual methods give a polymer of similar properties.

UV dense material is also obtained if, instead of the polycaprolactam, polyhexamethylene adipamide is used.

EXAMPLE 143

Bleached maple veneer is painted with a lacquer for wood of the following composition: 15.0 parts of Cellit F 900 (Bayer, Leverkusen, Germany) having about 56% acetic acid content, 10.0 parts of dimethyl glycol phthalate, 2.25 parts of 2-(2'-hydroxyphenyl)-4-phenyl-6-ethyl-s-triazine (corresponding to 15% by weight calculated on the acetyl cellulose), 5.0 parts of methyl alcohol, 10.0 parts of toluene and 50.0 parts of ethyl acetate. The natural yellowing of the wood is greatly retarded by this lacquer.

PART IV

In the fourth aspect, the present invention concerns a fourth class of new o-hydroxyphenyl-s-triazines which are characterized by a long wave-length absorption, the maximum of which lies in the range of about 350 to 370 mμ, and which are distinguished from the compounds of Parts I, II and III of this invention by a vastly improved stabilizing power for substrates sensitive to long wave-length UV light such as polyester resins defined more in detail hereinafter, while not being quite as free of inherent color as the compounds falling under the last-mentioned parts of the invention; this aspect of the invention further relates to processes for the production of these new triazines, their use for the stabilization of light-sensitive organic material and for the production of light filters, also as industrial product, the organic materials stabilized with the aid of these triazines, as well as to light filters which contain the new o-hydroxyphenyl-s-triazines.

It has been found that valuable UV absorbers are obtained by either reacting substantially equimolar amounts of an oxazine compound of Formula XI, i.e. the formula

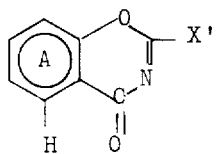
(XI)

in which X' has the meaning given hereinbefore, namely, it represents alkyl, alkenyl, cycloalkyl or aralkenyl, all of which groups may be substituted, as described further below, with an amidine of the formula

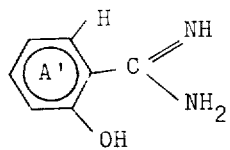
(XXIII)

or by reacting substantially equimolar amounts of an oxazine of the formula

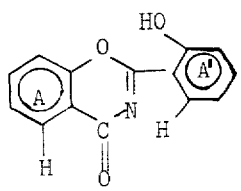
(XXIV)

with an amidine of formula

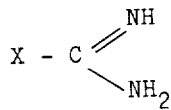
(XXV)

wherein X has the meaning given hereinbefore, namely, hydrogen, or one of the groups represented by X', supra, to form a triazine compound of formula XXVI.

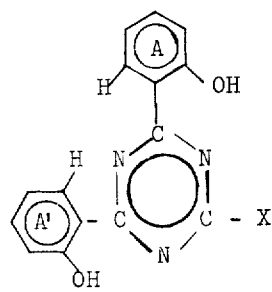
(XXVI)

in which formula X has the above-given meaning, and the benzene rings A and A' can be further substituted in the 3-, 4- and 5-positions by alkyl, alkenyl, cycloalkyl, aralkyl, aryl, free, etherified or acylated hydroxyl groups and/or by halogen.

Any of the substituents named can be chemically transformed by reactions subsequent to the triazine ring formation, examples of which transformations are given.

Alkyl groups symbolized by X in Formulas XXV and XXVI and X' in Formula XI have 1 to 18 carbon atoms. Examples are the methyl, ethyl, propyl, isopropyl, butyl, tert. butyl, amyl, hexyl, octyl, decyl, dodecyl, tetradecyl, hexadecyl or octadecyl group; of these, alkyl groups having 1 to 10 carbon atoms are preferred. The alkyl groups may be further substituted if desired. Substituted alkyl groups correspond, among others, to the formula -alkylene-E-$D_1$, for example. In this formula alkylene represents a divalent aliphatic radical having in particular 1 to 12, preferably 1 to 4 carbon atoms, and E represents either —O— or —S— or —N($D_2$). $D_1$ and $D_2$ independently of each other represent an alkyl radical containing preferably 1 to 8 carbon atoms and each also represents hydrogen if E is oxygen or nitrogen. Suitable groups of the formula -alkylene-E-$D_1$, are, for example, the ω-hydroxyalkyl, ω-alkoxyalkyl, ω-alkylmercaptoalkyl, ω-aminoalkyl groups such as the hydroxymethyl, 2-hydroxyethyl, 2-methoxyethyl, 2-ethoxyethyl, 2-butoxyethyl, 2-methylmercaptoethyl, 2-butylmercaptoethyl, 2-dodecylmercaptoethyl, 2-N,N-dimethylaminoethyl or 2-N,N-diethylaminoethyl or the ω-aminodecyl group. Each of X and X' can also be a halogenoalkyl group having preferably 1 to 4 carbon atoms such as the chloromethyl, bromomethyl, 2-chloroethyl or 4-chlorobutyl group. In addition, X and X' can also be a carboxyalkyl group having a free or modified carboxyl group. Of those having a modified carboxyl group, the esters, amides and nitriles are preferred. As alkenyl group, X and X' represent, for example, the vinyl group, the $\Delta^1$- or $\Delta^2$-propenyl or $\Delta^8$-heptadecenyl group. Of these, low alkenyl groups having 2 to 6 carbon atoms are preferred. It is possible for the alkenyl groups to be substituted by aryl groups and then they represent e.g. the β-phenylvinyl (=styryl group) or the β-phenyl-β-methyl-vinyl group. As cycloalkyl group, X and X' contain 5 to 10, preferably however, 6 to 7 carbon atoms. Examples are the cyclohexyl, methylcyclohexyl or ethylcyclohexyl group. If X and X' represents an aralkenyl group, then this contains 7 to 12, preferably 7 to 9 carbon atoms; examples are the benzyl, phenethyl, p-butylbenzyl, p-chlorobenzyl or p-methoxybenzyl group.

The benzene rings A and A' of Formulas XI, XXIII, XXIV and XXVI can be further substituted as defined. The alkyl groups which can be substituents of these benzene rings have 1 to 18, preferably 1 to 10 carbon atoms, alkenyl groups as ring substituents have 2 to 18, preferably 2 to 5 carbon atoms; such substituents are thus, e.g. the methyl, tert. butyl or tert. octyl group or the allyl or methallyl group. Cycloalkyl or aralkyl groups as substituents of the benzene rings advantageously are those having 5 to 8, and 7 to 10 carbon atoms respectively, e.g. the cyclohexyl group and the benzyl or 1-phenylethyl group respectively, aryl groups used as substituents of the benzene rings A and A' are, in particular, of the benzene series and have 6 to 10 carbon atoms; they can be further substituted in the usual way. Examples are the phenyl, a methylphenyl, chlorophenyl or methoxyphenyl group. If the benzene rings A and A' contain acylated hydroxyl groups, then the acyl radical thereof is derived in particular from an aliphatic carboxylic acid having at most one double bond and having 1 to 18, preferably 1 to 10 carbon atoms. The carboxylic acid radical can be substituted, in particular by carboxyl, carbo-low alkoxy and low alkoxy groups. The acyl radical can also consist of a carbonic acid monoester radical having 2 to 11 carbon atoms. Examples of acyl radicals in acyloxy substituents of the benzene rings A and A' are the radical of acetic, propionic, stearic, acrylic, crotonic, β-carboxypropionic, β-carbomethoxypropionic, β-carbethoxypropionic, β-carbohexyloxypropionic, butoxyacetic, 2-methoxypropionic, cyclohexane carboxylic, phenylacetic, cinnamic, benzoic, chlorobenzoic, methylbenzoic, methoxybenzoic, butylbenzoic or o-carboxybenzoic acid or the carbomethoxy, carbethoxy, carbobutoxy, carbodecyloxy, carbocyclohexloxy, carbobenzyloxy, carbophenyloxy, carbochlorophenyloxy or carbocresyloxy radical. As estherified hydroxyl groups, the benzene rings A and A' contain substituents of the formula $R_5$—O—. Herein, $R_5$ represents, in particular, an alkyl, alkenyl or aralkyl group which may be substituted. Alkyl groups symbolized by $R_5$ have preferably 1 to 12 carbon atoms. These alkyl groups may be substituted, examples of substituents being halogens such as chlorine or bromine, free or etherified hydroxyl groups, cyano groups as well as free or modified carboxyl groups such as carboxylic acid ester and carboxylic acid amide groups. In the latter case, carboxylic acid alkyl amide groups having a tertiary amide nitrogen atom are preferred. Cyano and free or modified carboxyl groups can be at any carbon atom of the alkyl group whilst the halogens and free or etherified hydroxyl groups are bound to a carbon atom of this alkyl group which is different from the α-carbon atom. Examples of further substituted alkyl groups $R_5$ are the 2-chloroethyl, 2-bromoethyl, 2-hydroxyethyl, 4-hydroxybutyl, 2-methoxyethyl, 2-ethoxyethyl, 2-cyclohexyloxyethyl, 2-cyanoethyl, carboxymethyl, carbomethoxymethyl, carbethoxymethyl, carbodecyloxymethyl or the N,N-dimethylcarbamoylmethyl group. As alkenyl group, $R_5$ represents in particular a $\Delta^2$-propenyl group which can be substituted by low alkyl groups. If $R_5$ is an aralkyl group, it contains 7 to 12, preferably 7 to 9, carbon atoms; examples are the benzyl or a methylbenzyl group.

Particularly satisfactory effects are attained with those compounds falling under Formula XXVI which are of the formula

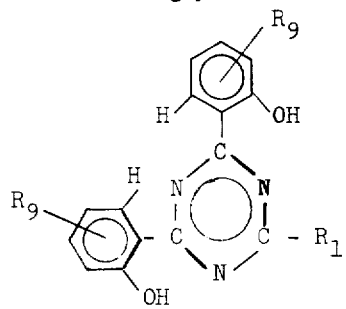

(XXVII)

wherein $R_1$ and $R_9$ have the meanings given hereinbefore. Compounds of Formulas XXVI and XXVII have a molecular weight between 260 and 700; the molecular weight of compounds falling under these formulas having particularly good absorption and solubility properties is between 260 and 600.

Of the compounds falling under Formula XXVII those offering the best compromise of properties required for good light stabilization of non-reactive substrates such as polyvinyl chloride, and polyester resins on the one hand, and on the other hand, being prepared most economically, are the compounds of the formula

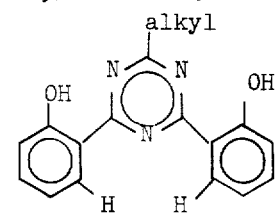

(XXVIII)

wherein alkyl has from 1 to 14 carbon atoms and has the meaning given hereinbefore.

Compounds according to Part IV of the invention which possess a high absorptivity in the range of from 350 to 370 mμ but, in the case of corresponding substituents, of slightly lower inherent light fastness than the compounds of Formula XXVIII, are those of the formula

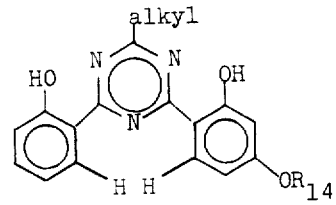

(XXIX)

wherein alkyl has the meaning as in the preceding formula and $R_{14}$ has the meaning given hereinbefore.

Compounds falling under Formula XXVII which possess a particularly high absorptivity in the range of 350 to 370 mμ and are especially useful in the production of lightfilters for said UV-range, but have a somewhat lower protective power for polyester resins, are those of the formula

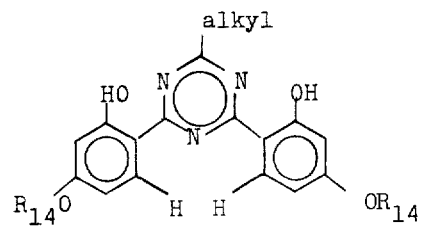

(XXX)

wherein $R_{14}$ and alkyl have the same meanings as in the preceding formula.

By using, in the preparation of the starting materials of Formula XXIV, salicyl imides of the formula

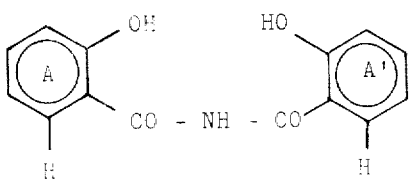

which are non-identically substituted in rings A and A', two isomeric oxazines can be formed upon ring closure. Both such isomers, however, yield one and the same triazine of Formula XXVI upon reaction with the amidine of Formula XXV.

In view of the above, when a benzoxazinone is given hereinafter as starting material, this covers also the case where such starting material is a mixture of the two isomers.

Examples of starting compounds of Formula XIV are:

2-(2'-hydroxyphenyl)-, 2-(2'-hydroxy-5'-methylphenyl)-, 2-(2'-hydroxy-5'-chlorophenyl)-, 2-(2'-hydroxy-3',5'-dichlorophenyl)-, 2-(2'-hydroxy-5'-octylphenyl)-, 2-(2'-hydroxy-5'-cyclohexylphenyl)-, 2-(2'-hydroxy-5'-benzylphenyl)-, 2-(2'-hydroxy-5'-phenylphenyl)-, 2-(2'-hydoxy-4'-methoxyphenyl)-, 2-(2'-hydroxy-4'-octyloxyphenyl)-, 2-(2',4'-dihydroxyphenyl)-4H-1,3-benzoxazinone-(4), 2-(2'-hydroxyphenyl)-6-chloro-, 2-(2'-hydroxyphenyl)-6,8-dichloro-, 2-(2'-hydroxylphenyl)-6-cyclohexyl-, 2-(2'-hydroxyphenyl)-7-octyloxy-, 2-(2'-hydroxyphenyl)-7-acetoxy-, 2-(2'-hydroxy-5'-methylphenyl)-6-methyl-, 2-(2'-hydroxy-4'-butoxyphenyl)-7-butoxy-, 2-(2'-hydroxy-4'-butoxyphenyl)-7-butoxy-, 2-(2'-hydroxy-5'-tert. butylphenyl)-7-methoxy- or 2-(2',4'-dihydroxy-5'-ethylphenyl)-7-hydroxy-4H-1,3-benzoxazinone-(4).

Amidines of Formula XXV to be reacted therewith are, e.g., the amidines of formic, acetic, propionic, decanoic, crotonic acid, or cyclohexane carboxylic acid.

Examples of starting materials of Formula XI are 2-methyl-, 2-propyl-, 2-octyl-, 2-heptadecyl-, 2-cyclohexyl-, 2-propyl-6-chloro-, 2-methyl-7-octyloxy-, 2-methyl-6,8-dichloro-, 2-ethyl-6-cyclohexyl-, 2-methyl-6-tert. octyl-, 2-butyl-8-phenyl-, 2-methyl-7-acetoxy- or 2-cyclohexyl-7-methyl-4H-1,3-benzoxazinone-(4).

Amidines of Formula XXIII to be reacted therewith are, for example, the ones of: 2-hydroxybenzoic acid, 2-hydroxy-5-methylbenzoic acid, 2-hydroxy-4-methoxybenzoic acid and 2-hydroxy-5-cyclohexylbenzoic acid.

The o-hydroxyphenyl-triazines of Formula XXVI are produced by heating the starting materials of Formulas XI and XXIII or XXIV and XXV, preferably in about equimolar amounts. This reaction is performed advantageously in boiling organic solvents, particularly when amidines having a high melting point are used. Suitable solvents are mainly alcohols such as methanol, ethanol or ethylene glycol monomethyl or monoethyl ether or, also, dioxan.

Any reaction substituents present in the new o-hydroxyphenyl-s-triazines can be subsequently altered if desired. For example, an alkoxyalkyl group in X of Formula XXVI is converted by treatment with hydrobromic acid into the corresponding bromoalkyl group. Aliphatically bound halogen in compounds of Formula XXVI can be exchanged by hydroxy groups, an ether group or an amino group by reaction with aqueous sodium hydroxide solution, with alkali alcoholates or phenolates or with ammonia or primary or secondary amines; phenolic hydroxyl groups which are contained as substituents in rings A and/or A' of Formula XXVI, as well as alcoholic hydroxyl groups in compounds of said formula, can be esterified or etherified. Thus, for example, o-hydroxyphenyl-s-triazines of the present invention which contain as benzene ring substituents etherified or acylated hydroxyl groups in m- and/or p-position to the bond to the triazine ring, are advantageously produced by etherification or acrylation of the corresponding di- or polyhydroxyphenyl-s-triazines. Suitable acylating agents in this case are the carboxylic acid anhydrides and, chiefly, the halides of carboxylic acids or of carbonic acid monoesters, i.e., for example, acetanhydride, acetyl chloride or chloroformic acid alkyl ester. Ketenes, however, can also be used as acylating agents. Suitable etherifying agents are the esters of strong acids such as hydrochloric, hydrobromic, hydroiodic acid or sulfuric acid, benzene sulfonic acid or p-toluene sulfonic acid with alcohols, particularly with low alkanols, alkenols or with aralkyl alcohols. Examples of suitable etherifying agents are: dimethyl or diethyl sulfate, butyl bromide or iodide, allyl chloride or benzyl chloride.

Compounds of Formula XXVI in which X is an alkenyl radical are obtained by the methods usual in organic chemistry advantageously from corresponding compounds in which X has the meaning of a halogenoalkyl, hydroxyalkyl, alkoxyalkyl or aminoalkyl radical, by removal of hydrohalic acid or by splitting off water or alcohol or amine, (in the latter case possibly after conversion into quaternary ammonium salts). Such triazines having unsaturated side chains can also be produced by reacting simple alkyl triazines, particularly methyl triazines, with aldehydes while splitting off water.

The new o-hydroxyphenyl-s-triazines are distinguished by excellent fastness to light, favorable absorption in the long wave UV region and good tolerance to the carriers used therefor.

Compounds which contain double bonds in the side chains which are in conjunction with the triazine ring, i.e. those in which X or Y is a $\Delta^1$-alkenyl or $\Delta^1$-aralkenyl group, particularly a $\beta$-phenylvinyl group, are distinguished by particularly high absorption power. In general, however, they are somewhat less fast to light than compounds which do not contain such conjugated double bonds in the side chains.

For use in polyolefinic carriers such as polyethylene and polypropylene, compounds of the following Formula are preferred:

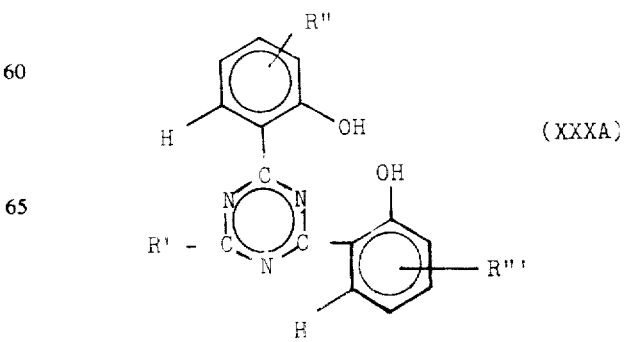

(XXXA)

In this formula, R', R'' and R''' independently of each other each represent hydrogen or an alkyl group, in addition R'' and R''' also represent an alkoxy group, R', R'' and R''' together having preferably 6 to 17 carbon atoms. Of the compounds of Formula XXXA, the ones in which R' contains $n$ carbon atoms, $n$ being a whole number, R'' is hydrogen with at least 2 and at most 17-n carbon atoms and R''' is hydrogen, are particularly useful for said application.

In polar carriers, preferably those compounds of Formula XXVI are used in which any alkyl groups present have less than 11 carbon atoms.

The same carrier materials, including substrates, to be stabilized against deterioration by ultraviolet light can be employed for incorporation, and/or protected by the light-stabilizing compounds according to this fourth aspect of the invention as have been enumerated hereinbefore as useful in combination with the compounds according to the first aspect of the invention, taking, however, into account the differences in properties between the two classes of new light stabilizers which are more closely defined by Formulas IV and V, regarding the first aspect, and Formulas XXVI to and with XXXA regarding the fourth aspect of this invention.

New compositions of light-stabilized polymeric materials in which compounds falling under Formulas XXVI, XXVII, XXVIII, XXIX, XXX or XXXA are the light-stabilizing ingredients, are produced in the same manner as described under the first aspect of this invention with regard to the incorporation of compounds falling under Formulas IV and V, supra, into the various carriers listed under the first aspect of the invention.

Thus, what has been said there about the incorporation of light-stabilizing compounds having reactive groupings into polymer melts or monomer mixtures being polymerized, applies equally to the compounds falling under the fourth aspect of the invention.

Likewise, protective coatings and covers containing compounds falling under Formulas XXVI to and with XXXA and UV-absorbers can be produced and employed in the same general manner as described under the first aspect of the invention.

The following examples illustrate the fourth aspect of the invention.

EXAMPLE 144

6 g of pentanoic acid amidine hydrochloride are added in portions to a solution of 2.5 g of dry sodium methylate in 50 ml of anhydrous ethanol. The mixture obtained is stirred for 1 hour at room temperature, 9 g of 2-(2'-hydroxyphenyl)-4H-1,3-benzoxazinone-(4) are then added and the whole is refluxed for 3 hours. After cooling, water is added to the reaction mixture dropwise until the sodium chloride has dissolved. The 2,4-bis-(2'-hydroxyphenyl)-6-butyl-s-triazine which precipitates is filtered off under suction, dried and recrystallized from ethanol whereupon it melts at 110°.

The same product is obtained if, instead of the benzoxazinone used above, 9.6 g of disalicylic acid imide are used and otherwise the same procedure is followed.

The necessary 2-(2'-hydroxyphenyl)-4H-1,3-benzoxazinone-(4) is produced as follows: 13.7 g of salicylic acid amide and 21.4 g of salol are melted at 180° in a round flask fitted with a distillation apparatus. The mixture is kept for 6 hours at this temperature and the phenol and water formed are continuously distilled off in vacuo. The still warm melt is then poured into 50 ml of ethanol and the 2-(2'-hydroxyphenyl)-4H-1,3-benzoxazinone-(4) which precipitates is filtered off under suction and recrystallized from ethylene glycol monomethyl ether. It melts on the Kofler bench at 203° and is yellow coloured. On adding cold aqueous 2n sodium hydroxide solution, the orange coloured sodium salt, which is only slightly soluble, is formed.

Following the same procedure as given hereinbefore from substituted salicyclic acid amides and substituted salol there are obtained the correspondingly substituted 2-(2'-hydroxyphenyl)-4H-1,3-benzoxazinones-(4).

The necessary disalicylic acid imide is obtained as follows: 27.4 g of salicylic acid amide are melted at 180° and a weak stream of hydrogen chloride is continuously directed through the melt for 3 hours. The melt is then stirred with a large quantity of cold water and the product which precipitates is filtered off under suction, dried and recrystallized from chlorobenzene. On the Kofler bench, the disalicylic acid imide so obtained melts spontaneously at about 250° but above about 190° water is splitted off and it changes into the 2-(2'-hydroxyphenyl)-4H-1,3-benzoxazinone-(4) mentioned above when it then melts at 203°. The disalicylic acid imide is pale yellow coloured and it dissolves easily in cold aqueous 2n sodium hydroxide solution with a yellow colour.

EXAMPLE 145

7 g of cyclohexane carboxylic acid amidine hydrochloride are added in portions to a solution of 2.3 g of dry sodium methylate in 50 m of anhydrous butanol. The mixture obtained is stirred for 1 hour at room temperature, 4 g of 2-(2'-hydroxyphenyl)-4H-1,3-benzoxazinone-(4) are then added and the whole is refluxed for 2 hours. After cooling, the same volume of a mixture of methanol and water is added dropwise to the reaction mixture until the sodium chloride has dissolved and the 2,4-bis-(2'-hydroxyphenyl)-6-cyclohexyl-s-triazine formed has completely separated. It is filtered off under suction, dried and recrystallized from ethylene glycol monoethyl ether, whereupon it melts at 194°.

EXAMPLE 146

4.5 g of undecanoic acid amidine hydrochloride are added in portions to a solution of 1.1 g of sodium methylate in 50 ml of anhydrous ethanol. The mixture so obtained is stirred for 1 hour at room temperature, 5.5 g of the benzoxazinone obtained from the melt of salicylamide and 5-chloro-salole are then added and the whole is refluxed for 4 hours. The cooled reaction mixture is filtered, the residue is washed with water until it is free of sodium chloride and then it is recrystallized from ethanol. The 2-(2'-hydroxyphenyl)-4-(2'-hydroxy-5'-chlorophenyl)-6-decyl-s-triazine so obtained melts at 86°.

EXAMPLE 147

7.0 g of ω-methylmercaptopropanoic acid amidine hydrochloride are added in portions to a solution of 1.1 g of sodium methylate in 50 ml of anhydrous ethanol. The mixture obtained is stirred for 1 hour at room temperature, then 9 g of 2-(2'-hydroxyphenyl)-4H-1,3-benzoxazinone-(4) are added and the whole is refluxed for 4 hours. The same volume of water is added to the cooled reaction mixture. The reaction product which precipitates is isolated, washed with water and then recrystallized from glacial acetic acid. The 2,4-bis-(2'-hydroxyphenyl)-6-methylmercaptoethyl-s-triazine so obtained melts at 136°.

EXAMPLE 148

10 g of undecanoic acid amidine hydrochloride are added in portions to a solution of 1.1 g of sodium methylate in 50 ml of anhydrous ethanol. The mixture obtained is stirred for 1 hour at room temperature, then 9 g of 2-(2'-hydroxyphenyl)-4H-1,3-benzoxazinone-(4) are added and the whole is refluxed for 4 hours. The same volume of water is added to the cooled reaction mixture. The reaction product which precipitates is isolated, washed with water and then recrystallized from ethanol. The 2,4-bis-(2'-hydroxyphenyl)-6-decyl-s-triazine so obtained melts at 97°.

EXAMPLE 149

3.5 g of methanoic acid amidine hydrochloride ( = formamidine hydrochloride ) are added in portions to a solution of 1.1 g of sodium methylate in 50 ml of anhydrous ethanol. The mixture so obtained is stirred for 1 hour at room temperature, 9 g of 2-(2'-hydroxyphenyl)-4H-1,3-benzoxazinone-(4) are then added and the whole is refluxed for 6 hours. Water is added dropwise to the cooled reaction mixture until the sodium chloride has dissolved and the 2,4-bis-(2'-hydroxyphenyl)-s-triazine which has formed has precipitated. The latter is filtered off under suction and recrystallized from ethanol whereupon it melts at 190°.

The same product is also obtained when the procedure is as follows:

4.5 g of 2,4-bis-(2'-hydroxyphenyl)-6-ethylmercapto-s-triazine (M.P. 150°, obtained by reacting S-ethyl thiourea with 2-(2'-hydroxyphenyl)-4H-1,3-benzoxazinone-(4), are dissolved in 200 ml of freshly distilled dioxan. 60 g of freshly prepared Raney nickel are added to the solution so obtained, the whole is stirred for 4 hours at 60°, cooled and filtered. The filtrate is evaporated to dryness at 70° in vacuo and the residue is recrystallized from alcohol. The 2,4-bis-(2'-hydroxyphenyl)-s-triazine so obtained melts at 190°.

EXAMPLE 150

4 g of the β-methyl cinnamic acid amidine hydrochloride (obtained from β-methyl cinnamic acid nitrile according to Pinner), 1.1 g of sodium methylate and 4.8 g of 2-(2'-hydroxyphenyl)-4H-1,3-benzoxazinone-(4) are reacted as described in example 144. The crude 2,4-bis-(2'-hydroxyphenyl)-6-(β-methylstyryl)-s-triazine obtained is recrystallized from ethylene glycol monomethyl ether and then melts at 179°.

EXAMPLE 151

4.6 g of the propanoic acid amidine hydrochloride, 1.6 g of sodium methylate and 5.4 g of the benzoxazinone obtained from the melt of salicylamide and 2-hydroxy-4,5-dimethyl benzoic acid phenyl ester, are reacted as described in example 144. The 2-(2'-hydroxyphenyl)-4-(2''-hydroxy-4'',5''-dimethylphenyl)-6-ethyl-s-triazine obtained is recrystallized from dimethyl formamide and then melts at 170°.

EXAMPLE 152

1.2 g of acetamidine hydrochloride, 0.7 g of sodium methylate and 3 g of 2-(2'-hydroxy-4'-methoxyphenyl)-7-methoxy-4H-1,3-benzoxazinone-(4), (obtained from the melt of 2-hydroxy-4-methoxybenzoic acid phenyl ester and 2-hydroxy-4-methoxybenzamide) are reacted as described in example 144 to form 2,4-bis-(2'-hydroxy-4'-methoxyphenyl)-6-methyl-s-triazine. On recrystallizing from ethylene glycol monomethyl ether it melts at 200°. 6.6 g of this s-triazine are mixed with 8.5 g of benzaldehyde and 11 ml of a 10% alcoholic potassium hydroxide solution and the mixture is left to stand for 24 hours. The precipitated 2,4-bis-(2'-hydroxy-4'-methoxyphenyl)-6-styryl-s-triazine is filtered off under suction and recrystallized from n-butanol whereupon it melts at 206°.

EXAMPLE 153

2.1 g of acetamidine hydrochloride, 0.5 g of sodium and 6 g of the benzoxazinone obtained from the melt of 2-hydroxy-4-octoxybenzoic acid phenyl ester and 2-hydroxy-4-methoxybenzamide, are reacted in 50 ml of anhydrous ethanol as described in example 144. After recrystallization from methylethyl ketone, the 2-(2'-hydroxy-4'-methoxphenyl)-4-(2''-hydroxy-4''-octoxyphenyl)-6-methyl-s-triazine obtained melts at 99°.

EXAMPLE 154

4.2 g of the α-methylpropanoic acid amidine hydrochloride, 1.6 g of sodium methylate and 6 g of the benzoxazinone obtained by reacting 2-hydroxy-3,5-dimethylbenzoic acid phenyl ester and 2-hydroxy-4-methoxybenzamide in the melt, are reacted in 50 ml of isopropanol as described in example 144. The product obtained is recrystallized from dimethyl formamide and then melts at 170°. It is 2-(2'-methoxyphenyl)-4-(2''-hydroxy-3'',5''-dimethylphenyl)-6-isopropyl-s-triazine.

EXAMPLE 155

3 g of the propanoic acid amidine hydrochloride, 1.6 g of sodium methylate and 6 g of the benzoxazinone obtained by reacting 2-hydroxy-3,5-dimethylbenzamide and 2-hydroxy-5-chlorobenzoic acid phenyl ester in the melt, are reacted in 30 of dimethyl formamide as described in example 144. 2-(2'-hydroxy-3',5'-dimethylphenyl)-4-(2''-hydroxy-5''-chlorophenyl)-6-ethyl-s-triazine is obtained. On recrystallizing from dimethyl formamide it melts at 172°.

EXAMPLE 156

1.5 g of chloracetamidine hydrochloride, 0.65 g of sodium methylate and 4.8 g of 2-(2'-hydroxyphenyl)-4H-1,3-benzoxazinone-(4) are reacted in 30 ml of anhydrous alcohol as described in example 144. The 2,4-bis-(2'-hydroxyphenyl)-6-chloromethyl-s-triazine obtained melts, after recrystallizing twice from ligroin, at 182°.

EXAMPLE 157

2.3 g of pentanoic acid amidine hydrochloride, 0.85 g of sodium methylate and 4.1 g of the benzoxazinone obtained by reacting salicylamide and 4-methoxysalicylic acid phenyl ester in the melt are reacted as described in example 144. The crude product is recrystallized from ethylene glycol monomethyl ether and then melts at 117°. It is 2-(2'-hydroxy-4'-methoxyphenyl)-4-(2''-hydroxyphenyl)-6-butyl-s-triazine.

By the same methods as described in the foregoing examples, identified in the last column of the table below, there are obtained compounds falling under Formula XXVII having substituents $R_1$ and $R_9$ from staring materials of Formulas XXIV and XXV, or Formulas XI and XXIII, in which formulas X and X', respectively correspond to $R_1$, and $R_9$ corresponds to the substituents of rings A and A' in Formulas XI, XXIII and XXIV, which substituents $R_1$ and $R_9$ are given in Table 9 below:

Table 9

| Example No. | $R_1$ | $R_9$ in Ring A | $R_9$ in Ring A' | Method of Preparation according to Example No. |
|---|---|---|---|---|
| 158 | heptadecyl | 5'-bromo | 3'',5''-dimethyl | 144 |
| 159 | methyl | 5'-tert. octyl | H | 144 |
| 160 | methyl | 5'-dodecyl | H | 144 |
| 161 | ω-methoxy-carbonyldecyl | 3'-allyl | H | 144 |
| 162 | methyl | 3'-octen-2-yl | H | 144 |
| 163 | methyl | 5'-cyclohexyl | H | 144 |
| 164 | methyl | 5'-(4''-methylcylohexyl) | H | 144 |
| 165 | dodecyl | 5'-p-methylbenzyl | H | 144 |
| 166 | methyl | 5'-α-phenylethyl | H | 144 |
| 167 | methyl | 5'-o-chlorobenzyl | H | 144 |
| 168 | methyl | 4'-p-bromobenzyl | H | 144 |
| 169 | octoxycarbonylmethyl | 3'-phenyl | 4'',5''-dimethyl | 144 |
| 170 | methyl | 5'-p-tert.butylphenyl | H | 144 |
| 171 | methyl | 5'-p-bromophenyl | H | 144 |
| 172 | methyl | 5'-p-chlorophenyl | H | 144 |
| 173 | ω-carboxydecyl | 4'-acetoxy | H | 144 |
| 174 | methyl | 4'-stearoyloxy | H | 144 |
| 175 | methyl | 4'-methacryloyloxy | H | 144 |
| 176 | methyl | 5'-oleyloxy | H | 144 |
| 177 | heptadecen-8-yl | 4'-γmethoxycarbonylpropionyloxy | H | 144 |
| 178 | methyl | 4'-ω-carboxynonanoyloxy | H | 144 |
| 179 | methyl | 4'-γ-methoxycarbonylpropionyloxy | H | 144 |
| 180 | methyl | 4'-δ-hexyloxycarbonylvaleroyloxy | H | 144 |
| 181 | methyl | 5'-β-carboxyacryloyloxy | H | 144 |
| 182 | methyl | 5'-β-carboxy-β-octylacryloyloxy | H | 144 |
| 183 | methyl | 5'-β-ethoxycarbonylacryloyloxy | H | 144 |
| 184 | methyl | 5'-β-methoxycarbonyl-β-octylacryloyloxy | H | 144 |
| 185 | methyl | 4'-benzoyloxy | H | 144 |
| 186 | methyl | 5'-p-methylbenzoyloxy | H | 145 |
| 187 | methyl | 5'-p-chlorobenzoyloxy | H | 145 |
| 188 | methyl | 4'-2'',4''-dibromobenzoyloxy | H | 145 |
| 189 | methyl | 5'-methoxycarbonyloxy | H | 145 |
| 190 | methyl | 4'-dodecyloxycarbonyloxy | H | 145 |
| 191 | methyl | 4'-cyclohexyloxycarbonyloxy | H | 145 |
| 192 | methyl | 4'-benzyloxycarbonyloxy | 3'',5''-dimethyl | 145 |
| 193 | methyl | 5'-phenoxycarbonyloxy | H | 145 |
| 194 | carboxymethyl | 4'-hydroxy | 4''-hydroxy | 145 |
| 195 | methyl | 4'-dodecyloxy | H | 145 |
| 196 | methyl | 4'-β-chloroethoxy | H | 145 |
| 197 | methyl | 4'-δ-chlorobutoxy | H | 145 |
| 198 | methyl | 4'-(α-bromomethyl)-heptyloxy | H | 145 |
| 199 | methyl | 4'-β-hydroxyethoxy | H | 145 |
| 200 | methyl | 4'-ω-hydroxydecyloxy | H | 145 |
| 201 | methyl | 4'-β-octoxyethoxy | H | 145 |
| 202 | methyl | 4'-δ-methoxybutoxy | 4''-methoxy | 145 |
| 203 | methyl | 4'-β-cyclohexyloxyethoxy | H | 145 |
| 204 | methyl | 4'-cyanomethoxy | H | 145 |
| 205 | methyl | 4'-β-cyanopropyloxy | H | 145 |
| 206 | methyl | 5'-carboxymethoxy | 5''-chloro | 148 |
| 207 | methyl | 4'-γ-carboxypropyloxy | H | 148 |
| 208 | methyl | 5'-octoxycarbonylmethoxy | H | 148 |
| 209 | methyl | 4'-γ-methoxycarbonylpropyloxy | H | 148 |
| 210 | methyl | 5'-N,N-dimethylcarbamylmethoxy | H | 148 |
| 211 | methyl | 5'-γ-(N,N-dimethylcarbamyl)propyloxy | H | 148 |

Table 9 – Continued

| Example No. | $R_1$ | $R_9$ in Ring A | $R_9$ in Ring A' | Method of Preparation according to Example No. |
|---|---|---|---|---|
| 212 | methyl | 4'-allyloxy | 4''-allyloxy | 148 |
| 213 | methyl | 4'-octen-(2'')-yloxy | H | 148 |
| 214 | methyl | 4'-benzyloxy | 4''-benzyloxy | 148 |
| 215 | methyl | 4'-α-phenylethoxy | H | 148 |
| 216 | 4-chlordecyl | 4'-p-methylbenzyloxy | H | 148 |
| 217 | methyl | 4'-p-ethyl-α-butyl-benzyloxy | H | 148 |
| 218 | ω-bromodecyl | 4'-chloro | H | 148 |
| 219 | bromomethyl | 4'-chloro | H | 148 |
| 220 | β-bromoethyl | H | H | 148 |
| 221 | methyl | H | H | 152 |
| 222 | p-ethylstyryl | H | H | 152 |
| 223 | m-ethoxystyryl | H | H | 152 |
| 224 | o-chlorostyryl | H | H | 152 |
| 225 | p-bromostyryl | H | H | 152 |
| 226 | methyl | 4'-octyloxy | H | 144 |
| 227 | cyclohexyl | 4'-methoxy | H | 144 |

The triazines listed in the foregoing table under the example numbers 222 to 225 are obtained from the 2,4-bis-(2'-hydroxyphenyl)-6-methyl-s-triazine (Example No. 221) by reacting the latter with p-ethylbenzaldehyde, m-ethoxybenzaldehyde, o-chlorobenzaldehyde or p-bromobenzaldehyde, respectively, following the description given in Example No. 152.

EXAMPLE 228

A mixture of 7,3 g of 2,4-bis-(2'-hydroxyphenyl)-6-bromomethyl-s-triazine (see Example No. 219), 5 g of sodium hydroxide, 50 ml of water and 100 ml of dioxane is refluxed for 4 hours. The reaction mixture is cooled and acidified with 2N hydrochloric acid. The precipitated 2,4-bis-(2'-hydroxyphenyl)-6-hydroxymethyl-s-triazine is filtered off under suction, dried and recrytallized several times from ethylene glycol monomethyl ether.

By using instead of sodium hydroxide and water the equivalent amount of the reagents listed in column 2 of the table below and following otherwise the description given in the foregoing example, there are obtained triazines of Formula XXVII, the $R_9$ of which is hydrogen and the $R_1$ of which is listed in column 3 of the following table:

Table 10

| Example No. | Reagent | $R_1$ |
|---|---|---|
| 229 | ammonia and water | aminomethyl |
| 230 | sodium octylate ($C_8H_{17}ONa$) and octanol | octyloxymethyl |
| 231 | sodium octylmercaptide ($C_8H_{17}SNa$) and octanol | octylthiomethyl |
| 232 | hexylamine | N-hexylaminomethyl |
| 233 | N,N-dioctylamine | N,N-dioctyl-aminomethyl |

EXAMPLE 234

A mixture of 10 g of 2-(2'-hydroxy-4'-chlorophenyl)-4-(2''-hydroxyphenyl)-6-ω-bromodecyl-s-triazine (see Example No. 218), 5 g of sodium hydroxide, 50 ml of water and 100 ml of dioxane is refluxed for 6 hours. The reaction mixture is cooled and acidified with 2N hydrochloric acid. The precipitated 2-(2'-hydroxy-4'-chlorophenyl)-4-(2''-hydroxyphenyl)-6-ω-hydroxydecyl-s-triazine is filtered off under suction, dried and recrystallized from ethanol.

By using instead of sodium hydroxide and water the equivalent amount of the reagents listed in column 2 of the table below and following otherwise the description given in the foregoing example, there are obtained triazines of Formula XXVII, the $R_9$ in ring A of which is hydrogen, the $R_9$ in ring A' of which is 4''-chloro and the $R_1$ of which is listed in column 3 of the following table:

Table 11

| Example No. | Reagent | $R_1$ |
|---|---|---|
| 235 | ammonia and water | ω-aminodecyl |
| 236 | sodium methylate and methanol | ω-methoxydecyl |
| 237 | sodium mercaptide and methanol | ω-methylthiodecyl |
| 238 | ethylamine | ω-N-ethylaminodecyl |
| 239 | N,N-dimethylamine | ω-N,N-dimethylaminodecyl |

EXAMPLE 240

By reacting 2,4-bis-(2'-hydroxyphenyl)-6-β-bromoethyl-s-triazine (Example No. 220) with an excess of sodium butanolate in n-butanol, 2,4-bis-(2'-hydroxyphenyl)-6-vinyl-s-triazine is obtained.

EXAMPLE 241

A solution of 15 g of acetyl cellulose (having an average of 3 hydroxyl groups, of which 2.5 are esterified, per glucose unit), 0.3 g of a UV absorber described in the following Table 12, and 2.0 g of dibutyl phthalate in 82.7 g of acetone are painted on a glass plate to form a film. The cellulose acetate films which were dried first at room temperature and then in the oven at 60°, are 0.04 mm thick. Samples of these films are exposed in a fadeometer for 1000 hours and then their brittleness is tested. The results are summarised in Table 12.

Table 12

| No. | UV absorber | behaviour of films on folding before 1000 hours' exposure | and after |
|---|---|---|---|
| 1. | 2,4-bis-(2'-hydroxyphenyl)-6-butyl-s-triazine | can be folded | unchanged |
| 2. | 2,4-bis-(2'-hydroxyphenyl)-6-cyclohexyl-s-triazine | do | do |
| 3. | 2,4-bis-(2'-hydroxyphenyl)-6-heptadecyl-s-triazine | do | do |
| 4. | 2-(2'-hydroxyphenyl)-4-(2'-hydroxy-5'-chlorophenyl)-6-decyl-s-triazine | do | do |
| 5. | without UV absorber | do | brittle |

The results given in Table 12 show that, after exposure, acetyl cellulose films stabilised according to the invention have better mechanical properties than untreated films.

Films made from cellulose triacetate, cellulose tripropionate and cellulose acetobutyrate can be stabilised to the effect of light in the same way.

EXAMPLE 244

Difficulty combustible polyester resin, after the addition of 0.5% by weight of 2,4-bis-(2'-hydroxy-4'-butoxyphenyl)-6-decyl-s-triazine is polymerised with 1% by weight of benzoyl peroxide at 80° to form sheets about 2.5 mm thick. The sheets are cured at 120°.

Sheets so produced show considerably less brown colouration on exposure than those produced without the addition mentioned above of the s-triazine derivative. At 500 m$\mu$, the stabilised sheet has a transmission of 88% before and 84% after 500 hours' exposure in the fadeometer. An unstabilised sheet having the same transmission before exposure only transmits 73% of the light after exposure.

The polyester resin used is produced as follows: A mixture of 343 g of maleic acid anhydride and 428 g of tetrachlorophthalic acid anhydride is added in portions at 80° to a mixture of 170 g of ethylene glycol and 292 g of diethylene glycol. After replacing the air in the reaction vessel by nitrogen, the temperature is raised within 1 hour to 150° and then to 210° within 9 hours, kept there for 1 hour and then reduced to 180°. Vacuum is applied and the pressure is slowly reduced to 100 mm. These conditions are maintained until the acid number of the reaction mixture has sunk below 50.

100 g of this polyester are mixed with 50 g of styrene and the mixture is polymerised under the conditions given above.

Instead of the difficultly combustible polyester resin, also other polyester resins can be protected from browning due to light by the process given in the first paragraph of this example with the same result. Such a polyester resin is obtained if the tetrachlorophthalic acid anhydride in the third paragraph of this example is replaced by equimolar amounts of phthalic acid anhydride and otherwise the same procedure is followed.

Polyester resins which are produced according to the process given in the third paragraph of this example but with the use of methylmethacrylate instead of styrene, have less tendency to turn brown and also can be stabilised by smaller amounts of the UV absorbers mentioned above.

EXAMPLE 242

100 Parts of methacrylic acid methyl ester, 0.2 parts of 2,4-bis-(2'-hydroxy-5'-chlorophenyl)-6-cyclohexyl-s-triazine and 0.2 parts of lauroyl peroxide are mixed and polymerised at a temperature of 50°–70° into sheets of 2 mm thickness.

As can be seen from the following Table, such sheets can be used as colourless UV filters.

Table 13

| No. | UV absorber | % transmission of light of wavelength at 380 m$\mu$ | 450 m$\mu$ |
|---|---|---|---|
| 1. | without UV absorber | 90 | 92 |
| 2. | 2,4-bis-(2'-hydroxy-5'-chlorophenyl)-6-cyclonexyl-s-triazine | 2 | 92 |

Corresponding results are obtained if, with sheets of 2 cm thickness, the concentration of UV absorber is reduced to 0.02%.

EXAMPLE 243

Polyethylene of medium molecular weight of 28,000 and a density of 0.917 is mixed at 180°in a Brabender plastograph with 1% of its total weight of 2-(2'-hydroxy-4'-methoxyphenyl)-4-(2'-hydroxyphenyl)-6-decyl-s-triazine and the mass so obtained is pressed in a platen press at 165° into 1 mm thick sheets.

These sheets have considerably less tendency to brittleness on weathering than those produced without the addition of the triazine derivative mentioned.

Similar results are obtained if, instead of the polyethylene, polypropylene is used but then mixing must be done at 220° and pressing at 180°.

EXAMPLE 245

A mixture of 660 g of pulverulent emulsion polyvinyl chloride (K value 72, bulk density 0.43, 330 g of dioctyl phthalate and 10 g of 2,4-bis-(2'-hydroxyphenyl)-6-methyl-s-triazine are worked up on a two roll mill at 150° into films.

On exposing films so produced, brown spots occur after a 1.5 to 2 times longer period than they occur on films produced without the addition of 2,4-bis-(2'-hydroxyphenyl)-6-benzyl-s-triazine.

Similar results are obtained if polyvinyl chloride having a K value of 74 and a bulk density of 0.46 is used.

The addition of 10 g of barium-cadmium laurate to the above mixture produces films which are stabilised both to the effect of heat as well as light.

EXAMPLE 246

100 Parts of granulated polycaprolactam (Grilon, Emserwerke A.G., Domat-Ems, Switzerland) and 1 part of 2,4-bis-(2'-hydroxyphenyl)-s-triazine are melted together at 255° in an autoclave having a die in the floor, while excluding air. The melt is pressed by nitrogen pressure through the die.

The homogeneous mass so obtained absorbs UV light and can be used for the production of UV dense packing material.

Polymerisation of 100 parts of caprolactam in the presence of 1 part of 2,4-bis-(2'-hydroxyphenyl)-s-triazine by the usual method yields a polymer having very similar properties.

UV dense material is also obtained if, instead of the polycaprolactam, polyhexamethylene adipamide is used.

EXAMPLE 247

Bleached maple veneer is painted with a lacquer for wood of the following composition: 15.0 parts of Cellit F 900 (Bayer, Leverkusen, Germany) having about 56% acetic acid content, 10.0 parts of dimethyl glycol phthalate, 2.25 parts of 2,4-bis-(2'-hydroxyphenyl)-6-butyl-s-triazine (corresponding to 15% by weight calculated on the acetyl cellulose), 5.0 parts of methyl alcohol, 10.0 parts of toluene and 50.0 parts of ethyl acetate.

The natural yellowing of the wood is greatly retarded by this lacquer.

PART V

In a fifth aspect, the present invention concerns new o-hydroxyphenyl-s-triazines, processes for the production thereof, their use for the stabilization of light-sensitive organic material and for the production of light filters, also, as industrial product, the organic material stabilized with the aid of these triazines, as well as light filters which contain the new o-hydroxyphenyl-s-triazines.

It has been found that valuable UV absorbers are obtained by reacting an oxazine compound of formula

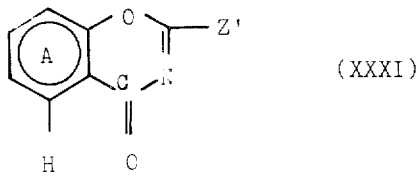

(XXXI)

with a substantially equimolar amount of a compound of formula

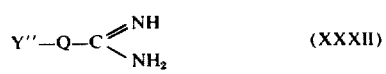

(XXXII)

to form a triazine compound of formula

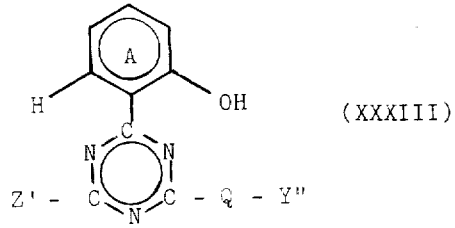

(XXXIII)

in which formulas

Q represents —O—, —S— or —N($R_{15}$)—,

Z' represents a monocyclic carbocyclic aryl group which is unsubstituted or substituted preferably as described further below, Y" represents an alkyl group which is unsubstituted or substituted, preferably as described hereinafter, a cycloalkyl, aralkyl or aryl group which is unsubstituted or substituted, preferably by the substituents described hereinafter, or an alkenyl group of at least 3 carbon atoms, which is unsubstituted or substituted as described hereinafter, Q being bonded to a saturated carbon atom of said alkenyl group, $R_{15}$ represents hydrogen or an alkyl group, preferably from 1 to 5 carbon atoms, and the benzene ring A can be further substituted in the 3-, 1- and/or 5-positions by alkyl, alkenyl, cycloalkyl, aralkyl, aryl, free, etherified or acylated hydroxyl groups, and/or halogens.

If desired, any above-mentioned substituents can be subsequently modified chemically.

Alkyl groups symbolized by Y" in the formulas XXXII and XXXIII have, for example, 1 to 18 carbon atoms. Examples are the methyl, ethyl, propyl, isopropyl, butyl, tert. butyl, amyl, hexyl, octyl, decyl, dodecyl, tetradecyl, hexadecyl or octadecyl group; of these, alkyl groups having 1 to 10 carbon atoms are preferred. The alkyl groups may be further substituted if desired. Substituted alkyl groups correspond, among others, to the formula -alkylene-E-$D_1$, for example. In this formula, alkylene represents a divalent aliphatic radical having in particular 1 to 12, preferably 1 to 4 carbon atoms, and E represents either —O— or —S— or —N($D_2$)—. $D_1$ and $D_2$ independently of each other represent an alkyl radical containing preferably 1 to 8 carbon atoms, and if E is oxygen or nitrogen, $D_1$ or $D_2$ can also be hydrogen. Suitable groups of the formula -alkylene-E-$D_1$ are, for example, the ω-hydroxyalkyl, ω-alkoxyalkyl, ω-alkylmercaptoalkyl, ω-aminoalkyl groups such as the hydroxymethyl, 2-hydroxyethyl, 2-methoxyethyl, 2-ethoxyethyl, 2-butoxyethyl, 2-methylmercaptoethyl, 2-butylmercaptoethyl, 2-dodecylmercaptoethyl, 2-N,N-dimethylaminoethyl or 2-N,N-diethylaminoethyl or the ω-aminodecyl group. Y" can also be a halogenoalkyl group having preferably 1 to % carbon atoms such as the chloromethyl, bromoethyl, 2-chloroethyl or 4-chlorobutyl group, and a group of the formula -alkylene-E'. In this formula, E' represents a group

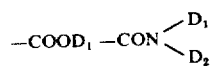

or the cyano group, $D_1$ and $D_2$ having the meanings given above.

Aliphatic groups wherein hetero atoms are separated from each other by at least 2 carbon atoms are preferred as they lend good thermostability to the o-hydroxyphenyl-s-triazines according to the invention.

As alkenyl group, Y" represents, for example, the $\Delta^2$-propenyl or the $\Delta^8$-heptadecenyl group. Of these, low alkenyl groups having 3 to 6 carbon atoms are preferred.

As cycloalkyl groups, Y" contains 5 to 10, preferably however, 6 to 7 carbon atoms. Examples are the cyclohexyl, methylcyclohexyl or ethylcyclohexyl group.

If Y" represents an aralkyl group, then this contains 7 to 12, preferably 7 to 9 carbon atoms; examples are the benzyl, phenethyl, butylbenzyl, p-chlorobenzyl or p-methoxybenzyl group.

As aryl group Z' or Y'' advantageously represent a radical of the benzene series which may be substituted, e.g. by halogen, low alkyl or low alkoxy groups. In addition Z' can be a o-hydroxyphenyl radical which can be substituted by the same groups as named as substituents of benzene ring A.

If Q is the group —N($R_{15}$)—, then $R_{15}$ is hydrogen or a lower alkyl group such as the methyl, ethyl, a propyl or butyl group.

The benzene ring A can be further substituted as defined; aryl substituents of ring A can themselves be substituted, e.g. by chlorine or bromine. The alkyl groups which can be substituents of the benzene ring A have 1 to 18, preferably 1 to 10 carbon atoms, alkenyl groups as ring substituents have 2 to 18, preferably 2 to 5 carbon atoms; such substituents are thus, e.g. the methyl, tert. butyl or tert. octyl group or the allyl or methallyl group. Cycloalkyl or aralkyl groups as substituents of the benzene ring A advantageously are those having 5 to 8, and 7 to 10 carbon atoms respectively, e.g. the cyclohexyl group and the benzyl or 1-phenylethyl group respectively. Aryl groups used as substituents of A are, in particular, of the benzene series and have 6 to 10 carbon atoms. Examples are the phenyl, a methylphenyl, chlorophenyl or methoxyphenyl group. If the benzene ring A contains an acylated hydroxyl group, then the acyl radical thereof is derived in particular from an aliphatic carboxylic acid having at most one double bond and 1 to 18, preferably 1 to 10 carbon atoms. The carboxylic acid radical can be substituted, in particular by carboxyl, carbo-low alkoxy or low alkoxy groups. The acyl radical can also be derived from a cycloaliphatic carboxylic acid having 6 to 8 carbon atoms, from an araliphatic carboxylic acid having 8 to 11 carbon atoms or from an aromatic carboxylic acid, in the latter case particularly from a carboxylic acid of the benzene series having 7 to 11 carbon atoms. The acyl radical can also consist of a carbonic acid monoester radical having 2 to 11 carbon atoms. Examples of acyl radicals in acyloxy substituents of the benzene ring A are the radical of acetic, propionic, stearic, acrylic, crotonic, β-carboxypropionic, β-carbomethoxypropionic, β-carbethoxypropionic, β-carbohexyloxypropionic, butoxyacetic, β-methoxypropionic, cyclohexane carboxylic, phenylacetic, cinnamic, benzoic, chlorobenzoic, methylbenzoic, methoxybenzoic, butylbenzoic or o-carboxybenzoic acid or the carbomethoxy, carbethoxy, carbobutoxy, carbodecyloxy, carbocyclohexyloxy, carbobenzyloxy, carbophenyloxy, carbochlorophenyloxy or carbocresyloxy radical.

As etherified hydroxyl groups, the benzene ring A contains, for example, substituents of the formula $R_5$-O-, wherein $R_5$ has the meaning given hereinbefore in Part IV of the invention.

It has further been found that particularly satisfactory colorless light stabilizers of good all round properties under this aspect of the invention, which are particularly suitable for the protection of polymeric materials synthetic to short-wave UV-irradiation, (especially of a peak between 300 - 335 μ), which fall under Formula XXXIII, supra, are those of the formula

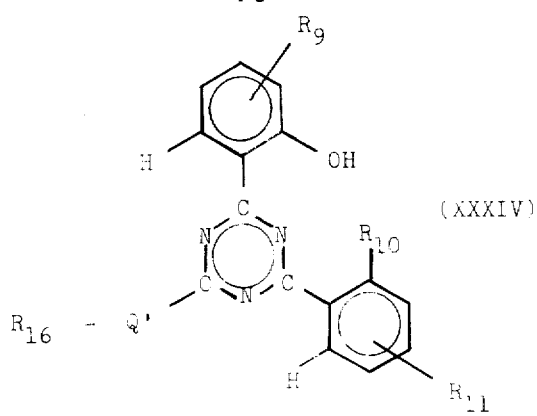

(XXXIV)

wherein $R_9$, $R_{10}$ and $R_{11}$ have the meanings given herein before, in Part III of the invention, Q' is either oxygen or sulfur, and $R_{16}$ represents alkyl of from 1 to 18 carbon atoms, amino-alkyl of 1 to 12 carbon atoms, hydroxyalkyl of 1 to 12 carbon atoms, alkoxy-alkyl wherein the alkoxy moiety has from 1 to 8 carbon atoms and the alkyl moiety has from 1 to 12 carbon atoms, alkylthioalkyl wherein the alkylthio moiety has from 1 to 8 carbon atoms and the alkyl moiety has from 1 to 12 carbon atoms, N-alkylamino-alkyl wherein the alkylamino moiety has from 1 to 8 carbon atoms and the alkyl moiety has from 1 to 12 carbon atoms, or N,N-di-(alkyl)-amino alkyl wherein the N-alkyl groups have each from 1 to 8 carbon atoms, and the alkyl moiety bearing the amino group has from 1 to 12 carbon atoms, alkoxy-carbonyl-alkyl wherein the alkoxy moiety has from 1 to 8, and the alkyl moiety has from 1 to 12 carbon atoms, carboxy-alkyl with a total of from 2 to 13 carbon atoms, cyanoalkyl of from 2 to 5 carbon atoms, N,N-di-(lower alkyl)-carbamylalkyl wherein the last-mentioned alkyl moiety has from 2 to 4 carbon atoms, chloro-alkyl of from 1 to 12 carbon atoms, bromo-alkyl of from 1 to 12 carbon atoms, cycloalkyl of from 5 to 10 carbon atoms, 5 to 6 of which are ring members, alkenyl of from 3 to 17 carbon atoms, phenylalkenyl of from 9 to 12 carbon atoms, alkyl-phenyl-alkenyl of from 10 to 12 carbon atoms, alkoxy-phenyl-alkenyl of from 10 to 12 carbon atoms, chloro- or bromo-phenyl-alkenyl of 9 to 12 carbon atoms, phenyl, chlorophenyl, bromophenyl, lower alkylphenyl, lower alkoxyphenyl, unsubstituted or chloro-, bromo-, lower alkyl- or lower alkoxy-substituted benzyl or phenyl-ethyl, there being at least two carbon atoms present intermediate Q' and the hetero atom in those of the aforesaid member of $R_{16}$ containing such hetero atom, and all of said members comprising alkenyl being bonded to Q' via a saturated carbon atom of said alkenyl.

Compounds of Formula XXXIV in which $R_9$ has the meaning of an —$OR_5$— group in the 4'-position and at the same time $R_{11}$ has the meaning of an alkoxy group in the 4''-position show a very high absorptivity but a poor light protective power for polyester resins.

Compounds of analogous structure as those of Formula XXXIV which possess in lieu of Q' the grouping

in which $R_{15}$ is hydrogen or alkyl of from 1 to 5 carbon atoms, have less protective power than the correspondingly substituted compounds of Formula XXXIV, but are also useful for the production of light filters. These compounds also absorb at wavelengths shorter by 5 to 10 millimicrons than the corresponding substituted compound containing sulfur or oxygen in lieu of

Compounds falling under the Formula XXXIII which show a very high protective power for polymeric materials sensitive to long wavelength UV light (especially of a peak between 335 and 370 $\mu$) and which are vastly superior in this respect to compounds of Formula XXXIV, but are inferior due to having a noticeable inherent yellowish shade, are those of the formula

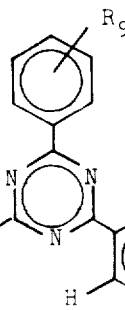

(XXXV)

wherein $R_9$, $R_{16}$ and $Q'$ have the same meanings as given hereinbefore.

Compounds of analogous structure as those of Formula XXXV, which possess in lieu of $Q'$ an

bridging member, in which $R_{15}$ has the last-given meaning, have a lower inherent light fastness than the compound of Formula XXXV, and are therefore useful mainly as UV-absorbers in UV filters destined for short time use.

Compounds of Formulas XXXIV and XXXV in which —Q'—$R_{16}$— has the meaning of an arylamino group show considerably better inherent light fastness than those in which —Q'—$R_{16}$ stands for alkylamino, alkenylamino or cycloalkylamino.

The compounds of the Formulas XXXIII to XXXV should preferably possess a molecular weight between 278 and 720. Compounds having especially good absorption and solubility properties have preferably the molecular weight between 300 and 600.

With respect to inherent light fastness, compounds falling under Formula XXXIII are preferred, in which Q represents sulfur or, preferably, oxygen.

The starting materials of Formula XXXI, some of which are known, can be obtained by methods known per se, for example, from compounds of the Formulas

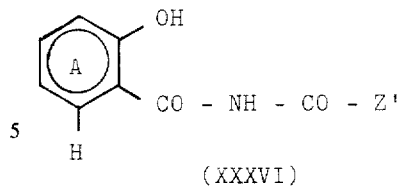

(XXXVI)

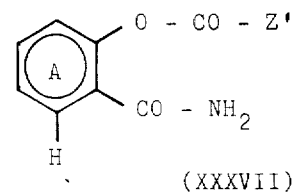

(XXXVII)

by splitting off water, (A. Mustafa, J. Am. Chem. Soc. 79, 3846 (1957)). In the Formulas XXXVI and XXXVII, Z' has the meaning given in Formula XXXIII.

In the cases in which Z' in Formula XXXVI is an o-hydroxyphenyl radical and the benzene ring of the radical and the benzene ring A in the same formula are not identically substituted, two isomeric benzoxazinones are formed upon ring closure by dehydrolysis to form the corresponding compounds of Formula XXXI. Both isomeric intermediates, however, on reaction with a compound of Formula XXXII lead to the same end product of Formula XXXIII.

In view of the above, when a benzoxazinone is given hereinafter as starting material, this covers also the case where such starting material is a mixture of the two isomers.

Examples of starting compounds of Formula XXXI are: 2-phenyl-, 2-(3'-chlorophenyl)-, 2-(2'-methylphenyl)-, 2-(4'-tert. octylphenyl)-, 2-(2'-methoxyphenyl)-, 2-(4'-butoxyphenyl)-, 2-(4'-acetoxyphenyl)-, 2-phenyl-6,7-dimethyl-, 2-(2'-hydroxyphenyl)-, 2-(2'-hydroxy-5'-methylphenyl)-, 2-(2'-hydroxy-5'-chlorophenyl)-, 2-(2'-hydroxy-3',5'-dichlorophenyl)-, 2-(2'-hydroxy-5'-octylphenyl)-, 2-(2'-hydroxy-5'-cyclohexylphenyl)-, 2-(2'-hydroxy-5'-benzylphenyl)-, 2-(2'-hydroxy-5'-phenylphenyl)-, 2-(2'-hydroxy-4'-methoxyphenyl)-, 2-(2'-hydroxy-4'-octyloxyphenyl)-, 2-(2',4'-dihydroxyphenyl)-, 2-(2'-hydroxyphenyl)-6-chloro-, 2-(2'-hydroxyphenyl)-6,8-dichloro-, 2-(2'-hydroxyphenyl)-6-cyclohexyl-, 2-(2'-hydroxyphenyl)-7-octyloxy-, 2-(2'-hydroxyphenyl)-7-acetoxy-, 2-(2'-hydroxy-5'-methylphenyl)-6-methyl-, 2-(2'-hydroxy-4'-butoxyphenyl)-7-butoxy-, 2-(2'-hydroxy-5'-tert. butylphenyl)-7-methoxy or 2-(2',4'-dihydroxy-5'-ethylphenyl)-7-hydroxy-4H-1,3-benzoxazinone(4).

Compounds to be reacted therewith of Formula XXXII are, e.g. O- or S- or N- methyl-, -butyl-, -octyl-, -β-methoxyethyl-, -carboxymethyl-, -carbethoxymethyl-, β-cyanoethyl-, -β-hydroxyethyl-, -cyclohexyl-, -benzyl-, -p-chlorobenzyl-, -p-methoxybenzyl-, -phenyl-, -o-chlorophenyl-, -p-methylphenyl-, -m-methoxyphenyl-, -allyl-, -oleyl- urea or -thiourea or -guanidine, N,N-dimethyl-, N-methyl-N-cyclohexyl-, n-ethyl-N-phenylguanidine. Thiourea can be used as reaction component because the resulting compounds of Formula XXXIII wherein Y" is hydrogen are converted by alkylation into s-triazines according to the invention.

The o-hydroxyphenyl triazines of Formula XXXIII are produced by heating the starting materials of Formulas XXXI and XXXII, preferably in about equimolar amounts. The reaction is performed advantageously in boiling organic solvents, particularly when high melting components are used. Suitable solvents are mainly alcohols such as methanol, ethanol or ethylene glycol monomethyl or monoethyl ether or, also, dioxan.

Any reactive substituents present in the new o-hydroxyphenyl-s-triazines can be subsequently altered chemically if desired. Exchangeable halogen in compounds of Formula XXXIII can be replaced by hydroxyl groups, ether groups or amino groups upon reaction with aqueous sodium hydroxide solution, with alkali alcoholates or phenolates or with ammonia, or secondary amines respectively. Any other acylatable or etherifiable hydroxyl groups or mercapto groups which may be present can subsequently be acylated or etherified. Thus, for example, o-hydroxyphenyl-s-triazines which contain as benzene ring substituents etherified or acylated hydroxyl groups in m- and/or p-position to the bond to the triazine ring are advantageously obtained by partial etherification or acylation of the corresponding di- or poly- hydroxyphenyl-s-triazines.

Suitable acylating agents in this case are the carboxylic acid anhydrides, and, chiefly, the halides of carboxylic acids or of carbonic acid monoesters, i.e., for example, acetanhydride, acetyl chloride, benzoyl chloride, chloroformic acid alkyl ester. Ketenes, however, can also be used as acylating agents.

Suitable etherifying agents for the reactions mentioned above are the esters of strong acids such as hydrochloric, hydrobromic, hydroiodic acid or sulfuric acid, benzene sulfonic acid or p-toluene sulfonic acid with alcohols, particularly with low alkanols, alkenols or with aralkyl alcohols. Examples of suitable etherifying agents are: dimethyl or diethyl sulfate, butyl bromide or iodide, allyl chloride or benzyl chloride.

Likewise, o-hydroxyphenyl-s-triazines in which —Q—'—$R_{16}$ is an alkoxy group, in particular an alkylmercapto group, can be produced by etherifying the corresponding s-triazine compounds in which —Q—Y" is a hydroxyl or a sulfydryl group.

The new o-hydroxyphenyl-s-triazines of Formula XXXIII are distinguished by excellent fastness to light in organic carriers. The solubility of the new o-hydroxyphenyl-s-triazines can often be adapted to the divergent requirements for different fields of application by suitable choice of the substituents of the benzene ring A and of the groups symbolized by Z' and Y" in Formula XXXIII.

Thus, for example, for non-polar carriers such as for polyolefins, fats, or waxes, UV absorbers of Formula XXXIII are preferred wherein Z' is an o-hydroxyphenyl radical which may be further substituted by alkyl or alkoxy groups, and Y" is an alkyl radical, the benzene ring A may be substituted by alkyl or alkoxy groups and in which there are 10 to 20 carbon atoms in the alkyl groups present.

Compounds of Formula XXXIII in which the benzene ring A contains a free or etherified hydroxyl group in p-position to the bond to the triazine ring, have high extinction coefficients.

The compounds of Formula XXXIII in which Z' is an o-hydroxyphenyl group are used with advantage if strong absorption in the long wave UV range is desired.

Because of their very slight inherent color, o-hydroxyphenyl-s-triazines of Formula XXXIII having only one o-hydroxyphenyl radical can be used in colorless carriers such as polymethacrylate or polystyrene.

The same carrier materials including substrates to be stabilized against deterioration by ultraviolet light can be employed for incorporation of, and/or, protected by the light-stabilizing compounds according to this fifth aspect of the invention as have been enumerated hereinbefore as useful in combination with the compounds according to the first aspect of the invention, taking, however, into account the differences in properties between the two classes of new light stabilizers which are more closely defined by Formulas IV and V, regarding the first aspect, and Formulas XXXIII to XXXV, regarding the fifth aspect of this invention.

New compositions of light-stabilized polymeric materials in which compounds falling under Formulas XXXIII, XXXIV or XXXV are the light-stabilizing ingredients, are produced in the same manner as described under the first aspect of this invention with regard to the incorporation of compounds falling under Formulas IV and V, supra, into the various carriers listed under the first aspect of the invention.

Thus, what has been said there about the incorporation of light-stabilizing compounds having reactive groupings into polymer melts or monomer mixtures being polymerized, applies equally to the compounds falling under the fifth aspect of the invention.

Likewise, protective coatings and covers containing compounds falling under Formulas XXXIII to XXXV as UV-absorbers can be produced and employed in the same general manner as described under the first aspect of the invention.

The following non-limitative examples illustrate this aspect of the invention.

EXAMPLE 248

2.2 g of dry sodium methylate are dissolved in 50 ml of anhydrous ethanol and then 7.6 g of the hydrobromide of S-ethyl isothiourea are added. The mixture obtained is stirred for 1 hour at room temperature, then 9.6 g of 2-(2'-hydroxyphenyl)-4H-1,3-benzoxazinone-(4) are added and the whole is refluxed for 4 hours. Water is added dropwise to the cooled reaction mixture until the sodium chloride has dissolved and the 2,4-bis-(2'-hydroxyphenyl)-6-ethylmercapto-s-triazine has precipitated. The latter is filtered off under suction and recrystallized from ethylene glycol monomethylether, whereupon it melts at 150°.

The necessary 2-(2'-hydroxyphenyl)-4H-1,3-benzoxazinone-(4) is produced as follows: 13.7 g of salicylic acid amide and 21.4 g of salol are melted at 180° in a round flask fitted with a distillation apparatus. The mixture is kept for 6 hours at this temperature and the phenol and water formed are continuously distilled off in vacuo. The still warm melt is then poured into 50 ml of ethanol and the 2-(2'-hydroxyphenyl)-4H-1,3-benzoxazinone-(4) which precipitates is filtered off under suction and recrystallized from ethylene glycol monomethyl ether. It melts on the Kofler bench at 203° and is yellow coloured. On adding cold aqueous 2n sodium hydroxide solution, the orange coloured sodium salt, which is only slightly soluble, is formed.

Following the same procedure as given hereinbefore from substituted salicylic acid amides and substituted salol there are obtained the correspondingly substituted 2-(2'-hydroxyphenyl)-4H-1,3-benzoxazinones-(4).

The disalicylic acid imide necessary in example 250 is obtained as follows: 27.4 g of salicylic acid amide are melted at 180° and a weak stream of hydrogen chloride is continously directed through the melt for 3 hours. The melt is then stirred with a large quantity of cold water and the product which precipitates is filtered off under suction, dried and recrystallized from chlorobenzene. On the Kofler bench, the disalicylic acid imide so obtained melts spontaneously at about 250° but above about 190° is split off and it changes into the 2-(2'-hydroxyphenyl)-4H-1,3-benzoxazinone-(4) mentioned above when it then melts at 203°. The disalicyclic acid imide is pale yellow coloured and it dissolves easily in cold aqueous 2n sodium hydroxide solution with a yellow colour.

EXAMPLE 249

8.5 g of the hydrobromide of S-n-butyl isothiourea are added in portions to a solution of 2.3 g of dry sodium methylate in 50 ml of anhydrous ethanol. The mixture obtained is stirred for 1 hour at room temperature, then 7.5 g of 2-(2'-hydroxyphenyl)-4H-1,3-benzoxazinone-(4) are added and the whole is refluxed for 4 hours. After cooling the reaction mixture, water is added until the 2,4-bis-(2'-hydroxyphenyl)-6-n-butylmercapto-s-triazine has precipitated. The latter is isolated, washed with water and recrystallized from ethanol whereupon it melts at 119°.

EXAMPLE 250

2,4-bis-(2'-hydroxyphenyl)-6-octylmercapto-s-triazine is produced as described in example 248 from 11 g of the hydrobromide of S-octyl isothiourea, 2.2 g of sodium methylate and 7.5 g of 2-(2'-hydroxyphenyl)-4H-1,3-benzoxazinone-(4). After recrystallization from ethanol, the end product melts at 90°.

The same compound is also obtained in the following way: A mixture of 26 g of disalicylic acid imide, 10 g of thiourea, 5.4 g of sodium methylate and 200 ml of anhydrous ethanol is refluxed for 10 hours. After cooling, the pH of the reaction mixture is adjusted to pH 5 to 6 with 2N hydrochloric acid. The 2,4-bis-(2'-hydroxyphenyl)-6-mercapto-s-triazine which precipitates is filtered off under suction, dried and recrystallized from chlorobenzene whereupon it melts at 240°. 6 g of this mercapto compound are dissolved in 30 ml of 10% alcoholic sodium hydroxide solution. 6 g of octyl iodide are added to the solution obtained and the whole is left to stand for 48 hours at room temperature. The pH of the suspension obtained is adjusted to 5 to 6 by the addition of 1N hydrochloric acid whereupon 2,4-bis-(2'-hydroxyphenyl)-6-octylmercapto-s-triazine precipitates. After washing with water and recrystallizing from ethanol, it melts at 90°. It proves to be identical to the product described in the first paragraph of this example.

EXAMPLE 251

3.8 g of 2-(4'-chlorophenyl)-4H-1,3-benzoxazinone-(4) (obtained according to Mustafa from p-chlorobenzoyl chloride and salicylamide), 3.0 g of the hydrobromide of S-ethyl isothiourea and 0.9 g of sodium methylate in 20 ml of anhydrous ethanol are reacted as described in example 248. The 2-(2'-hydroxyphenyl)-4-(4''-chlorophenyl) 6-ethylmercapto-s-triazine obtained is isolated and after recrystallizing twice from a mixture of alcohol and water it melts at 123°.

EXAMPLE 252

3.5 g of 2-(4'-methylphenyl)-4H-1,3-benzoxazinone-(4) (obtained according to Mustafa from p-methylbenzoyl chloride and salicylic acid amide), 4 g of the hydrobromide of S-octyl isothiourea and 1.1 g of sodium methylate are reacted as described in example 248. After recrystallization from ethanol, the crude 2-(2'-hydroxyphenyl)-4-(4''-methylphenyl)-6-octylmercapto-s-triazine obtained melts at 67°.

EXAMPLE 253

11.5 g of 2-(4'-methoxyphenyl)-7-methoxy-4H-1,3-benzoxazinone-(4) (obtained according to Mustafa from p-methoxybenzoyl chloride and 4-methoxy salicylic acid amide), 13.5 g of the hydrobromide of S-octyl isothiourea and 2.7 g of sodium methylate in 100 ml of ethanol are reacted as described in example 248. In this way, 2-(2'-hydroxy-4'-methoxyphenyl)-4-(4''-methoxyphenyl)-6-octylmercapto-s-triazine is obtained which, after recrystallizing twice from alcohol/water, melts at 60°.

EXAMPLE 254

10 g of 2-(4'-methoxyphenyl)-4H-1,3-benzoxazinone-(4) (obtained according to Mustafa from p-methoxybenzoyl chloride and salicylic acid amide), 13.5 g of the hydrobromide of S-octyl isothiourea and 2.7 g of sodium methylate in 100 ml of anhydrous ethanol are reacted according to example 248. 2-(2'-hydroxyphenyl)-4-(4''-methoxyphenyl)-6-octylmercapto-s-triazine is obtained and after recrystallizing from ethylene glycol monomethyl ether it melts at 67°.

The s-triazine mentioned in the first paragraph of this example is also obtained by the following method:

6.2 g of 2-(2'-hydroxyphenyl)-4-(4''-methoxyphenyl)-6-mercapto-s-triazine, (M.P. 233°, obtained from 2-(4'-methoxyphenyl)-4H-1,3-benzoxazinone-(4), thiourea and sodium methylate in alcohol as described in example 248), 8 g of octyl bromide and 1.1 g of sodium methylate are slowly heated in 100 ml of methylethyl ketone to reflux temperature and then refluxed for 3 hours. After cooling the reaction mixture, a pale yellow product precipitates which, after recrystallization from n-butanol, melts at 67°. It is identical to the 2-(2'-hydroxyphenyl)-4-(4''-methoxyphenyl)-6-octylmercapto-s-triazine mentioned above.

EXAMPLE 255

7 g of the benzoxazinone obtained from salicylic acid amide and 3,5-dimethylsalol in the melt, 7.5 g of the hydrobromide of S-ethyl isothiourea and 2.2 g of sodium methylate in 50 ml of dimethyl formamide are reacted as described in example 248. The 2-(2'-hydroxyphenyl)-4-(2''-hydroxy-3'',5''-dimethylphenyl)-6-ethylmercapto-s-triazine obtained is recrystallized from methylethyl ketone and then melts at 153°.

EXAMPLE 256

12 g of 2-(2'-hydroxyphenyl)-4H-1,3-benzoxazinone-(4), 9 g of the hydrobromide of S-β-cyanoethyl isothiourea and 3 g of sodium methylate in 100 ml of isopropanol are reacted as described in example 248. The 2,4-bis-(2'-hydroxyphenyl)-6-β-cyanoethylmercapto-s- triazine formed is isolated and recrystallized from chlorobenzene whereupon it melts at 216°.

The same product is also obtained by the following method:

14 g of 2,4-bis-(2'-hydroxyphenyl)-6-mercapto-s-triazine (for production thereof see example 250) are dissolved in 200 ml of ethylene glycol monomethyl ether at 100°. 5 ml of triethylamine and 3.5 g of acrylonitrile are added and the whole mixture is stirred for 2 hours at 100° and then overnight at room temperature. The product which precipitates is filtered off under suction and recrystallized from toluene. It proves to be identical to the 2,4-bis-(2'-hydroxyphenyl)-6-β-cyanoethylmercapto-s-triazine described above.

EXAMPLE 257

9 g of 2,4-bis-(2'-hydroxyphenyl)-6-mercapto-s-triazine (for production see example 250) are dissolved in 150 ml of pyridine, 6.9 g of maleic acid dietyl ester are added and the whole is refluxed for 4 hours. The cooled reaction mixture is acidified with 2N hydrochloric acid, the product which precipitates is filtered off under suction and recrystallized from ethanol. It melts at 94° and proves to be 2,4-bis-(2'-hydroxyphenyl)-6-α,β-bis-carbethoxyethylmercapto-s-triazine.

EXAMPLE 258

14 g of 2,4-bis-(2'-hydroxyphenyl)-6-mercapto-s-triazine (for production see example 250) are dissolved at 100° in 200 ml of ethylene glycol monomethyl ether. 5 ml of triethylamine and 5.2 g of acrylic acid methyl ester are added to the solution which is then heated to 100° and afterwards cooled. The 2,4-bis-(2'-hydroxyphenyl)-6-β-carbomethoxyethylmercapto-s-triazine which precipitates is recrystallized from ethylene glycol monomethyl ether and then melts at 135°.

EXAMPLE 259

1.7 g of potassium hydroxide are dissolved in 150 ml of ethylene glycol monomethyl ether, 9 g of 2,4-bis-(2'-hydroxyphenyl)-6-mercapto-s-triazine (production thereof see example 250) are added to the solution and the suspension is stirred until solution is attained. 9.4 g of ω-chlorobromopropane are then added and the solution is stirred, first overnight at room temperature and then for 2 hours at 50°. After cooling, the pale yellow 2,4-bis-(2'-hydroxyphenyl)-6-γ-chloropropylmercapto-s-triazine precipitates. It is filtered off under suction and recrystallized from glacial acetic acid whereupon it melts at 153°.

EXAMPLE 260

12 g of 2-(2'-hydroxyphenyl)-4H-1,3-benzoxazinone-(4), 13 g of the hydrobromide of S-benzyl isothiourea and 3 g of sodium methylate in 100 ml of isopropanol are reacted as described in example 248. The 2,4-bis-(2'-hydroxyphenyl)-6-benzylmercapto-s-triazine obtained is isolated and, after recrystallization from ethylene glycol monomethyl ether, it melts at 164°.

The same s-triazine is also obtained by the following method:

1.6 g of sodium methylate are suspended in 150 ml of methylethyl ketone. 9 g of 2,4-bis-(2'-hydroxyphenyl)-6-mercapto-s-triazine (for production see example 250) and 6.3 g of benzyl chloride are added and the whole is heated for 3 hours at 60°, and then kept overnight at room temperature. The product which precipitates is filtered off under suction and recrystallized from n-butanol. It melts at 164° and is identical to the 2,4-bis-(2'-hydroxyphenyl)-6-benzylmercapto-s-triazine mentioned above.

EXAMPLE 261

7.2 g of 2-(2'-hydroxyphenyl)-4H-1,3-benzoxazinone-(4), 5.2 g of the hydrochloride of S-carboxymethyl isothiourea and 3.8 g of sodium methylate in 50 ml of ethanol are reacted as described in example 248. After recrystallizing the 2,4-bis-(2'-hydroxyphenyl)-6-carboxymethylmercapto-s-triazine obtained several times from chlorobenzene, it melts at 237°.

EXAMPLE 262

4.1 g of 2-(4'-chlorophenyl)-4H-1,3-benzoxazinone-(4) (obtained according to Mustafa from p-chlorobenzoyl chloride and salicylic acid amide), 2.3 g of the hydrochloride of O-methyl isothiourea and 1.1 g of sodium methylate in 50 ml of ethanol are reacted as described in example 248. The 2-(2'-hydroxyphenyl)-4-(4''-chlorophenyl)-6-methoxy-s-triazine so obtained melts, after recrystallizing twice from glacial acetic acid, at 158°.

EXAMPLE 263

4.5 g of 2-phenyl-4H-1,3-benzoxazinone-(4), 4.5 g of the hydrochloride of O-butyl isourea and 1.6 g of sodium methylate in 50 ml of anhydrous alcohol are reacted as described in example 248. After recrystallizing twice the 2-(2'-hydroxyphenyl)-4-phenyl-6-butoxy-s-triazine obtained from methanol, it then melts at 74°.

EXAMPLE 264

10 g of 2-(4'-methoxyphenyl)-4H-1,3-benzoxazinone-(4) (for production see example 254), 11.5 g of the hydrochloride of O-decyl isourea and 2.6 g of sodium methylate in 100 ml of isopropanol are reacted as described in example 248. The 2-(2'-hydroxyphenyl)-4-(4''-methoxyphenyl)-6-decyloxy-s-triazine obtained is recrystallized twice from ethanol and then melts at 80°.

EXAMPLE 265

5.7 g of 2-(4'-methoxyphenyl)-7-methoxy-4H-1,3-benzoxazinone-(4) (for production see example 253), 7.1 g of the hydrochloride of O-decyl isourea and 1.6 g of sodium methylate in 50 ml of n-butanol are reacted as described in example 248. The 2-(2'-hydroxy-4'-methoxyphenyl)-4-(4''-methoxyphenyl)-6-decyloxy-s-triazine is recrystallized twice from a mixture of alcohol and water and then melts at 65°.

EXAMPLE 266

3 g of 2-(4'-methoxyphenyl)-7-methoxy-4H-1,3-benzoxazinone-(4) (for production see example 253), 1.7 g of the hydrochloride of O-methyl isourea and 0.8 g of sodium methylate in 20 ml of dimethyl formamide are reacted and the product is worked up as described in example 248. The 2-(2'-hydroxy-4'-methoxyphenyl)-4-(4''-methoxyphenyl)-6-methoxy-s-triazine so obtained is recrystallized from acetone and then melts at 166°.

EXAMPLE 267

5.4 g of the benzoxazinone obtained from the melt of salicylic acid amide and 4,5-dimethylsalol, 4.6 g of the hydrochloride of O-butyl isourea and 1.6 g of sodium methylate in 50 ml of ethanol are reacted as described in example 248. The 2-(2'-hydroxy-4'-5'-dimethylphenyl)-4-(2''-hydroxyphenyl)-6-butoxy-s-triazine obtained is recrystallized from dimethyl formamide and then melts at 95°.

EXAMPLE 268

7.5 g of 2-(2'-hydroxyphenyl)-4H-1,3-benzoxazinone-(4), 6 g of the hydrochloride of O-butyl isourea and 2.2 g of sodium methylate in 100 ml of ethylene glycol monomethyl ether are reacted as described in example 248. The 2,4-bis-(2'-hydroxyphenyl)-6-butoxy-s-triazine obtained is recrystallized from ethanol whereupon it metls at 115°.

The same compound, but in a poorer yield, can also be obtained in the following way:

3.5 g of 2,4-bis-(2'-hydroxyphenyl)-6-hydroxy-s-triazine, 2 g of sodium methylate, 0.3 g of sodium iodide and 5.5 g of butyl bromide in 10 ml dimethyl formamide are refluxed for 10 hours. The reaction mixture is then evaporated in vacuo and the residue is boiled with 50 ml of methanol and then filtered. On cooling the filtrate, the 2,4-bis-(2'-hydroxyphenyl)-6-butoxy-s-triazine mentioned above precipitates. After recrystallizing twice from ethanol, it melts at 115°.

The 2,4-bis-(2'-hydroxyphenyl)-6-hydroxy-s-triazine necessary is obtained in the following way: 6 g 2,4-bis-(2'-hydroxyphenyl)-6-mercapto-s-triazine (for production see example 250) and 2 g of chloroacetic acid are refluxed for 4 hours in a solution of 3.4 g of sodium hydroxide in a mixture of 10 ml of water and 40 ml of ethanol, and then cooled. The product which precipitates is filtered off under suction and recrystallized twice from ethylene glycol monomethyl ether whereupon it melts at 303°. It proves to be 2,4-bis-(2'-hydroxyphenyl)-6-hydroxy-s-triazine.

EXAMPLE 269

7.2 g of 2-(2'-hydroxyphenyl)-4H-1,3-benzoxazinone-(4), 12.5 g of the hydrochloride of O-cyclohexyl isourea and 2 g of sodium emthylate in 50 ml of ethanol are reacted as described in example 248. The 2,4-bis-(2'-hydroxyphenyl)-6-cyclohexyloxy-s-triazine obtained is recrystallized twice from ethylene glycol monomethyl ether and then melts at 157°.

EXAMPLE 270

23.9 g of 2-(2'-hydroxyphenyl)-4H-1,3-benzoxazinone-(4), 17 g of the hydrochloride of O-β-methoxyethyl isourea and 6 g of sodium methylate in 100 ml of ethanol are reacted as described in example 248. The 2,4-bis-(2'-hydroxyphenyl)-6-β-methoxyethoxy-s-triazine so obtained is recrystallized twice from methylethyl ketone and then melts at 154°.

EXAMPLE 271

5.2 g of the benzoxazinone obtained from the melt of slicylic acid amide and 5-methylsalol, 5.6 g of the hydrochloride of O-benzyl isourea and 1.6 g of sodium methylate in 50 ml of ethanol are reacted as described in example 248. The 2-(2'-hydroxy-5'-methylphenyl)-4-(2''-hydroxyphenyl)-6-benzyloxy-s-triazine so obtained is recrystallized from ethylene glycol monomethyl ether and then melts at 275°.

EXAMPLE 272

5.4 g of the benzoxazinone obtained from the melt of salicylic acid amide and 4-methoxysalol, 4.5 g of the hydrochloride of O-butyl isourea and 1.6 g of sodium methylate are reacted in 50 ml of ethanol as described in example 248. The 2-(2'-hydroxy-4'-methoxyphenyl)-4-(2''-hydroxyphenyl)-6-butoxy-s-triazine so obtained is recrystallized twice from acetone whereupon it melts at 128°.

EXAMPLE 273

4 g of the benzoxazinone obtained from the melt of 4-methoxysalol and 4-octoxysalicylic acid amide, 1.7 g of the hydrochloride of O-methyl isourea and 0.8 g of sodium methylate in 30 ml of ethanol are reacted as described in example 248. The 2-(2'-hydroxy-4'-methoxyphenyl)-4-(2''-hydroxy-4''-octoxyphenyl)-6-methoxy-s-triazine so obtained is recrystallized from ethylene glycol monomethyl ether and then melts at 89°.

EXAMPLE 274

6 g of 2-(2'-hydroxy-4'-methoxyphenyl)-7-methoxy-4H-1,3-benzoxazinone-(4) (obtained from the melt of 4-methoxysalol and 4-methoxysalicylic acid amide), 7 g of the hydrochloride of O-decyl isourea and 1.6 g of sodium methylate in 50 ml of n-butanol are reacted as described in example 248. The 2,4-bis-(2'-hydroxy-4'-methoxyphenyl)-6-decyloxy-s-triazine obtained is recrystallized twice from n-butanol and then melts at 115°.

EXAMPLE 275

4.8 g of 2-(4'-methylphenyl)-4H-1,3-benzoxazinone-(4), 3.5 g of the hydrochloride of N,N-dimethyl guanidine and 1.6 g of sodium methylate in 50 ml of ethanol are reacted as described in example 248. The 2-(2'-hydroxypheny)-4-(4''-methylphenyl)-6-dimethylamino-s-triazine so obtained is recrystallized from ethylene glycol monomethyl ether and then melts at 140°.

EXAMPLE 276

4.1 g of 2-(4'-chlorophenyl)-4H-1,3-benzoxazinone-(4) (obtained according to Mustafa from p-chlorobenzoyl chloride and salicylic acid amide), 3.3 g of N-phenyl guanidine nitrate and 0.9 g of sodium methylate in 50 ml of isopropanol are reacted as described in example 248. The 2-(2'-hydroxyphenyl)-4-(4''-chlorophenyl)-6-phenylamino-s-triazine obtained is recrystallized twice from chlorobenzene and then melts at 215°.

EXAMPLE 277

19.8 g of phenyl guanidine nitrate are added to a solution of 3 g of sodium methylate in 50 ml of anhydrous ethanol and the whole is stirred for 1 hour at room temperature.

12 g of 2-(2'-hydroxyphenyl)-4H-1,3-benzoxazinone-(4) are added to this solution. The reaction mixture obtained is kept for 8 hours under reflux, cooled and the precipitated 2,4-bis-(2'-hydroxyphenyl)-6-phenylamino-s-triazine is filtered off under suction. After recrystallizing from toluene the product melts at 242°.

EXAMPLE 278

5.5 g of the benzoxazinone obtained from the melt of salicylic acid amide and 5-chlorosalol, 3.5 g of the hydrochloride of N,N-dimethyl guanidine and 1.6 g of sodium methylate in 50 ml of ethanol are reacted as described in example 248. The 2-(2'-hydroxy-5'-chlorophenyl)-4-(2''-hydroxyphenyl)-6-N,N-dimethylamino-s-triazine obtained is recrystallized from n-butanol and then melts at 249°.

EXAMPLE 279

6 g of the benzoxazinone obtained from the melt of 4-methoxy salicylic acid amide and 3,5-dimethylsalol, 6.5 g of the hydrobromide of N-phenyl guanidine and 1.6 g of sodium methylate in 50 ml of n-butanol are reacted as described in example 248. The 2-(2'-hydroxy-4'-methoxyphenyl)-4-(2''-hydroxy-3'', 5''-dimethylphenyl)-6-phenylamino-s-triazine obtained is recrystallized from ethylene glycol monomethyl ether and then melts at 252°.

EXAMPLE 280

6 g of 2-(2'-hydroxy-4'-methoxy)-7-methoxy-4H-1,3-benzoxazinone-(4) (obtained from the melt of 4-methoxy salicylic acid amide and 4-methoxysalol), 3.5 g of the hydrochloride of N,N-dimethyl guanidine and 1.6 g of sodium methylate are reacted in 50 ml of ethylene glycol monomethyl ester as described in example 248. The 2,4-bis-(2'-hydroxy-4'-methoxyphenyl)-6-dimethylamino-s-triazine so obtained is purified by recrystallizing twice from toluene and then melts at 278°.

By the same methods as described in the foregoing examples, identified in the last column of the tables below, there are obtained compounds falling under Formulas XXXIV and XXXV.

In table 12 there are listed compounds of Formula XXXIV having substituents $R_9$, $R_{10}$, $R_{11}$ and $-Q'-R_{16}$, Q' standing for O,S or $-\dot{N}-R_{15}$, which are obtained from starting materials of Formulas XXXI and XXXII, in which fromulas Z' stands for

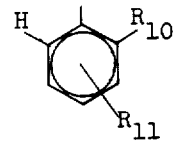

Y'' stands for $R_{16}$, Q stands for Q' and wherein the substituents of Ring A correspond to $R_9$.

In table 13 there are listed compounds of Formula XXXV, having substituents $R_9$ and $-Q'-R_{16}$, Q' standing for O,S or $-\dot{N}-R_{15}$, which are obtained from starting materials of Formulas XXXI and XXXII, in which formulas Z' stands for

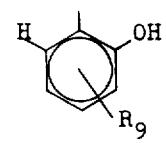

Y'' stands for $R_{16}$, Q stands for Q' and wherein the substituents of Ring A correspond to $R_9$.

Table 12

| Example No. | Q' | $R_{16}$ | $R_9$ | $R_{10}$ | $R_{11}$ | Method of preparation according to Example No. |
|---|---|---|---|---|---|---|
| 281 | O | p-bromophenyl | 5'-tert.octyl | H | 4''-acetoxy | 262 |
| 282 | S | carboxymethyl | 5'-dodecyl | methyl | H | 251 |
| 283 | O | m-chlorophenyl | 3'-allyl | p-bromobenzoyloxy | H | 262 |
| 284 | S | methyl | 3'-octen-2-yl | H | 5''-acryloyloxy | 251 |
| 285 | O | heptadecyl | 5'-cyclohexyl | chloro | H | 254 |
| 286 | O | octyloxycarbonylmethyl | 5'-(4''-methylcyclohexyl) | H | H | 262 |
| 287 | S | ω-(m-methoxyphenylallyl) | 5'-p-methylbenzyl | H | 4''-octyl | 251 |
| 288 | O | methyl | 5'-α-phenylethyl | H | 4''-octanoyloxy | 262 |
| 289 | S | ω-bromodecyl | 5'-o-chlorobenzyl | H | 4''-p-bromobenzyl | 251 |
| 290 | O | β-hydroxyethyl | 4'-p-bromobenzyl | H | 4''-octyloxy | 262 |
| 291 | S | ω-chlorodecyl | 3'-phenyl | β-phenylethyl | H | 251 |
| 292 | O | cyclohexyl | 5'-p-tert.butylphenyl | H | H | 262 |
| 293 | O | β-aminoethyl | 5'-p-bromophenyl | H | 4''-o-chlorobenzyl | 262 |
| 294 | S | ω-methoxycarbonyldecyl | 5'-p-chlorophenyl | bromo | H | 251 |
| 295 | S | ω-aminodecyl | 4'-acetoxy | H | 3''-allyl | 251 |
| 296 | O | 4-methylcyclohexyl | 4'-stearoyloxy | H | H | 262 |
| 297 | S | ω-carboxydecyl oxydecyl | 4'-methacryloyloxy | H | 3''-m-methoxybenzyl | 253 |
| 298 | O | phenyl | 5'-oleyloxy | H | H | 262 |
| 299 | S | ω-phenylallyl | 4'-γ-carboxypropionyloxy | benzyl | H | 251 |
| 300 | S | methyl | 4'-ω-carboxynonanoyloxy | H | 4''-benzyl | 251 |
| 301 | S | ω-(p-bromophenylallyl) | 4'-γ-methoxycarbonylpropionyloxy | H | H | 251 |
| 302 | S | methyl | 4'-δ-hexyloxycarbonylvaleroyloxy | H | H | 251 |
| 303 | O | heptadecen-8-yl | 5'-β-carboxyacryloyloxy | H | H | 262 |
| 304 | O | methyl | 5'-β-carboxy-β-octylacryloyloxy | H | H | 262 |
| 305 | O | ethyl | 5'-β-ethoxycarbonylacryloyloxy | H | H | 262 |
| 306 | S | allyl | 5'-β-methoxycarbonyl-β-octylacryloyloxy | H | H | 254 |
| 307 | S | ω-(p-chlorophenylallyl) | 4'-benzoyloxy | octyl | H | 251 |
| 308 | O | methyl | 5'-p-methylbenzoyloxy | H | H | 262 |

Table 12 – Continued

| Example No. | Q' | R₁₀ | R₉ | R₁₀ | R₁₁ | Method of preparation according to Example No. |
|---|---|---|---|---|---|---|
| 309 | O | methyl | 5'-p-chlorobenzoyloxy | H | H | 262 |
| 310 | S | ω-N,N-dimethyl-aminodecyl | 4'-(2'',4''-dibromo-benzoyloxy | H | H | 253 |
| 311 | S | ethyl | 5'-methoxycarbonyloxy | m-chloro-benzyl | H | 251 |
| 312 | S | methyl | 4'-dodecyloxycarbonyl-oxy | H | H | 251 |
| 313 | O | β-N-octylaminoethyl | 4'-cyclohexyloxy-carbonyloxy | H | H | 262 |
| 314 | O | methyl | 4'-benzyloxy-carbonyloxy | H | H | 262 |
| 315 | S | ω-(p-methylphenyl-allyl) | 5'-phenoxycarbonyloxy | H | H | 254 |
| 316 | S | β-octylthioethyl | 4'-hydroxy | H | 4''-hydroxy | 251 |
| 317 | S | β-bromoethyl | 4'-dodecyloxy | H | 4''-β-phenylethyl | 251 |
| 318 | S | ω-methylthiodecyl | 4'-β-chloroethoxy | H | H | 253 |
| 319 | O | methyl | 4'-δ-chlorobutoxy | octyloxy | H | 262 |
| 320 | S | methyl | 4'-(α-bromomethyl)-heptyloxy | H | H | 251 |
| 321 | S | β-octyloxyethyl | 4'-β-hydroxyethoxy | H | 5''-bromo | 251 |
| 322 | O | methyl | 4'-ω-hydroxydecyloxy | p-methyl-benzoyloxy | H | 262 |
| 323 | S | methyl | 4'-β-octoxyethoxy | H | 3''-methallyl | 251 |
| 324 | S | butyl | 4'-δ-methoxybutoxy | H | H | 251 |
| 325 | S | methyl | 4'-β-cyclohexyloxy-ethoxy | H | 4''-(4'''-methylcyclohexyl | 251 |
| 326 | O | ω-hydroxydecyl | 4'-cyanomethoxy | p-ethyl-benzyl | H | 264 |
| 327 | S | methyl | 4'-β-cyanopropyloxy | H | H | 251 |
| 328 | O | ω-methoxycarbonyl-decyl | 5'-carboxymethoxy | H | H | 264 |
| 329 | S | methyl | 4'-γ-carboxypropyloxy | H | H | 251 |
| 330 | S | methyl | 5'-octoxycarbonyl-methoxy | H | H | 251 |
| 331 | S | methyl | 4'-γ-methoxycarbonyl-propyloxy | H | H | 251 |
| 332 | S | methyl | 5'-N,N-dimethylcarba-mylmethoxy | H | H | 251 |
| 333 | O | methyl | 5'-γ-(N,N-dimethyl-carbamyl)-propyloxy | H | H | 262 |
| 334 | S | methyl | 5'-allyloxy | methoxy | 4''-methoxy | 251 |
| 335 | S | methyl | 4'-octen-(2'')-yloxy | H | H | 251 |
| 336 | O | p-ethylphenyl | 4'-benzyloxy | p-ethoxy-benzyloxy | H | 262 |
| 337 | S | methyl | 4'-α-phenylethoxy | H | 4''-p-ethyl-benzyl | 251 |
| 338 | O | β-N,N-dihexyl-aminoethyl | 4'-p-methylbenzyloxy | H | 4''-cyclo-hexyl | 262 |
| 339 | S | methyl | 4'-p-ethyl-α-butyl-benzyloxy | H | H | 251 |
| 340 | S | β-chloroethyl | 5'-bromo | benzoyl-oxy | H | 251 |
| 341 | O | ω-N-methylamino-decyl | 5'-choro | acetoxy | H | 264 |
| 342 | O | methyl | 3',5'-dimethyl | octanoyl-oxy | H | 262 |
| 343 | O | p-methoxyphenyl | 4'-octyloxy | o-chloro-benzoyloxy | H | 262 |
| 344 | O | methyl | 5'-tert.butyl | H | H | 262 |
| 345 | S | benzyl | 5'-tert.octyl | H | 5''-methyl | 251 |
| 346 | O | p-ethylbenzyl | H | H | H | 262 |
| 347 | O | m-methoxybenzyl | H | H | H | 262 |
| 348 | S | o-chlorobenzyl | H | H | H | 251 |
| 349 | S | p-bromobenzyl | 4',5'-dimethyl | H | H | 254 |
| 350 | S | β-phenylethyl | H | H | H | 254 |
| 351 | S | β-cyanoethyl | H | H | H | 256 |
| 352 | S | β-N,N-dimethyl-carbamylethyl | H | H | H | 256 |
| 353 | NH | ω-bromodecyl | 5'-methyl | methyl | 4''-acetoxy | 275 |
| 354 | NH | β-hydroxyethyl | 5'-dodecyl | H | H | 275 |
| 355 | NH | cyclohexyl | 5'-tert.butyl | H | 5''-acryloyloxy | 275 |
| 356 | NH | β-aminoethyl | 3'-allyl | β-phenyl-ethyl | H | 275 |
| 357 | N-butyl | butyl | 5'-cyclohexyl | H | 5''-bromo | 275 |
| 358 | N-ethyl | methyl | 5'-p-methylbenzyl | chloro | H | 275 |
| 359 | NH | ω-aminodecyl | 5'-p-chlorobenzyl | H | H | 275 |
| 360 | NH | allyl | 3'-phenyl | H | 4''-octyl | 275 |
| 361 | NH | β-octylthioethyl | 5'-p-bromophenyl | H | H | 275 |
| 362 | NH | β-bromoethyl | 4'-acetoxy | H | H | 275 |
| 363 | NH | β-methoxyethyl | 4'-methacryloyloxy | H | H | 275 |
| 364 | N-methyl | methyl | 4'-γ-carboxypropion-yloxy | bromo | 4''-bromo | 275 |
| 365 | NH | methyl | 5'-β-ethoxycarbonyl-acryloyloxy | H | H | 275 |

Table 12—Continued

| Example No. | Q' | $R_{16}$ | $R_9$ | $R_{10}$ | $R_{11}$ | Method of preparation according to Example No. |
|---|---|---|---|---|---|---|
| 366 | NH | ω-methoxycarbonyldecyl | 4'-benzoyloxy | H | H | 275 |
| 367 | NH | methyl | 5'-methoxycarbonyloxy | H | 4''-cyclohexyl | 275 |
| 368 | NH | dodecyl | 4'-benzyloxycarbonyloxy | H | H | 275 |
| 369 | NH | methyl | 5'-phenoxycarbonyloxy | H | H | 275 |
| 370 | NH | β-chloroethyl | 4'-hydroxy | octyl | 4''-hydroxy | 275 |
| 371 | NH | methyl | 4'-dodecyloxy | H | H | 275 |
| 372 | N-methyl | methyl | 4'-β-octoxyethoxy | H | 4''-benzyl | 275 |
| 373 | N-methyl | methyl | 4'-cyanomethoxy | methoxy | H | 275 |
| 374 | NH | p-methoxyphenyl | 5'-carboxymethoxy | H | 3''-allyl | 276 |
| 375 | NH | methyl | 5'-N,N-dimethylcarbamylmethoxy | H | H | 276 |
| 376 | NH | 4''-methylcyclohexyl | 5'-allyloxy | H | H | 276 |
| 377 | NH | methyl | 4'-methoxy | p-methylbenzoyloxy | H | 276 |
| 378 | NH | ethyl | 4'-octyloxy | H | H | 276 |
| 379 | NH | methyl | 3'-chloro | octyloxy | H | 276 |
| 380 | NH | ω-phenylallyl | 5'-bromo | acetoxy | H | 276 |
| 381 | N-ethyl | ethyl | 4'-benzyloxy | H | 4''-octyloxy | 276 |
| 382 | NH | methyl | 3',5'-dimethyl | benzyl | H | 276 |
| 383 | NH | methyl | 5'-tert.butyl | H | H | 276 |
| 384 | NH | benzyl | H | H | 5''-methyl | 276 |
| 385 | NH | P-methylbenzyl | H | H | 5''-chloro | 276 |

Table 13

| Example No. | Q' | $R_{16}$ | $R_9$ in ring A | $R_9$ in ring A' | Method of preparation according to Example No. |
|---|---|---|---|---|---|
| 386 | S | heptadecyl | 5'-bromo | H | 248 |
| 387 | O | β-amino-ethyl | 5'-tert.octyl | H | 267 |
| 388 | S | m-methoxybenzyl | 5'-dodecyl | H | 259 |
| 389 | S | ω-chlorodecyl | 3'-allyl | 5''-methyl | 248 |
| 390 | O | methyl | 3'-octen-2-yl | H | 267 |
| 391 | O | β-hydroxyethyl | 5'-cyclohexyl | H | 267 |
| 392 | S | p-methylbenzyl | 5'-(4''-methylcyclohexyl) | H | 259 |
| 393 | S | ω-p-chlorophenylallyl | 5'-p-methylbenzyl | H | 259 |
| 394 | S | β-(N,N-dimethylcarbamyl)ethyl | 5'-α-phenylethyl | H | 248 |
| 395 | O | ω-phenylallyl | 5'-o-chlorobenzyl | H | 268 |
| 396 | S | ω-carboxydecyl | 4'-p-bromobenzyl | 3'',5''-dimethyl | 248 |
| 397 | O | ω-aminodecyl | 3'-phenyl | H | 267 |
| 398 | O | o-chlorophenyl | 5'-p-tert.butylphenyl | H | 267 |
| 399 | S | methyl | 5'-p-bromophenyl | 4''-ethoxy | 248 |
| 400 | S | ω-hydroxydecyl | 5'-p-chlorophenyl | H | 248 |
| 401 | S | o-chlorobenzyl | 4'-acetoxy | H | 259 |
| 402 | O | p-bromophenyl | 4'-stearoyloxy | H | 267 |
| 403 | S | ω-bromodecyl | 4'-methacryloyloxy | 5''-chloro | 248 |
| 404 | O | methyl | 5'-oleyloxy | H | 267 |
| 405 | O | ω-p-methoxyphenylallyl | 4'-δ-carboxypropionyloxy | H | 268 |
| 406 | S | methyl | 4'-ω-carboxynonanoyloxy | H | 248 |
| 407 | O | ethyl | 4'-γ-methoxycarbonylpropionyloxy | H | 267 |
| 408 | S | methyl | 4'-δ-hexyloxycarbonylvaleroyloxy | H | 248 |
| 409 | O | bromoethyl | 5'-β-carboxyacryloyloxy | 4'',5''-dimethyl | 267 |
| 410 | O | propyl | 5'-β-carboxy-β-octylacryloyloxy | H | 267 |
| 411 | S | p-bromobenzyl | 5'-β-ethoxycarbonylacryloyloxy | H | 248 |
| 412 | O | 4''-methylcyclohexyl | 5'-β-methoxycarbonyl-β-octylacryloyloxy | H | 267 |
| 413 | S | ω-methylthiodecyl | 4'-benzoyloxy | H | 248 |
| 414 | S | methyl | 5'-p-methylbenzoyloxy | H | 248 |
| 415 | S | methyl | 5'-p-chlorobenzoyloxy | H | 248 |
| 416 | S | ω-p-tolylallyl | 4'-2'',4''-dibromobenzoyloxy | H | 259 |
| 417 | S | ω-N-methylaminodecyl | 5'-methoxycarbonyloxy | 5''-methyl | 248 |
| 418 | S | methyl | 4'-dodecyloxycarbonyloxy | H | 248 |
| 419 | S | methyl | 4'-cyclohexyloxycarbonyloxy | H | 248 |
| 420 | S | ω-methoxycarbonyldecyl | 4'-benzyloxycarbonyloxy | H | 248 |
| 421 | O | decyl | 5'-phenoxycarbonyloxy | H | 267 |
| 422 | O | p-ethylphenyl | 4'-hydroxy | 4''-hydroxy | 267 |
| 423 | O | methyl | 4'-dodecyloxy | H | 267 |
| 424 | S | ω-N,N-dimethylaminodecyl | 4'-β-chloroethoxy | H | 248 |
| 425 | O | methyl | 4'-δ-chlorobutoxy | H | 267 |
| 426 | O | methyl | 4'-(αbromomethyl)-heptyloxy | H | 267 |

Table 13 – Continued

| Example No. | Q' | $R_{16}$ | $R_9$ in ring A | $R_9$ in ring A' | Method of preparation according to Example No. |
|---|---|---|---|---|---|
| 427 | O | β-N-octylaminoethyl | 4'-β-hydroxyethoxy | 5''-bromo | 267 |
| 428 | S | methyl | 4'-ω-hydroxydecyloxy | H | 248 |
| 429 | S | methyl | 4'-β-octoxyethoxy | H | 248 |
| 430 | O | m-methoxyphenyl | 4'-δ-methoxybutoxy | H | 267 |
| 431 | O | methyl | 4'-β-cyclohexyloxyethoxy | H | 267 |
| 432 | O | methyl | 4'-cyanomethoxy | H | 267 |
| 433 | O | methyl | 4'-β-cyanopropyloxy | H | 267 |
| 434 | S | β-phenylethyl | 5'-carboxymethoxy | H | 248 |
| 435 | S | ethyl | 4'-γ-carboxypropyloxy | H | 248 |
| 436 | O | methyl | 5'-octoxycarbonylmethoxy | H | 267 |
| 437 | O | methyl | 4'-γ-methoxycarbonylpropyloxy | H | 267 |
| 438 | O | methyl | 5'-N,N-dimethylcarbamylmethoxy | H | 267 |
| 439 | S | methyl | 5'-γ-(N,N-dimethylcarbamyl)propyloxy | H | 248 |
| 440 | S | β-octylthioethyl | 5'-allyloxy | 5'''-allyloxy | 248 |
| 441 | S | methyl | 4'octen-(2'')-yloxy | H | 248 |
| 442 | O | β-N,N-dihexylaminoethyl | 4'-benzyloxy | 4''-benzyloxy | 267 |
| 443 | S | methyl | 4'-α-phenylethoxy | H | 248 |
| 444 | O | allyl | 4'-p-methylbenzyloxy | H | 268 |
| 445 | S | methyl | 4'-p-ethyl-α-butyl-benzyloxy | H | 248 |
| 446 | O | octyloxyethyl | 5'-tert.butyl | H | 267 |
| 447 | S | ω-octyloxydecyl | 5'-chloro | 3''-allyl | 248 |
| 448 | O | methyl | 4'-benzyloxy | 4''-benzyloxy | 267 |
| 449 | O | dodecyl | H | H | 267 |
| 450 | S | decyl | H | H | 248 |
| 451 | S | propyl | 5'-chloro | 3'', ''-dimethyl | 248 |
| 452 | S | β-carboxyethyl | H | H | 256 |
| 453 | O | methyl | H | 4'-octyloxy | 267 |
| 454 | NH | heptadecyl | 3',5'-dimethyl | 5''-bromo | 278 |
| 455 | NH | octyl | 5'-ethyl | H | 278 |
| 456 | N-ethyl | ethyl | 5'-butyl | H | 278 |
| 457 | NH | β-aminoethyl | 5'-dodecyl | H | 278 |
| 458 | NH | ω-chlorodecyl | 5'-bromo | 5''-chloro | 278 |
| 459 | NH | β-hydroxyethyl | 4'-octyloxy | H | 278 |
| 460 | NH | ω-phenylallyl | 3'-allyl | H | 278 |
| 461 | NH | ω-carboxydecyl | 5'-cyclohexyl | H | 278 |
| 462 | NH | bromoethyl | 5'-benzyl | 4'',5''-dimethyl | 278 |
| 463 | N-butyl | butyl | 5'-o-chlorobenzyl | H | 278 |
| 464 | NH | benzyl | 3'-phenyl | H | 278 |
| 465 | NH | P-bromobenzyl | 5'-p-tert.butylphenyl | H | 278 |
| 466 | NH | P-ethylphenyl | 4'-acetoxy | 5''-ethyl | 278 |
| 467 | NH | methyl | 5'-oleyloxy | H | 278 |
| 468 | NH | β-phenylethyl | 4'-γ-carboxypropionyloxy | H | 278 |
| 469 | NH | β-octylthioethyl | 5'-β-carboxyacryloyloxy | H | 278 |
| 470 | N-methyl | methyl | 4'-γ-methoxycarbonylpropionyloxy | H | 278 |
| 471 | NH | allyl | 4'-benzoyloxy | H | 278 |
| 472 | N-methyl | methyl | 5'-methoxycarbonyloxy | H | 278 |
| 473 | N-methyl | methyl | 4'-benzyloxycarbonyloxy | H | 278 |
| 474 | N-methyl | methyl | 4'-hydroxy | 4''-hydroxy | 278 |
| 475 | N-methyl | methyl | 4'-dodecyloxy | H | 278 |
| 476 | NH | β-methoxyethyl | 4'-β-hydroxyethoxy | H | 278 |
| 477 | NH | methyl | 4'-β-chloroethoxy | H | 278 |
| 478 | NH | methyl | 4'-β-octoxyethoxy | H | 278 |
| 479 | NH | ethyl | 4'-cyanomethoxy | H | 278 |
| 480 | NH | butyl | 4'-γ-methoxycarbonylpropyloxy | H | 278 |
| 481 | NH | methyl | 4'-allyloxy | H | 278 |
| 482 | NH | β-N,N-dimethylaminoethyl | 4'-benzyloxy | 4''-benzyloxy | 278 |
| 483 | NH | β-N-octylaminoethyl | 5'-tert.butyl | H | 278 |
| 484 | NH | methyl | 5'-benzyloxy | H | 278 |
| 485 | NH | β-carboxyethyl | H | H | 278 |
| 486 | NH | β-cyanoethyl | H | H | 278 |
| 487 | N-methyl | methyl | 4'-octyloxy | 4''-octyloxy | 278 |
| 488 | N-methyl | methyl | 4'-butoxy | 4''-methoxy | 278 |

EXAMPLE 489

A solution of 15 g of acetyl cellulose (having an average of 2.5 esterified hydroxyl groups per glucose unit), 0.3 g of a UV absorber described in the following Table 14, and 2.0 g of dibutyl phthalate in 82.7 g of acetone are painted on a glass plate to form a film. The cellulose acetate films which were dried first at room temperature and then in the oven at 60°, are 0.04 mm thick. Samples of these films are exposed in a fadeometer for 1000 hours and then their brittleness is tested. The results are summarised in Table 14.

Table 14

| No. | UV absorber | behaviour of films on folding before and after 1000 hours' exposure | |
|---|---|---|---|
| 1. | 2,4-bis(-2'-hydroxyphenyl)-6-decyloxy-s-triazine | can be folded | unchanged |
| 2. | 2-phenyl-4-(2'-hydroxy-4'-methoxyphenyl)-6-ethylmercapto-s-triazine | do | do |
| 3. | 2-(2'-hydroxyphenyl)-4-methyl-6-butoxy-s-triazine | do | do |
| 4. | 2,4-bis-(2'-hydroxyphenyl)-6-phenylamino-s-triazine | do | do |
| 5. | without UV absorber | do | brittle |

The results given in Table 14 show that, after exposure, acetyl cellulose films stabilised according to the invention have better mechanical properties than untreated films.

Films made from cellulose triacetate, cellulose tripropionate and cellulose acetobutyrate can be stabilised to the effect of light in the same way.

EXAMPLE 490

Difficultly combustible polyester resin, after the addition of 0.5% by weight of 2,4-bis-(2'-hydroxyphenyl)-6-ethoxy-s-triazine is polymerised with 1% by weight of benzoyl peroxide at 80° to form sheets about 2.5 mm thick. The sheets are cured at 120°.

Sheets so produced show considerably less brown colouration on exposure than those produced without the addition mentioned above of the s-triazine derivative. After an exposure of 500 hours in the fadeometer, the stabilised sheet has a transmission of 78% at 440 mµ (measured transmission before exposure 87%). An unstabilised sheet having the same transmission before exposure only transmits 57.5% of the light at 440 mµ after 500 hours' exposure.

The polyester resin used is produced as follows: A mixture of 343 g of maleic acid anhydride and 428 g of tetrachlorophthalic acid anhydride is added in portions at 80° to a mixture of 170 g of ethylene glycol and 292 g of diethylene glycol. After replacing the air in the reaction vessel by nitrogen, the temperature is raised within 1 hour to 150° and then to 210° within 9 hours, kept there for 1 hour and then reduced to 180°. Vacuum is applied and the pressure is slowly reduced to 100 mm. These conditions are maintained until the acid number of the reaction mixture has sunk below 50.

100 g of this polyester are mixed with 50 g of styrene and the mixture is polymerised under the conditions given above.

Instead of the difficultly combustible polyester resin, also other polyester resins can be protected from browning due to light by the process given in the first paragraph of this example with the same result. Such a polyester resin is obtained if the tetrachlorophthalic acid anhydride in the third paragraph of this example is replaced by equimolar amounts of phthalic acid anhydride and otherwise the same procedure is followed.

Polyester resins which are produced according to the process given in the third paragraph of this example but with the use of methylmethacrylate instead of styrene, have less tendency to turn brown and also can be stabilised by smaller amounts of the UV absorbers mentioned above.

EXAMPLE 491

100 Parts of methacrylic acid methyl ester, 0.2 parts of 2,4-bis-(2'-hydroxyphenyl)-6-cyclohexyloxy-s-triazine and 0.2 parts of lauroyl peroxide are mixed and polymerised at a temperature of 50°-70° into sheets of 2 mm thickness.

As can be seen from the following Table, such sheets can be used as colourless UV filters.

Table 15

| No. | UV absorber | % transmission of light of wavelength at | |
|---|---|---|---|
| | | 380 mµ | 450 mµ |
| 1. | without UV absorber | 90 | 92 |
| 2. | 2,4-bis-(2'-hydroxyphenyl)-6-cyclohexyloxy s-triazine | 3 | 89 |

Practically the same results are obtained if, with sheets of 2 cm thickness, the concentration of UV absorber is reduced to 0.02%.

EXAMPLE 492

A mixture of 660 g of pulverulent emulsion polyvinyl chloride (K value 72, bulk desity 0.43), 330 g of dioctyl phthalate and 10 g of 2,4-bis-(2'-hydroxyphenyl)-6-heptadecyl-s-triazine are worked up on a two roll mill at 150° into films.

On exposing films so produced, brown spots occur after a 1.5 to 2 times longer period than they occur on films produced without the addition of 2,4-bis-(2'-hydroxyphenyl)-6-phenylamino-s-triazine.

Similar results are obtained if polyvinyl chloride having a K value of 74 and a bulk density of 0.46 is used.

The addition of 10 g of barium-cadmium laurate to the above mixture produces films which are stabilised both to the effect of heat as well as light.

EXAMPLE 493

Polyethylene of medium molecular weight of 28,000 and a density of 0.917 is mixed at 180° in a Brabender plastograph with 1% of its total weight of 2,4-bis-(2'-hydroxyphenyl)-6-octylmercapto-s-triazine and the mass so obtained is pressed in a platen press at 165° into 1mm thick sheets.

These sheets have considerably less tendency to brittleness on weathering than those produced without the addition of the triazine derivative mentioned.

Similar results are obtained if, instead of the polyethylene, polypropylene is used but then mixing must be done at 220° and pressing at 180°.

EXAMPLE 494

100 Parts of granulated polycaprolactam (Grilon, Emserwerke A. G., Domat-Ems, Switzerland) and 1 part of 2,4-bis-(2'-hydroxy-4'-ethoxyphenyl)-6-methoxy-s-triazine are melted together at 255° in an autoclave having a die in the floor, while excluding air. The melt is pressed by nitrogen pressure through the die.

The homogeneous mass so obtained absorbs UV light and can be used for the production of UV dense packing material.

The polymerisation of 100 parts of caprolactam in the presence of 1 part of 2,4-bis-(2'-hydroxy-4'-ethoxyphenyl)-6-ethylmercapto-s-triazine by the usual methods give a polymer of similar properties.

UV dense material is also obtained if, instead of the polycaprolactam, polyhexamethylene adiphamide is used.

EXAMPLE 495

Bleached maple veneer is painted with a lacquer for wood of the following composition: 15.0 parts of Cellit F 900 (Bayer, Leverkusen, Germany) having about 56% acetic acid content, 10.0 parts of dimethyl glycol phthalate, 2.25 parts of 2,4-bis-(2'-hydroxyphenyl)-6-octyloxy-s-triazine (corresponding to 15% by weight calculated on the acetyl cellulose), 5.0 parts of methyl alcohol, 10.0 parts of toluene and 50.0 parts of ethyl acetate. The natural yellowing of the wood is greatly retarded by this lacquer.

We claim:

1. A substantially non-coloring light stabilizer for organic polymeric substrata which is sufficiently stable to heat up to at least 200°C to withstand incorporation at such temperature into said substrata, and which is of the formula

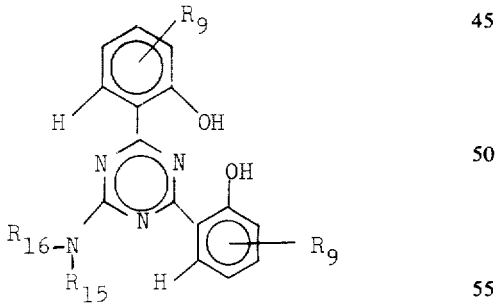

wherein $R_9$ is a member selected from the group consisting of hydrogen, chlorine, bromine, alkyl of from 1 to 18 carbon atoms, alkenyl of from 2 to 18 carbon atoms, cycloalkyl of from 5 to 8 carbon atoms, 5 to 6 of which are ring members, phenylalkyl of from 7 to 10 carbon atoms, alkylphenyl-alkyl of from 8 to 10 carbon atoms, chloro- and
bromo-phenyl-alkyl of from 7 to 10 carbon atoms, phenyl, alkylphenyl of from 7 to 10 carbon atoms, chlorophenyl, bromophenyl, alkanoyloxy of from 1 to 18 carbon atoms, alkenoyloxy of from 3 to 18 carbon atoms and one double bond, carboxy-alkanoyloxy of from 4 to 12 carbon atoms, alkoxy-carbonyl-alkanoyloxy of from 3 to 13 carbon atoms, carboxy-alkenoyloxy of from 4 to 12 carbon atoms, alkoxy-carbonyl-alkenoyloxy of from 5 to 13 carbon atoms, benzoyloxy, alkylbenzoyloxy of from 7 to 10 carbon atoms, chloro-benzoyloxy, bromo-benzoyloxy, alkoxy-carbonyloxy of from 2 to 13 carbon atoms, cyclohexyloxycarbonyloxy, benzyloxycarbonyloxy and phenoxycarbonyloxy, and a radical of the formula —O—$R_5$ wherein $R_5$ is a member selected from the group consisting of hydrogen, alkyl of from 1 to 12 carbon atoms, chloroalkyl, bromo-alkyl and hydroxyalkyl, each of from 2 to 12 carbon atoms, alkoxy-alkyl of from 1 to 8 carbon atoms in the alkoxy moiety and from 2 to 4 carbon atoms in the alkyl moiety, cyclohexyloxy-alkyl of from 2 to 4 carbon atoms in the alkyl moiety, the heteroatom of the substituent in alkyl in the five last-mentioned members being spaced by at least two carbon atoms from the -O-bridge in the above formula, cyano-alkyl of from 2 to 6 carbon atoms, carboxyalkyl of from 2 to 6 carbon atoms, alkoxy-carbonyl-alkyl of from 1 to 8 carbon atoms in the alkoxy moiety, and from 1 to 5 carbon atoms in the alkyl moiety, N,N-di-(lower alkyl)-carbamyl-alkyl of from 1 to 5 carbon atoms in the last-mentioned alkyl moiety, alkenyl of from 3 to 8 carbon atoms, phenyl-alkyl of from 7 to 12 carbon atoms, and lower alkyl-phenyl-alkyl of from 1 to 5 carbon atoms in the last-mentioned alkyl moiety, $R_{15}$ is a member selected from the group consisting of hydrogen and lower alkyl, and $R_{16}$ is a member selected from the group consisting of alkyl of from 1 to 18 carbon atoms, amino-alkyl of 1 to 12 carbon atoms, hydroxy-alkyl of 1 to 12 carbon atoms, alkoxy-alkyl wherein the alkoxy moiety has from 1 to 8 carbon atoms and the alkyl moiety has from 1 to 12 carbon atoms, alkylthio-alkyl wherein the alkylthio moiety has from 1 to 8 carbon atoms and the alkyl moiety has from 1 to 12 carbon atoms, N-alkylamino-alkyl wherein the alkylamino moiety has from 1 to 8 carbon atoms and the alkyl moiety has from 1 to 12 carbon atoms, N,N-di-(alkyl)amino-alkyl wherein the N-alkyl groups have each from 1 to 8 carbon atoms, and the alkyl moiety bearing the amino group has from 1 to 12 carbon atoms, alkoxy-carbonyl-alkyl wherein the alkoxy moiety has from 1 to 8, and the alkyl moiety from 1 to 12 carbon atoms, carboxy-alkyl with a total of from 2 to 13 carbon atoms, chloro-alkyl of from 1 to 12 carbon atoms, bromo-alkyl of from 1 to 12 carbon atoms, cycloalkyl of from 5 to 10 carbon atoms, 5 to 6 of which are ring members, alkenyl of from 3 to 17 carbon atoms, phenylalkenyl of from 9 to 12 carbon atoms, alkyl-phenyl-alkenyl of from 10 to 12 carbon atoms, alkoxy-phenyl-alkenyl of from 10 to 12 carbon atoms, chloro-and bromo-phenyl-alkenyl of 9 to 12 carbon atoms, phenyl, chlorophenyl, bromophenyl, lower alkyl-phenyl, lower alkoxy-phenyl, there being at least two carbon atoms present intermediate the nitrogen atom of

and the hetero atom in those of the aforesaid members of $R_{16}$ containing such hetero atom, and all of said members comprising alkenyl being bonded to the nitrogen atom of

via a saturated carbon atom of said alkenyl, benzyl, phenyl-ethyl, chloro-, bromo-, lower alkyl- and lower alkoxy-substituted benzyl and phenyl-ethyl, cyanoalkyl of from 2 to 6 carbon atoms, and N,N-di-(lower alkyl)-carbamyl-alkyl of from 1 to 5 carbon atoms in the last-mentioned alkyl moiety.

2. The compound of the formula

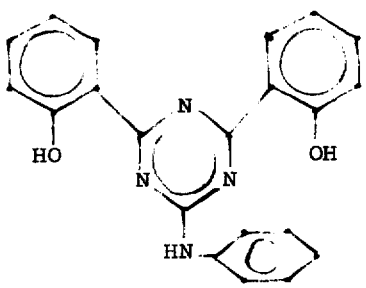

3. An aryl-1:3:5-triazine of the formula

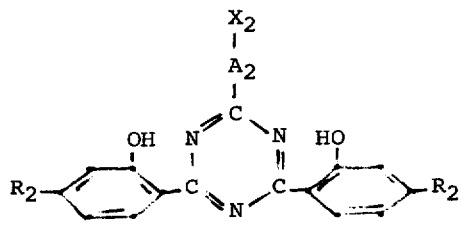

where $A_2$ is a member selected from the group consisting of

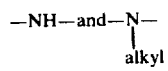

$X_2$ is a member selected from the group consisting of alkyl, hydroxyalkyl and phenyl, and $R_2$ is a member selected from the group consisting of hydrogen, hydroxyl and alkoxy with up to 12 carbon atoms.

4. An aryl-1:3:5-triazine of the formula

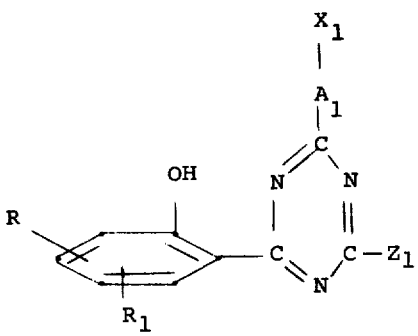

where $A_1$ stands for a member selected from the group consisting of

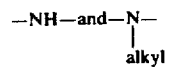

$X_1$ is selected from the group consisting of (1) alkyl (2) hydroxyalkyl, and (3) a benzene radical bound through a cyclic carbon atom to $A_1$, R represents a member selected from the group consisting of hydrogen, hydroxyl and etherified hydroxyl having from 1 to 8 carbon atoms, $R_1$ stands for a member selected from the group consisting of hydrogen and lower alkyl and $Z_1$ is a hydroxybenzene radical of the formula

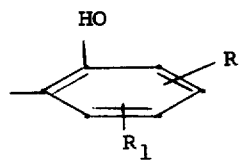

where R and $R_1$ have the above meanings.

* * * * *